US012421798B2

(12) United States Patent
Aamir et al.

(10) Patent No.: US 12,421,798 B2
(45) Date of Patent: Sep. 23, 2025

(54) DRIVE AND CARRIAGE FOR MATERIAL HOIST

(71) Applicant: Tie Down, Inc., Atlanta, GA (US)

(72) Inventors: Mohammed Aamir, Atlanta, GA (US); Michael James Maczko, Covington, GA (US); Charles J. MacKarvich, Atlanta, GA (US)

(73) Assignee: Tie Down, Inc., Atlanta, GA (US)

( * ) Notice: Subject to any disclaimer, the term of this patent is extended or adjusted under 35 U.S.C. 154(b) by 0 days.

(21) Appl. No.: 18/414,058

(22) Filed: Jan. 16, 2024

(65) Prior Publication Data

US 2024/0240523 A1 Jul. 18, 2024

Related U.S. Application Data

(60) Provisional application No. 63/439,541, filed on Jan. 17, 2023, provisional application No. 63/439,539, filed on Jan. 17, 2023.

(51) Int. Cl.

| | |
|---|---|
| ***E06C 7/12*** | (2006.01) |
| ***B66F 3/44*** | (2006.01) |
| ***B66F 7/02*** | (2006.01) |
| ***E06C 7/16*** | (2006.01) |
| *B66B 9/193* | (2006.01) |

(52) U.S. Cl.

CPC .................. *E06C 7/12* (2013.01); *B66F 7/02* (2013.01); *E06C 7/16* (2013.01); *B66B 9/193* (2013.01); *B66F 3/44* (2013.01)

(58) Field of Classification Search

USPC .......................................................... 254/264

See application file for complete search history.

(56) References Cited

U.S. PATENT DOCUMENTS

| | | | |
|---|---|---|---|
| 37,470 | A | 1/1863 | Willis |
| 249,416 | A | 11/1881 | Stewart |
| 570,939 | A | 11/1896 | Mack |
| 925,822 | A | 6/1909 | Mote |
| 2,198,071 | A | 4/1940 | Artini |
| 2,338,833 | A | 1/1944 | Bailey |

(Continued)

FOREIGN PATENT DOCUMENTS

| | | |
|---|---|---|
| CN | 102009921 | 4/2011 |
| DE | 29814678 | 11/1998 |

(Continued)

OTHER PUBLICATIONS

Horst, Benjamin Miller; Certificate of Correction for U.S. Appl. No. 16/276,065, filed Feb. 14, 2019, mailed Jan. 9, 2024, 1 pg.

(Continued)

*Primary Examiner* — Tyrone V Hall, Jr.

(74) *Attorney, Agent, or Firm* — Buchalter, a Professional Corporation

(57) ABSTRACT

A drive for a material hoist system can include a housing configured to be slidably coupled to a track of the system; a motor positioned inside the housing; a gearbox positioned inside the housing and coupled to the motor; and a spool positioned inside the housing between the motor and the gearbox, the spool configured to: selectably wind and unwind a flexible connecting element coupled to the track; and drive movement of the drive along a longitudinal direction of the track.

15 Claims, 40 Drawing Sheets

(56) References Cited

U.S. PATENT DOCUMENTS

| | | | | |
|---|---|---|---|---|
| 2,552,630 | A | 5/1951 | Hutchinson | |
| 2,877,905 | A | 3/1959 | Wiley | |
| 2,899,008 | A | 8/1959 | Larson | |
| 2,936,849 | A | 5/1960 | Larson | |
| 3,115,211 | A | 12/1963 | Ostrander, Jr. | |
| 3,237,719 | A | 3/1966 | Russell | |
| 3,291,258 | A | 12/1966 | Twilley | |
| 3,337,001 | A | 8/1967 | Huska et al. | |
| 3,343,630 | A | 9/1967 | Redman et al. | |
| 3,347,340 | A | 10/1967 | Huska et al. | |
| 3,358,849 | A | 12/1967 | Becker | |
| 3,402,788 | A | 9/1968 | Redman | |
| 3,428,145 | A | 2/1969 | Lyon | |
| 3,490,558 | A | 1/1970 | Foley | |
| 3,491,853 | A | 1/1970 | Stillman, Jr. | |
| 3,592,294 | A | 7/1971 | Allen | |
| 3,896,904 | A | 7/1975 | Walker | |
| 3,908,801 | A | 9/1975 | Pohlman | |
| 3,935,926 | A | 2/1976 | Butler | |
| 3,948,352 | A | 4/1976 | Larson | |
| 4,102,433 | A | 7/1978 | Van Valkenburgh | |
| 4,145,028 | A | 3/1979 | Kelley et al. | |
| 4,155,422 | A | 5/1979 | Larson et al. | |
| 4,183,423 | A * | 1/1980 | Lewis | B66B 9/16 187/244 |
| 4,512,440 | A | 4/1985 | Bixby | |
| 4,550,806 | A | 11/1985 | Bocker | |
| 4,736,929 | A | 4/1988 | McMorris | |
| 4,802,643 | A | 2/1989 | Uys | |
| 5,429,253 | A | 7/1995 | McNett | |
| 5,582,270 | A | 12/1996 | Fowler | |
| 5,692,733 | A | 12/1997 | Hiramatsu | |
| 5,842,684 | A * | 12/1998 | Aho | B66D 1/08 254/323 |
| 6,189,654 | B1 | 2/2001 | Bailey et al. | |
| 6,241,215 | B1 | 6/2001 | Gersemsky et al. | |
| 6,244,381 | B1 | 6/2001 | Ruble | |
| 6,269,909 | B1 | 8/2001 | Grimes et al. | |
| 6,527,088 | B1 | 3/2003 | Fowler | |
| 6,533,070 | B1 | 3/2003 | Elrod | |
| 6,612,533 | B2 * | 9/2003 | Biles | E04F 21/00 248/125.3 |
| 6,995,682 | B1 | 2/2006 | Chen et al. | |
| 7,380,742 | B2 | 6/2008 | Stevens | |
| 7,424,932 | B1 | 9/2008 | Murphy | |
| 7,686,566 | B1 | 3/2010 | Murphy | |
| 7,850,144 | B2 | 12/2010 | Hashiguchi | |
| 7,850,145 | B2 | 12/2010 | Heravi et al. | |
| 7,900,745 | B1 | 3/2011 | Tindal | |
| 7,909,139 | B2 | 3/2011 | Blue et al. | |
| 8,464,833 | B2 | 6/2013 | Lee | |
| 8,689,937 | B2 | 4/2014 | Grado | |
| 8,887,865 | B2 | 11/2014 | Matharu | |
| 9,217,285 | B2 | 12/2015 | Connors | |
| 9,404,305 | B1 | 8/2016 | Messick | |
| 9,556,008 | B2 | 1/2017 | Ogden | |
| 9,856,697 | B2 | 1/2018 | Reyes | |
| 9,944,495 | B2 | 4/2018 | Webber | |
| 10,415,309 | B2 | 9/2019 | Liu et al. | |
| 10,421,651 | B1 | 9/2019 | Coleman et al. | |
| 11,199,049 | B2 | 12/2021 | Horst et al. | |
| 11,254,550 | B2 * | 2/2022 | Coles | E21B 19/00 |
| 11,274,494 | B2 | 3/2022 | Leng | |
| 11,420,849 | B2 | 8/2022 | Liu et al. | |
| 11,505,226 | B1 | 11/2022 | Taranto | |
| 11,834,908 | B2 | 12/2023 | Garcia et al. | |
| 12,215,548 | B2 | 2/2025 | Horst et al. | |
| 2007/0163982 | A1 | 7/2007 | Lichinchi | |
| 2007/0267250 | A1 | 11/2007 | Wolff | |
| 2007/0269303 | A1 | 11/2007 | Quare | |
| 2010/0237306 | A1 | 9/2010 | Eschelbacher et al. | |
| 2013/0068559 | A1 | 3/2013 | Grado | |
| 2014/0246271 | A1 | 9/2014 | Davies | |
| 2015/0275579 | A1 | 10/2015 | Reyes | |
| 2017/0107082 | A1 | 4/2017 | Webber | |
| 2018/0022588 | A1 | 1/2018 | Ho | |
| 2018/0170725 | A1 * | 6/2018 | August | G08C 17/02 |
| 2018/0229982 | A1 | 8/2018 | Limb | |
| 2019/0014773 | A1 | 1/2019 | Lamb | |
| 2019/0233266 | A1 | 8/2019 | Delaney et al. | |
| 2020/0102789 | A1 | 4/2020 | Young | |
| 2020/0263496 | A1 * | 8/2020 | Horst | B66D 1/42 |
| 2021/0079727 | A1 | 3/2021 | Garcia et al. | |
| 2021/0198944 | A1 | 7/2021 | Pozgay et al. | |
| 2022/0042374 | A1 | 2/2022 | Horst et al. | |
| 2022/0259021 | A1 * | 8/2022 | Schell | B66F 9/02 |
| 2022/0397002 | A1 | 12/2022 | Brus | |
| 2024/0240522 | A1 | 7/2024 | Aamir et al. | |
| 2025/0034941 | A1 | 1/2025 | Horst et al. | |

FOREIGN PATENT DOCUMENTS

| | | |
|---|---|---|
| DE | 102016004351 | 10/2017 |
| FR | 2797905 | 3/2001 |
| JP | 2018204306 | 12/2018 |
| KR | 20110112950 | 10/2011 |
| WO | 2007132272 | 11/2007 |
| WO | 2015119505 | 8/2015 |
| WO | 2018136075 | 7/2018 |
| WO | 2020167329 | 8/2020 |
| WO | 2024155696 | 7/2024 |
| WO | 2024155708 | 7/2024 |

OTHER PUBLICATIONS

Horst, Benjamin Miller; Notice of Allowance for U.S. Appl. No. 16/276,065, filed Feb. 14, 2019, mailed Jul. 19, 2021, 19 pgs.

Amazon; Article entitled: "Werner 36-32 MT Series Replacement Inner Lock Kit", located at <https://www.amazon.com/Werner-36-32-Replacement-Inner-Lock/dp/B009AXDLFO/ref=sr_1_2?crid=335TRI4MLKFIF&keywords=MT-13+werner&qid%E2%80%A6>, accessed on Jan. 12, 2023, 6 pgs.

Amazon; Article entitled: "Werner Aluminum Extension Ladder Locks—Model 28-11", located at <https://www.amazon.com/Werner-Aluminum-Extension-Ladder-Locks/dp/B009JU43B4/ref=zg_bs_553474_sccl_7/143-1381346-7509635?psc=1>, accessed on Jan. 11, 2023, 6 pgs.

Horst, Benjamin; International Preliminary Report on Patentability for PCT Application No. PCT/US19/29033, filed Apr. 25, 2019, mailed Aug. 26, 2021, 11 pgs.

Horst, Benjamin; International Search Report and Written Opinion for PCT Application No. PCT/US19/29033, filed Apr. 25, 2019, mailed Jan. 27, 2020, 12 pgs.

Horst, Benjamin Miller; Non-Final Office Action for U.S. Appl. No. 17/507,893, filed Oct. 22, 2021, mailed Mar. 4, 2024, 36 pgs.

Aamir, Mohammed; Requirement for Restriction/Election for U.S. Appl. No. 18/413,953, filed Jan. 16, 2024, mailed Mar. 13, 2024, 8 pgs.

Aamir, Mohammed; Non-Final Office Action for U.S. Appl. No. 18/413,953, filed Jan. 16, 2024, mailed May 23, 2024, 33 pgs.

Aamir, Mohammed; Invitation to Pay Additional Fees for PCT/US2024/011828, filed Jan. 17, 2024, mailed Mar. 25, 2024, 2 pgs.

Aamir, Mohammed; Invitation to Pay Additional Fees for PCT/US2024/011814, filed Jan. 17, 2024, mailed Apr. 8, 2024, 2 pgs.

Aamir, Mohammed; International Search Report and Written Opinion for PCT Application No. PCT/US24/11828, filed Jan. 17, 2024, mailed Jun. 12, 2024, 13 pgs.

Aamir, Mohammed; International Search Report and Written Opinion for PCT Application No. PCT/US24/11814, filed Jan. 17, 2024, mailed Jun. 4, 2024, 14 pgs.

Horst, Benjamin Miller; Final Office Action for U.S. Appl. No. 17/507,893, filed Oct. 22, 2021, mailed Jul. 12, 2024, 24 pgs.

Final Office Action for U.S. Appl. No. 18/413,953, mailed Oct. 28, 2024, 19 pgs.

Corrected Notice of Allowance for U.S. Appl. No. 17/507,893, dated Dec. 19, 2024, 2 pages.

Corrected Notice of Allowance for U.S. Appl. No. 17/507,893, dated Nov. 20, 2024, 2 pages.

(56) References Cited

OTHER PUBLICATIONS

Notice of Allowance for U.S. Appl. No. 17/507,893, dated Oct. 30, 2024, 10 Pages.
Non-Final Office Action for U.S. Appl. No. 18/413,953, dated Feb. 3, 2025, 18 pages.
Final Office Action for U.S. Appl. No. 18/413,953, dated Jun. 6, 2025, 20 pages.

* cited by examiner

DRIVE AND CARRIAGE FOR MATERIAL HOIST

REFERENCE TO RELATED APPLICATIONS

This application claims the benefit of U.S. Provisional Application Nos. 63/439,541 and 63/439,539, filed Jan. 17, 2023, each of which is hereby specifically incorporated by reference herein in its entirety.

TECHNICAL FIELD

Field of Use

This disclosure relates to material hoist systems for transporting objects from one position to another, e.g., from a ground surface to an elevated surface. More specifically, this disclosure relates to material hoist systems configured to hoist objects from a lower position to a higher position with a motorized drive.

Related Art

Ladders are commonly used to allow workers to reach portions of an elevated structure not otherwise accessible. Ladders, however, are not ideal for transport of material because a user must steady himself against the ladder and cannot simultaneously carry a heavy load. Something like a portable ladder, however, can be useful when access is needed only temporarily such as, for example only, to perform occasional maintenance and repair. Without a system to repeatedly and safely lift heavy materials like roofing shingles, however, a user is left with relatively unsafe and burdensome options. Even where options may exist, storage and transport of bulky equipment is difficult.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a drive for a material hoist system, the drive comprising: a housing configured to be slidably coupled to a track of the system; a motor positioned inside the housing; a gearbox positioned inside the housing and coupled to the motor; and a spool positioned inside the housing between the motor and the gearbox, the spool configured to: selectably wind and unwind a flexible connecting element coupled to the track; and drive movement of the drive along a longitudinal direction of the track.

In a further aspect, disclosed is a carriage comprising: a frame comprising: a first portion configured to slidably secure to a track; and a second portion coupled to the first portion and configured to automatically rotate with respect to the first portion depending on a position of the frame on the track; and a plurality of moving elements secured to the frame.

In yet another aspect, disclosed is a method of using a material hoist system, the method comprising: slidably moving a carriage of the system with respect to a track, movement of the carriage with respect to the track driven by a drive of the system; and stopping the movement of the carriage automatically when a motor controller of the drive senses a current that reaches a current threshold and a rotational speed that reaches a rotational speed threshold.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
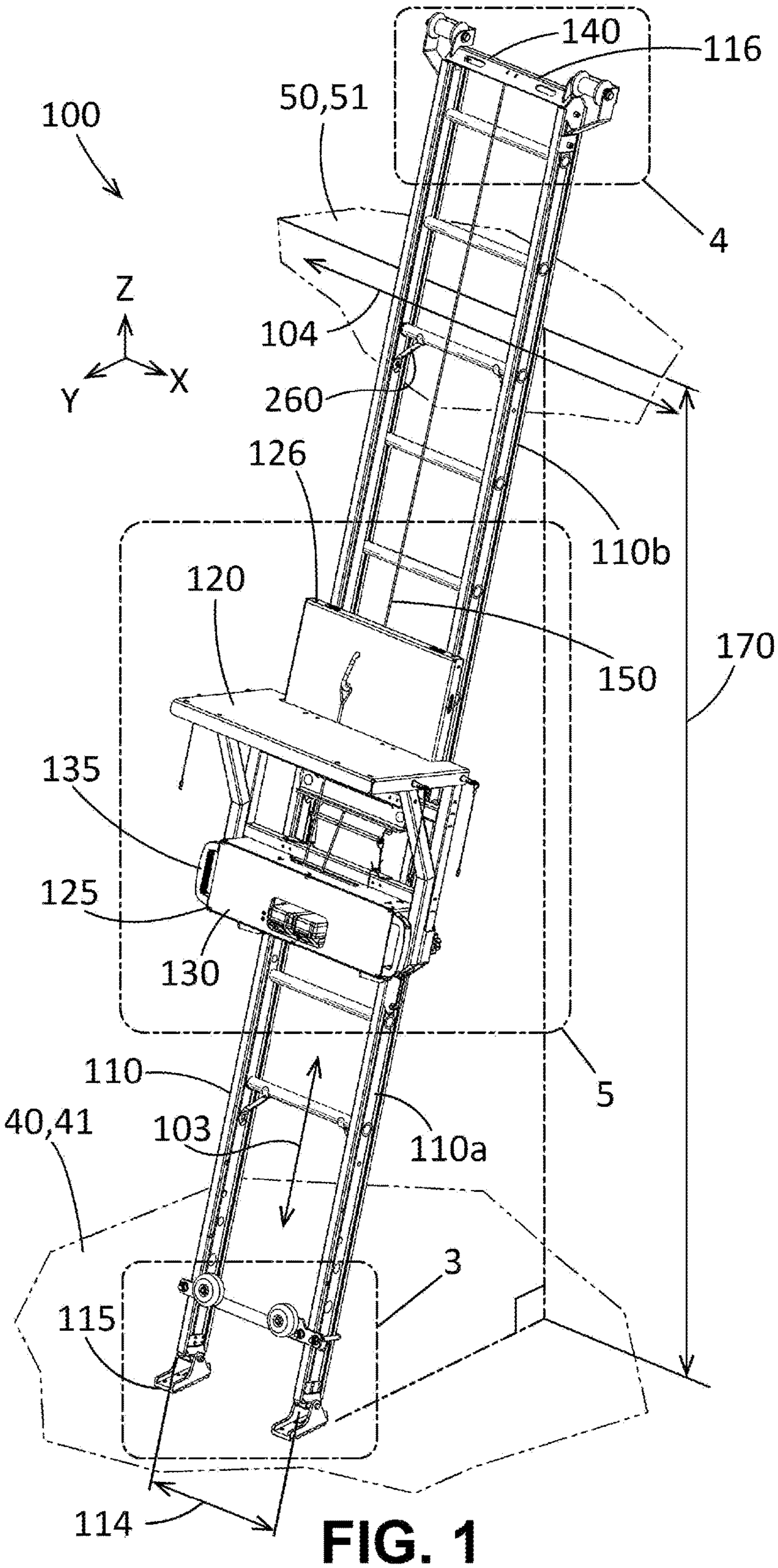
FIG. 1 is a front perspective view of a material hoist system comprising a track, a carriage, and a drive in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms “a,” “an” and “the” include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a “widget” is referenced).

Ranges can be expressed herein as from “about” one particular value, and/or to “about” another particular value. When such a range is expressed, another aspect comprises from the one particular value and/or to the other particular value. Similarly, when values are expressed as approximations, by use of the antecedent “about” or “substantially,” it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms “optional” or “optionally” mean that the subsequently described event or circumstance may or may not occur, and that the description comprises instances where said event or circumstance occurs and instances where it does not.

The word “or” as used herein means any one member of a particular list and also comprises any combination of members of that list. The phrase “at least one of A and B” as used herein means “only A, only B, or both A and B”; while the phrase “one of A and B” means “A or B.”

As used herein, unless the context clearly dictates otherwise, the term “monolithic” in the description of a component means that the component is formed as a singular component that constitutes a single material without joints or seams.

To simplify the description of various elements disclosed herein, the conventions of “left,” “right,” “front,” “rear,” “top,” “bottom,” “upper,” “lower,” “inside,” “outside,” “inboard,” “outboard,” “horizontal,” and/or “vertical” may be referenced. Unless stated otherwise, “front” describes that end of the material hoist system nearest to or occupied by a user of the system when facing a side of the track from which a carriage is configured to extend; “rear” is that end of the system that is opposite or distal the front; “left” is that which is to the left of or facing left from a person while facing towards the front; and “right” is that which is to the right of or facing right from that same person while facing towards the front. “Horizontal” or “horizontal orientation” describes that which is in a plane extending from left to right and aligned with the horizon. “Vertical” or “vertical orientation” describes that which is in a plane that is angled at 90 degrees to the horizontal.

The material hoist system can also be described using a coordinate axis of X-Y-Z directions shown in FIG. 1. An X-axis direction can be referred to as a left-right or horizontal direction. An upper-lower direction is a Z-axis direction orthogonal to the X-axis direction and to a Y-axis direction. The Y-axis direction is orthogonal to the X-axis direction (left-right direction) and the Z-axis direction (upper-lower direction) and can also be referred to as a front-rear direction. A surface of a structural element that is parallel with the front-rear direction can be referred to as a lateral side.

In various aspects, a material hoist system and associated methods, systems, devices, and various apparatuses are disclosed herein. In some aspects, the material hoist system can comprise a track. In some aspects, the material hoist system can comprise a carriage, portions of which can automatically move with respect to other portions for the convenience and safety of a user. In some aspects, the material hoist system can comprise a drive, which can comprise a spool for winding a flexible connecting element and can be configured to automatically stop, even without a sensor, upon reaching ends of the track or an obstruction.

FIG. 1 is a front perspective view of a material hoist system 100 in accordance with one aspect of the current disclosure. The material hoist system 100 can transport objects from one position to another position. In some aspects, for example, the material hoist system 100 can lift objects from a ground surface or first surface 41 of a first location or first position or first structure 40 to an elevated surface or second surface 51 of a second location or second position or second structure 50. In some aspects, the first position 40 can be a lower position and the second position 50 can be a higher position. In some aspects, the material hoist system 100 can transport objects between two elevated surfaces, which can be at or can define different heights.

The second structure 50, which can be an elevated structure, can be a roof of a structure such as a building. In some aspects, the surface 51 can be a roof surface. In some aspects, the second surface 51 can be another surface. In some aspects, the surface 51 can be a horizontal surface. In some aspects, the surface 51 can be sloped with respect to the horizontal by an angle 57 (shown in FIG. 32). In some aspects, the angle 57 can measure 45 degrees or less. In some aspects, the angle 57 can measure 30 degrees or less. In some aspects, the angle 57 can measure 20 degrees or less. In some aspects, the angle 57 can measure 10 degrees or less. In some aspects, the angle 57 can measure 5 degrees or less.

More specifically, as shown, the system 100 can comprise an extension track or track extension assembly or track member or track 110 and can be configured to hoist objects, e.g., on the track 110, from the first position 40 to the second position 50. In some aspects, the track 110 can comprise a single track member **110*a*, which can be a track segment or track section. In some aspects, the track 110 can further comprise a second track member 110*b*, which can be joined or, more specifically, spliced to the first track member 110*a*. In some aspects, the track 110 can comprise additional track members (e.g., a third track member). The first track member 110*a* and the second track member 110*b* can be spliced to each other with one or more splices 109 (shown in FIG. 16). The second track member 110*b* and additional track members can be configured to remain stationary in all directions with respect to the first track member 110*a* such that they function together as a single track 110. The track 110 can be portable. More specifically, the track 110 can be configured to set up only temporarily at a particular location and be able to use and then remove without any tools and without modification of the elevated structure 50. In some aspects, the track 110 can define a lateral width or width 114, which can be at least 18 inches. The system 100 and, more specifically, the track 110 can define a longitudinal direction 103, a lateral direction 104, a bottom end or first end 115, and a top end or second end 116**.

The system 100 can comprise a carriage 120. As shown, the carriage 120 can be coupled to the track 110. As shown, the carriage 120 can be slidably coupled to the track 110. More specifically, the carriage 120 can be configured to be coupled to the track 110 at any point along the track 110.

The system 100 can comprise a drive 130. As shown, the drive 130 can be coupled to the carriage 120. More specifically, the drive 130 can be coupled to the carriage 120 proximate to a bottom end or first end 125 of the carriage 120. The drive 130, which can be a winch, can be configured to wind and unwind a flexible connecting element 150 (e.g., a cable or rope), which, as will be described further, can be attached to the drive 130. The flexible connecting element 150 can be secured to an upper guide assembly or guide assembly 140, which can be secured to the top end of the track 110. In some aspects, the drive 130 and, more specifically, a main unit or portion 135 thereof, can be fixed in a stationary position on or proximate to the carriage 120. In some aspects, the drive 130 and, more specifically, the main portion 135 thereof, can be fixed in a stationary position on the track 110. The drive 130 and, more specifically, the main portion 135 thereof can be configured to not move with respect to the carriage 120 during operation of the system 100. In some aspects, the drive 130 can be configured to move with respect to the track 110 during operation of the system 100. The carriage 120 can define a top end or second end 126.

The carriage 120 can carry any payload or load 80 (shown in FIG. 32) that the user needs transported to the elevated surface 51, which can be offset from the first position 40 by a height 170. In one test, 3,000 pounds of force was able to be applied to the carriage 120 without dislodging the carriage 120 from the track 110. In some aspects, the system 100 can lift 250 pounds at 2 feet per second and has been so tested over 6,500 trips. In some aspects, the system 100 can carry the load 80 as high as 44 feet. For example and without limitation, the load 80 can be or can comprise construction tools or materials for use during building, renovation, or repair of the elevated structure 50 such as, for example and without limitation, power tools or roofing shingles.

Figure 2:
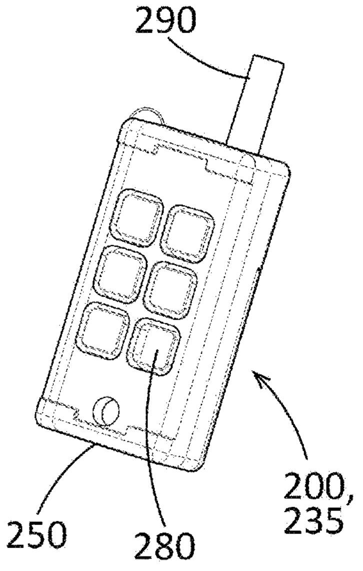
FIG. 2 is a front perspective view of a remote control of the drive of FIG. 1.

FIG. 2 is a front perspective view of a remote controller or remote control 200 of the drive 130 of FIG. 1. As shown and suggested by its name, the remote control 200 can form a secondary unit or portion 235 of the drive 130 and can be separate and distinct from a main portion 135 (shown in FIG. 1) of the drive 130. The remote control 200 can comprise a housing 250, user input surfaces 280 (e.g., buttons), an antenna 290, and internal circuitry comprising a signal transmitter (not shown). As shown, the remote control 200 can comprise six user input surfaces 280, which can be used to provide instructions to the main portion 135 of the drive 130. Various methods of remote communication including radio frequency (RF), infrared (IR), and even corded technologies, as well as wi-fi, Bluetooth technologies, and other near-field communication and wireless technologies can be used to communicate with the drive 130.

Figure 3:
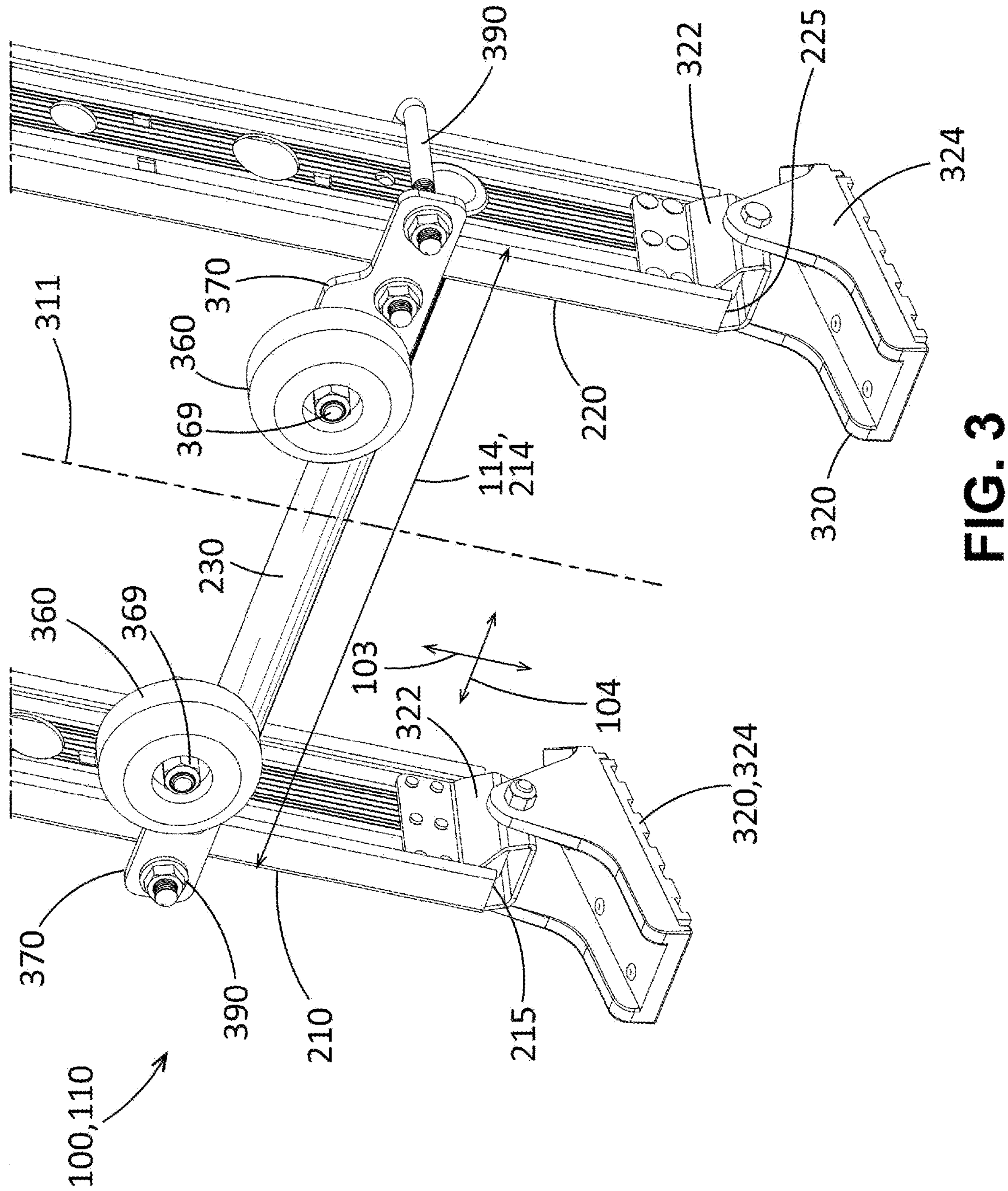
FIG. 3 is a detail front perspective view of a bottom end or first end of the track and, more generally, the material hoist system of FIG. 1 taken from detail 3 of FIG. 1.

FIG. 3 is a detail front perspective view of the bottom end or first end 115 (shown in FIG. 1) of the track 110 and, more generally, the material hoist system 100 of FIG. 1 taken from detail 3 of FIG. 1. The track 110 can comprise a first beam or rail 210 and a second beam or rail 220. Each of or either of the first rail 210 and the second rail 220 can define a respective first end 215,225 and a second end 216,226 (both shown in FIG. 4), which can be distal from the first end 215,225. As shown, the first rail 210 and the second rail 220 can be parallel to each other and to the longitudinal direction 103.

Each of the first rail 210 and the second rail 220 or individual rail segments thereof, such as in the case of multiple track members such as the track members 110*a,b*, (shown in FIG. 1) can define a length, which in some aspects can be at least 4 feet. In some aspects, the length of each of the first rail 210 and the second rail 220 and, more generally, the track 110 can be at least 8 feet. In some aspects, the length of each of the first rail 210 and the second rails 220 and, more generally, the track 110 can be at least 12 feet. Lengthening the track 110 by the further addition of track members can result in a length of up to 44 feet. In some aspects, each of the first rail 210 and the second rail 220 can be formed monolithically. In some aspects, including in the case of two or more track members 110*a,b*, each of the first rails 210 and the second rails 220 can be formed from multiple pieces or sections, e.g., by fastening or welding. In some aspects, the track 110 can define a lateral width or width 114, which can be at least 18 inches. In some aspects, a width 214 measured across the rails 210,220 in the lateral direction 104 can be 18 inches, plus or minus 6 inches.

The track 110 or a portion thereof can comprise a plurality of cross members or rungs 230, which can extend from the first rail 210 to the second rail 220. The plurality of rungs 230 can be spaced apart from each other and distributed along the length of the track 110. More specifically, each of or any of the rungs 230 can be secured to the first rail 210 or the second rail 220 by any useful fastening method such as mechanical crimping, welding, and/or separate fasteners. In some aspects, each of or any of the rungs 230 can be hollow. In some aspects, the track 110 or a portion thereof can comprise one or more braces or reinforcements 260 (shown in FIG. 1), which can help maintain an angle between one of the plurality of rungs 230 and the first rail 210 and between one of the plurality of rungs 230 and the second rail 220.

The track 110 can comprise one or more feet 320, More specifically, the track 110 can comprise a pair of feet 320, in which case a foot 320 can be coupled to the respective first ends 215,225 of the rails 210,220. Each of the feet 320 can comprise a mounting portion 322 and a foot portion 324. The track 110 can comprise bumpers or stops 360, each of which can be secured in a stationary position with a fastener 369 to mounting brackets 370 or directly to the rails 210,220. The mounting brackets 370, meanwhile, can be secured to the rails 210,220 with fasteners 390, which can be a bolt-nut combination as shown. More specifically, each of the fasteners 390 can comprise a U-bolt and two nuts. The stops 360 can, as their name suggests, facilitate stopping of the drive 130 and the carriage 120 when such are permitted to contact the stops 360 by the user or otherwise. The track 110 can define a centerline 311.

Figure 4:
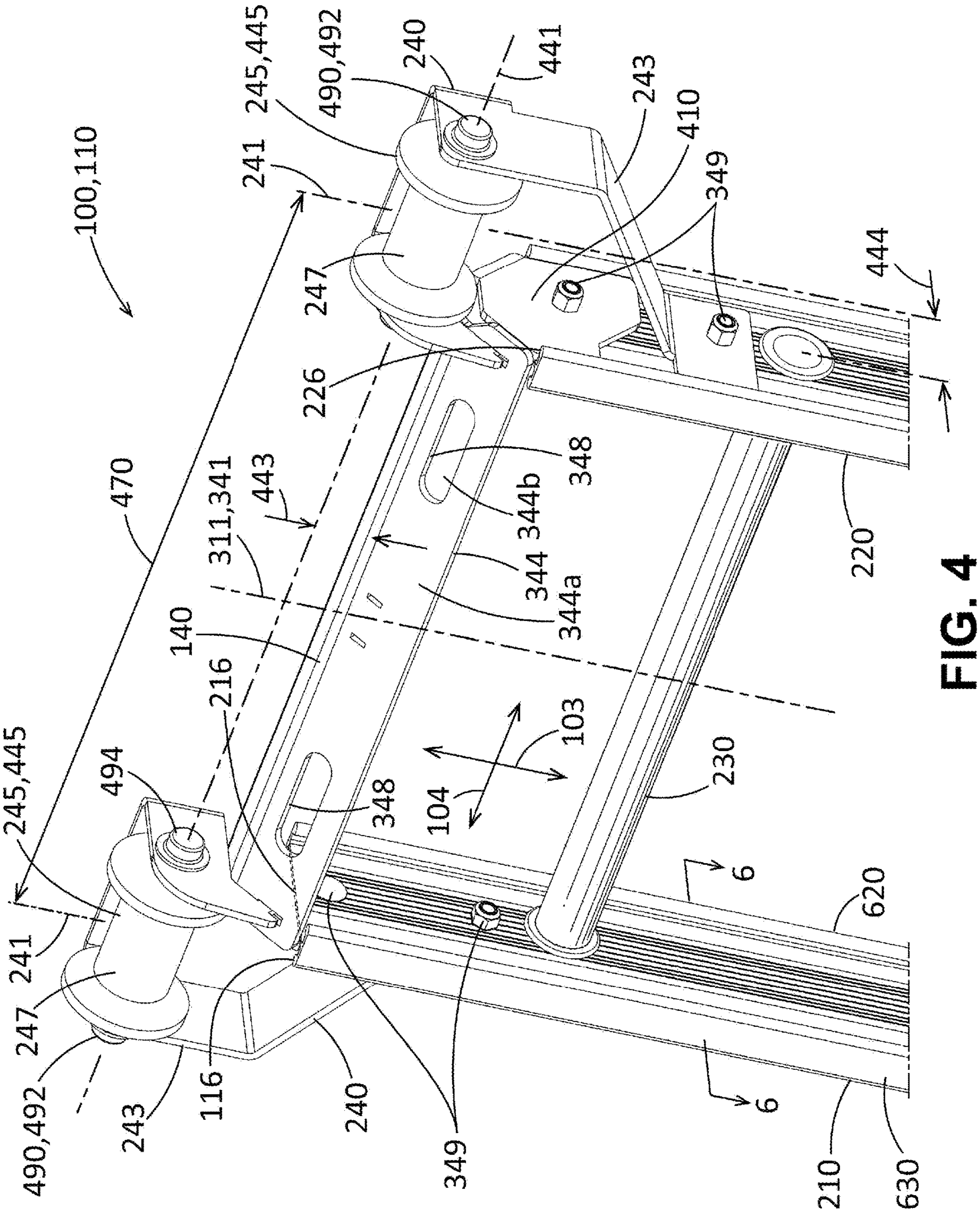
FIG. 4 is a detail front perspective view of a top end or second end of the track and, more generally, the material hoist system of FIG. 1 taken from detail 4 of FIG. 1.

FIG. 4 is a detail front perspective view of the top end 116 of the track 110 and, more generally, the material hoist system 100 of FIG. 1 taken from detail 4 of FIG. 1. Again, the track 110 can comprise the guide assembly 140, which can be secured to the top end 116 thereof. The guide assembly 140 can extend from the first rail 210 to the second rail 220. More specifically, the guide assembly 140 can be secured to each of the first rail 210 and the second rail 220 with one or more fasteners 349 such as, for example and without limitation, bolt-and-nut combinations. The base 344, which can comprise a first panel 344*a* and a second panel 344*b*, can define a non-planar shape in which the second panel 344*b* is angled with respect to the first panel 344*a*. Such a non-planar shape can increase the rigidity of the base 344 and its resistance against bending under load (e.g., loading of the guide 240 and impact loads during transport of the track 110). Each of or either of the panels 344*a,b* can be flat or planar except, for example, at an intersection therebetween. As shown, the base 344 and, more generally, the guide assembly 140 can define one or more openings 348, any of which can be used, directly or through one or more fasteners (not shown), to secure the flexible connecting element 150 (shown in FIG. 1).

The guide assembly 140 can comprise one or more guides 240, each of which can in some aspects comprise a rotating element 245 such as, for example and without limitation, a pulley. The rotating element 245 can have rotational symmetry. In some aspects, the guide 240 can define a surface 247, which can be stationary, across which a portion of the carriage 120 (shown in FIG. 1) can pass. Each of or either of the guides 240 can comprise a bracket 243, which can be coupled to each of or either of the rail 210,220 and a cap or base 344 of the guide assembly 140. In some aspects, the surface 247 or at least a portion thereof can be a cylindrical surface and can be flat in cross-section. In some aspects, the rotating element 245 can define a concave surface or a groove 445 in a radially outer surface, which can be sized and configured to receive a portion of the carriage 120 therein. The one or more guides 240 can be secured to the base 344. A contact portion of the surface 247 can be a portion of the surface 247 that is configured to receive the part to be supported.

The guide 240 can comprise one or more panels or flanges such as side flanges 410. Each of or any of the flanges 410 can be flat. In some aspects, as shown, the flanges 410 can define identical or substantially identical detail (where "substantially identical" means identical in all aspects materially affecting function). Each of or any of the flanges 410 and, more specifically, tabs thereof can be received within openings defined in the base 344. Such interaction between the tabs and the openings can fix a position of each of or any of the flanges in the lateral direction 104. The rotating element 245 and each of or any of the flanges 410, the brackets 243, and, more specifically, openings defined in one or more of each can be configured to receive one or more mounting fasteners 490 (e.g., a bolt and nut combination or a clevis pin and cotter pin combination). More specifically, the mounting fasteners 490 can comprise a first portion 492 (e.g., a bolt, as shown, or a clevis pin) and a second portion 494 (e.g., a nut, as shown, or a cotter pin). Any two or more of the aforementioned components of the guide assembly 140 can be aligned along a guide axis 441, which can be aligned with the lateral direction 104.

In some aspects, as shown, each guide 240 or each rotating element 245 or a centerline 241 thereof can be offset from the corresponding rail 210,220 such that the surface 247 of the rotating element 245 of each of or either of guides 240 can extend inwards from or outwards from the corresponding rail 210,220 with respect to a centerline 311 of the track 110 and can be offset with respect to the centerline 311 itself. In some aspects, the rotating element 245 can be aligned along a centerline 341 of the guide assembly 140 and, more generally, the centerline 311 of the track 110 along the lateral direction 104. More specifically, the guide axis 441 or another portion of the geometry of the guide 240 can be offset along the longitudinal direction 103 from an edge of the corresponding rail 210,220 by an offset distance 443. More specifically, the centerline 241 or another portion of the geometry of the guide 240 can be offset along the lateral direction 104 from an edge of the corresponding rail 210,220 by an offset distance 444. In some aspects, as shown, the centerlines 241 of respective left and right guides 240 can be spaced apart by a spacing 470.

Figure 5:
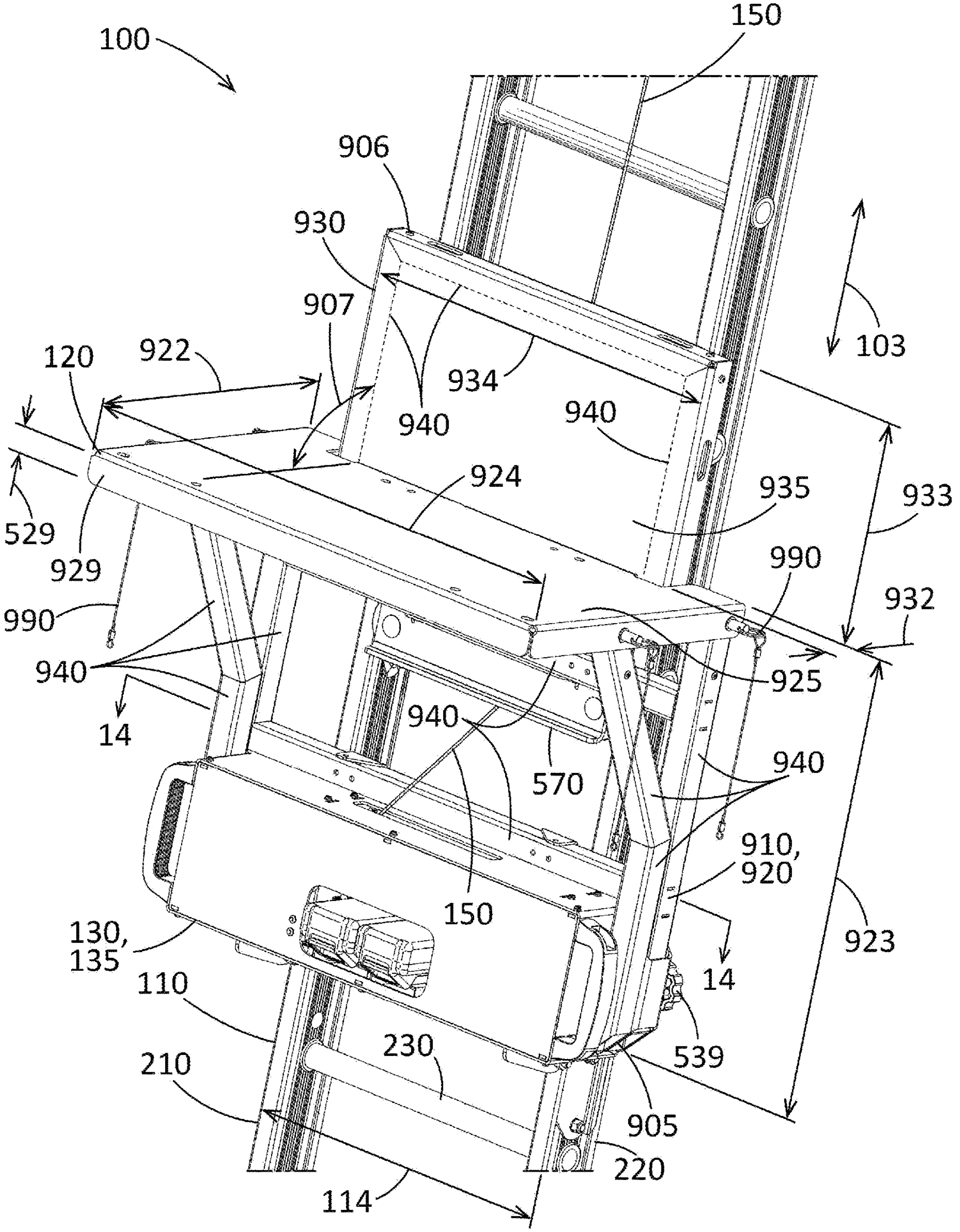
FIG. 5 is a detail front perspective view of a middle portion of the track and, more generally, the material hoist system of FIG. 1 taken from detail 5 of FIG. 1 showing the carriage and the drive of FIG. 1.

FIG. 5 is a detail front perspective view of a middle portion of the track 110 and, more generally, the material hoist system 100 of FIG. 1 taken from detail 5 of FIG. 1 showing the carriage 120 and the drive 130 of FIG. 1. The carriage 120 can comprise a frame 910 and can define a bottom end or first end 905 and a top end or second end 906. In some aspects, the frame 910 can comprise a first portion 920 and a second portion 930. In some aspects, the frame 910 can comprise only the first portion 920. The first portion 920 can be configured to slidably secure to a track member such as the track member 110*a* (shown in FIG. 1) of the track 110. The second portion 930 can be coupled to the first portion 920. The frame 910 and, more specifically, either of or both of the first portion 920 and the second portion 930 can be formed from separate frame members 940, which can be joined together in various geometric arrangements as shown, including in arrangements in which the frame members 940 (which can be, e.g., vertical and horizontal members or longitudinal and lateral members) are angled at 90 degrees with respect to each other. In some aspects, the frame members 940 can be joined by welding (e.g., the frame members 940 behind a support 935). In some aspects, the frame members 940 can be joined by fasteners. Each of or any of the frame members can be rectilinear as shown.

The first portion 920 of the frame 910 can define a depth 922, a longitudinal width 923, and a lateral width 924. Similarly, the second portion 930 of the frame 910 can define a depth 932, a longitudinal width 933, and a lateral width 934, with each described in reference to an orientation of the second portion 930 as shown. In some aspects, as shown, each of or either of the lateral widths 924,934 can be greater than the lateral width 114 of the track 110. In some aspects, each of or either of the lateral widths 924,934 can be less than the lateral width 114 of the track 110. In some aspects, each of or either of the lateral widths 924,934 can equal the lateral width 114 of the track 110. In some aspects, as shown, the lateral width 934 can be less than the lateral width 924. In some aspects, the lateral width 934 can be greater than the lateral width 924. In some aspects, the lateral width 934 can be equal to the lateral width 924. In some aspects, the lateral width 934 of the second portion 930 can sufficiently match the spacing 470 (shown in FIG. 4) between a pair of guides 240 (shown in FIG. 4) of the guide assembly 140 (shown in FIG. 4) such that upon lifting of the carriage 120 up the track 110 the second portion 930, including any frame members 940 proximate to the guides 240, can contact the guides 240. More specifically, the lateral width 934 of the second portion 930 can sufficiently match the spacing 470 such that the second portion 930 can contact a surface and, more specifically, a contact portion of the surface 247 (shown in FIG. 4) of the rotating elements 245 (shown in FIG. 4) of the guides 240 (shown in FIG. 4).

The second portion 930 can be a guard or rim and can protect items on the first portion 920 and, more specifically, the support 925 from falling from the carriage, including through openings in the track 110, or from otherwise interfering with operation of the system 100. In some aspects, the carriage 120 can comprise a rim at other edges of the first portion 920. Each of or either of the first portion 920 and the second portion 930 can define a vertical edge 929 defining a thickness 529 through which one or more fasteners 990 can engage.

In some aspects, the second portion 930 can be angled—or can be configured to be angled—with respect to the first portion 920 by an angle 907, which can help a user more conveniently place and optionally secure the load 80 (shown in FIG. 32) placed on the carriage 120. To help support the load 80, each of or either of the first portion 920 or the second portion 930 can comprise a panel and/or can define a surface. As shown, for example and without limitation, the first portion 920 can comprise a support 925 (e.g., a horizontal support or shelf support), and the second portion 930 can comprise the support 935 (e.g., a vertical support or back support). In some aspects, as shown, each of or either of the supports 925,935 can be formed from a solid material. In some aspects, each of or either of the supports 925,935 can define openings (e.g., to save weight or to secure the load 80). As shown, one or more frame members 940 of the frame 910 can be received within and can support the supports 925,935. In some aspects, each of or either of the supports 925,935 can be formed by the frame members 940 or other structures and need not comprise a separate component.

Figure 15:
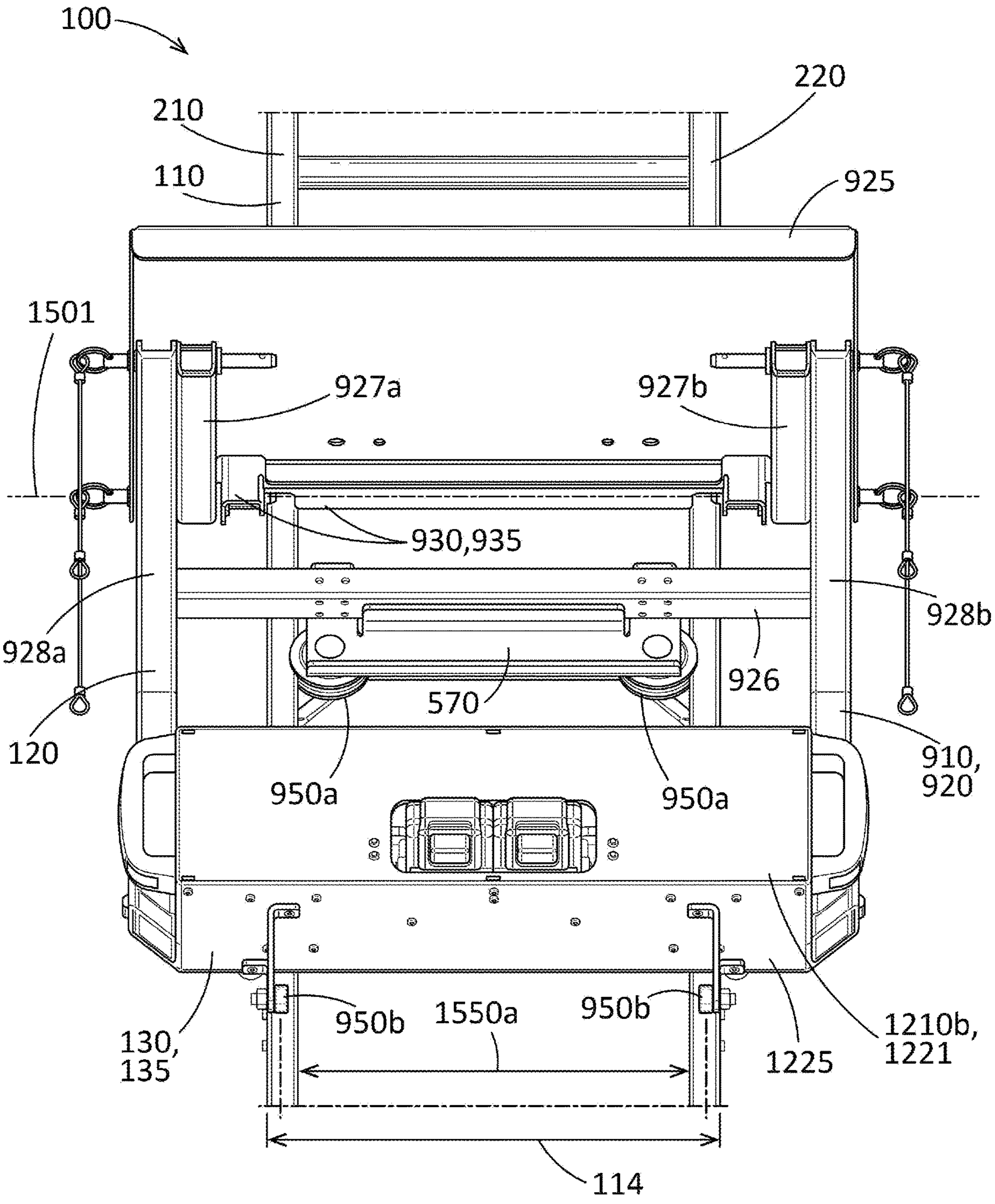
FIG. 15 is a front bottom perspective view of the material hoist system of FIG. 1 showing an interface between the track and the drive.

As shown, the second portion 930 can be coupled to the first portion 920 along a single axis such as, for example and without limitation, an axis 1501 shown in FIG. 15. More specifically, the only support for the second portion 930 maintaining its position can be the track 110. Accordingly, as is explained below with respect to FIGS. 32 and 33, the second portion 930 can be configured to change position—and the angle 907 change—upon lifting of the carriage 120 to the top of the track 110 beyond where the track 110 can support the second portion 930. The second portion 930 can be configured to automatically rotate with respect to the first portion 920 depending on a position of the carriage 120 on the track 110.

The one or more fasteners 990 can couple portions of the carriage 120 to each other. In some aspects, the fasteners 990 can couple portions of the first portion 920 or the second portion 930 to itself. In some aspects, the fasteners 990 can couple the second portion 930 to the first portion 920. In some aspects, the fasteners 990 can couple the supports 925,935 to the respective first portion 920 and the second portion 930. In some aspects, the fasteners 990 can couple the drive 130 to the carriage 120 (e.g., with a fastener 539, which can comprise a knob or other hand-tightenable fastener interface). In some aspects, each of the fasteners 990 can be quick-release fasteners (i.e., a fastener not requiring a tool other than a user's hand to engage or disengage). In some aspects, each of the fasteners 990 can be any other connecting element such as, for example and without limitation, a bolt-and-nut combination. Use of the fasteners 990 can facilitate disassembly of the frame 910 and, more generally, the carriage 120 during storage and/or transport of the carriage 120. In some aspects, the frame 910 and, more generally, the carriage 120 can be collapsed or folded into a smaller space after partial or full disassembly.

The carriage 120 can comprise a lower guide assembly 570, which can be or can comprise a pulley assembly. The lower guide assembly 570 can facilitate passage of the flexible connecting element 150 through and/or away from the carriage 120.

Figure 6:
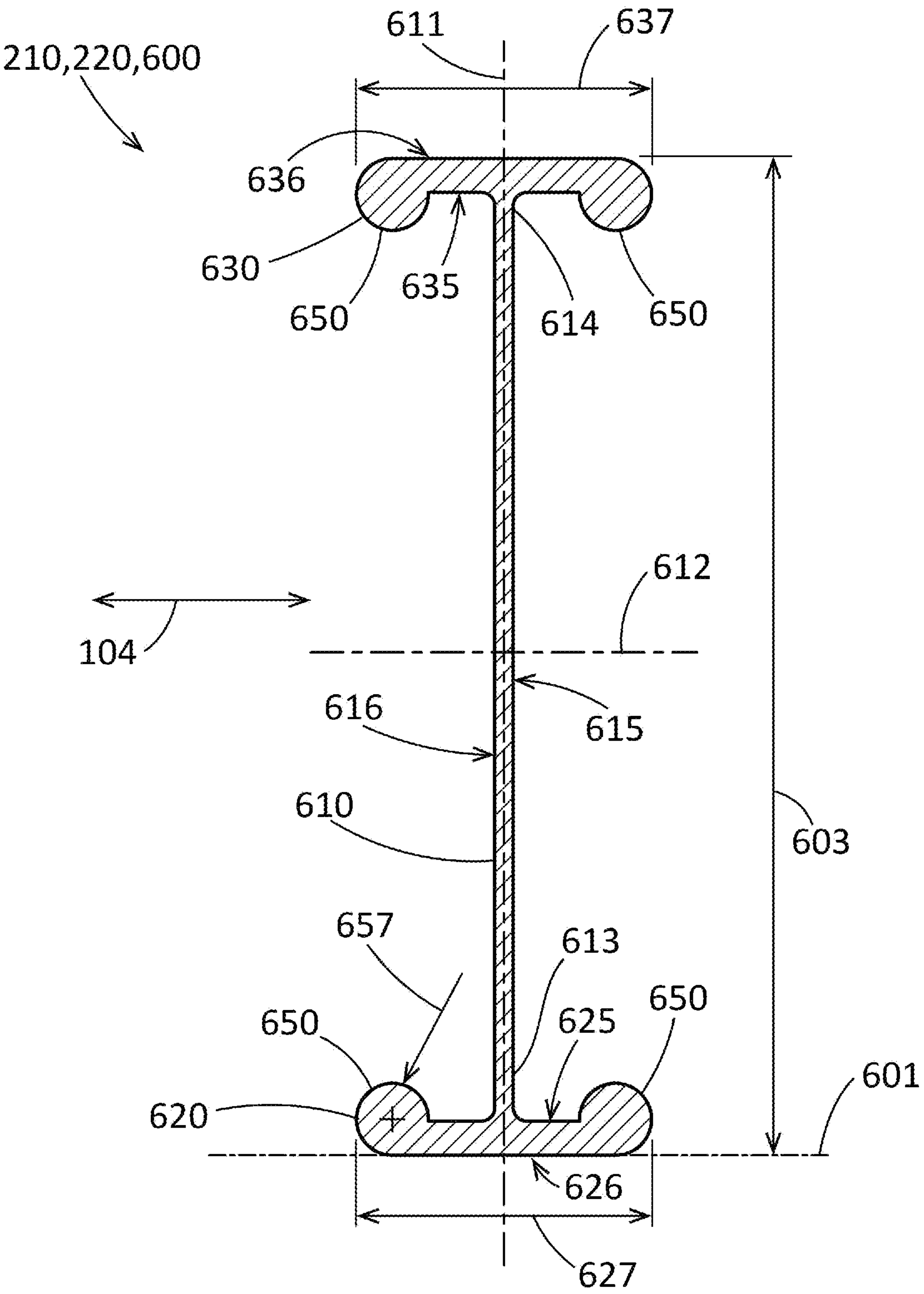
FIG. 6 is a sectional view of a rail of the track of FIG. 5 taken along line 6-6 of FIG. 4.

FIG. 6 is a sectional view of a rail 210,220 of the track 110 of FIG. 1 taken along line 6-6 of FIG. 4. Each of or either of the rails 210,220 can comprise a rail body 600. In some aspects, as shown, the rail body 600 can be or can define an I-beam or I-shaped beam. The rail body 600 can comprise a main member or web 610, which can define a vertical centerline 611 and can define a first edge 613 and a second edge 614 distal from the first edge 613. The rail body 600 can comprise a first flange 620, which can intersect or extend from the first edge 613 of the web 610. The rail body 600 can comprise a second flange 630, which can intersect or extend from the second edge 614 of the web 610. Each of or either of the flanges 620,630 can extend beyond the web 610 in the lateral direction 104 and can define flange widths 627,637. The rail body 600 can define an overall height 603. Each of or either of the flanges 620,630 can define bulbous portions or enlarged portions 650, each of which can define a radius 657. The web 610 can define an inboard surface 615 and an outboard surface 616. Either or each of the flanges 620,630 can define an inner surface 625,635 and an outer surface 626,636. The rail body 600 can define a track front surface datum 601, which can represent a datum plane in which the outer surface 626 lies.

In some aspects, as shown, the rail body 600 can be symmetric about the vertical centerline 611. In some aspects, as shown, the rail body 600 can be symmetric about a transverse centerline 612. In some aspects, as shown, the rail body 600 can be symmetric about both of the centerlines 611,612. In some aspects, the rail body 600 need not display any symmetry. In some aspects, the rail body 600 can define a T-beam or T-shaped beam, in which case a single flange 620 can extend from the first edge 613 or the second edge 614 of the web 610. In some aspects, the rail body 600 can define a C-beam or C-shaped beam or C-channel. More generally, each of or either of the rails 210,220 can define a constant cross-section from the bottom end 115 (shown in FIG. 1) to the top end 116 (shown in FIG. 1) not counting openings defined therein for receiving components such as, for example and without limitation, the rungs 230 or fasteners and, more generally, not counting modifications made after fabrication of the first rail 210 and the second rail 220.

Figure 7A:
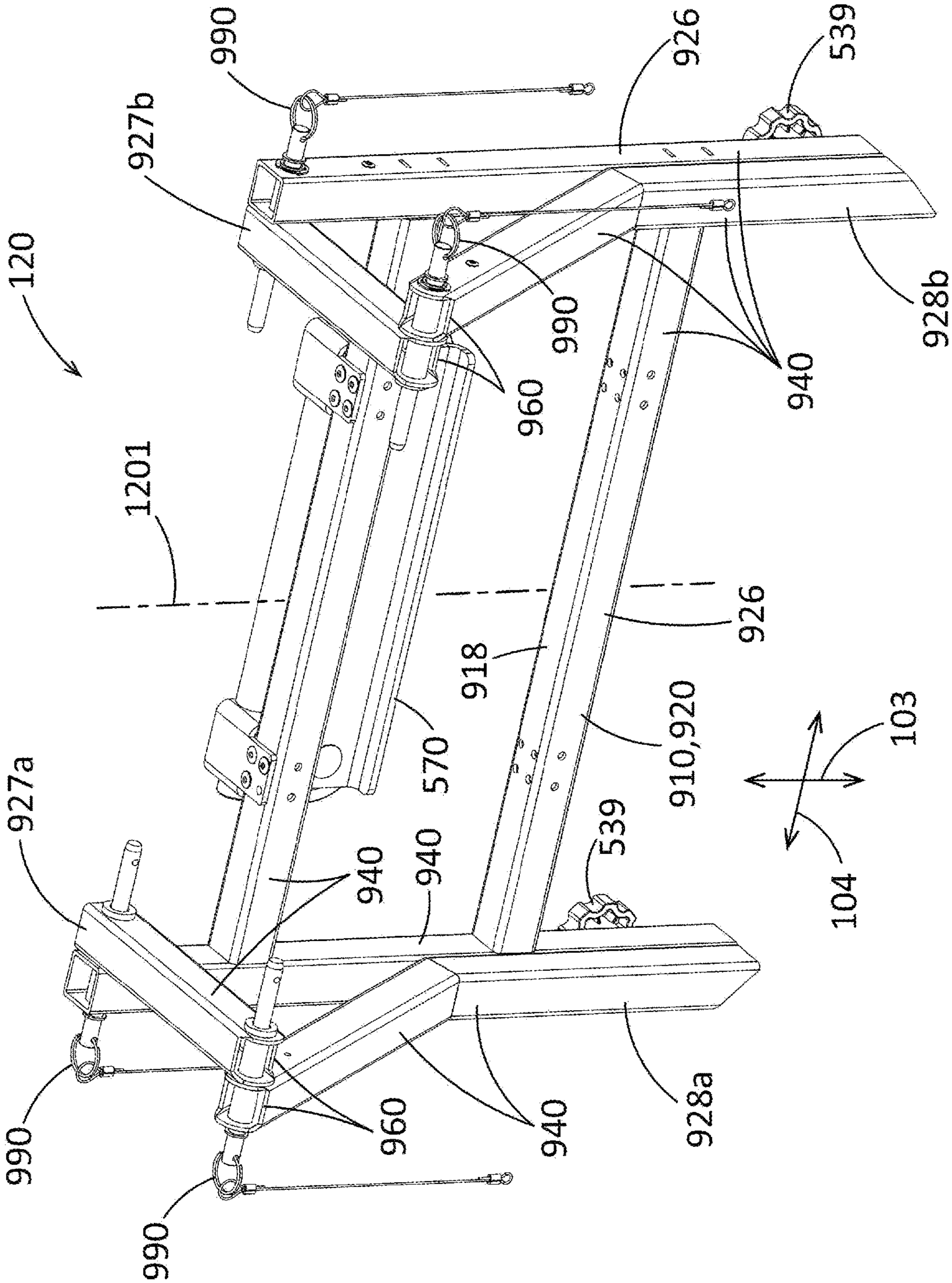
FIG. 7A is a front top perspective view of a portion of the carriage of FIG. 1, showing panels removed.

FIGS. 7A-7D are various views of a portion of the carriage 120 of FIG. 1, showing the second portion 930 (shown in FIG. 5) and the supports 925,935 (shown in FIG. 5) removed for clarity. FIG. 7A is specifically a front top perspective view of such a portion of the carriage 120. The first portion 920 can comprise a base 926. In some aspects, the base 926 can be formed as a rectangular frame and can comprise a plurality of the frame members 940.

Figure 7B:
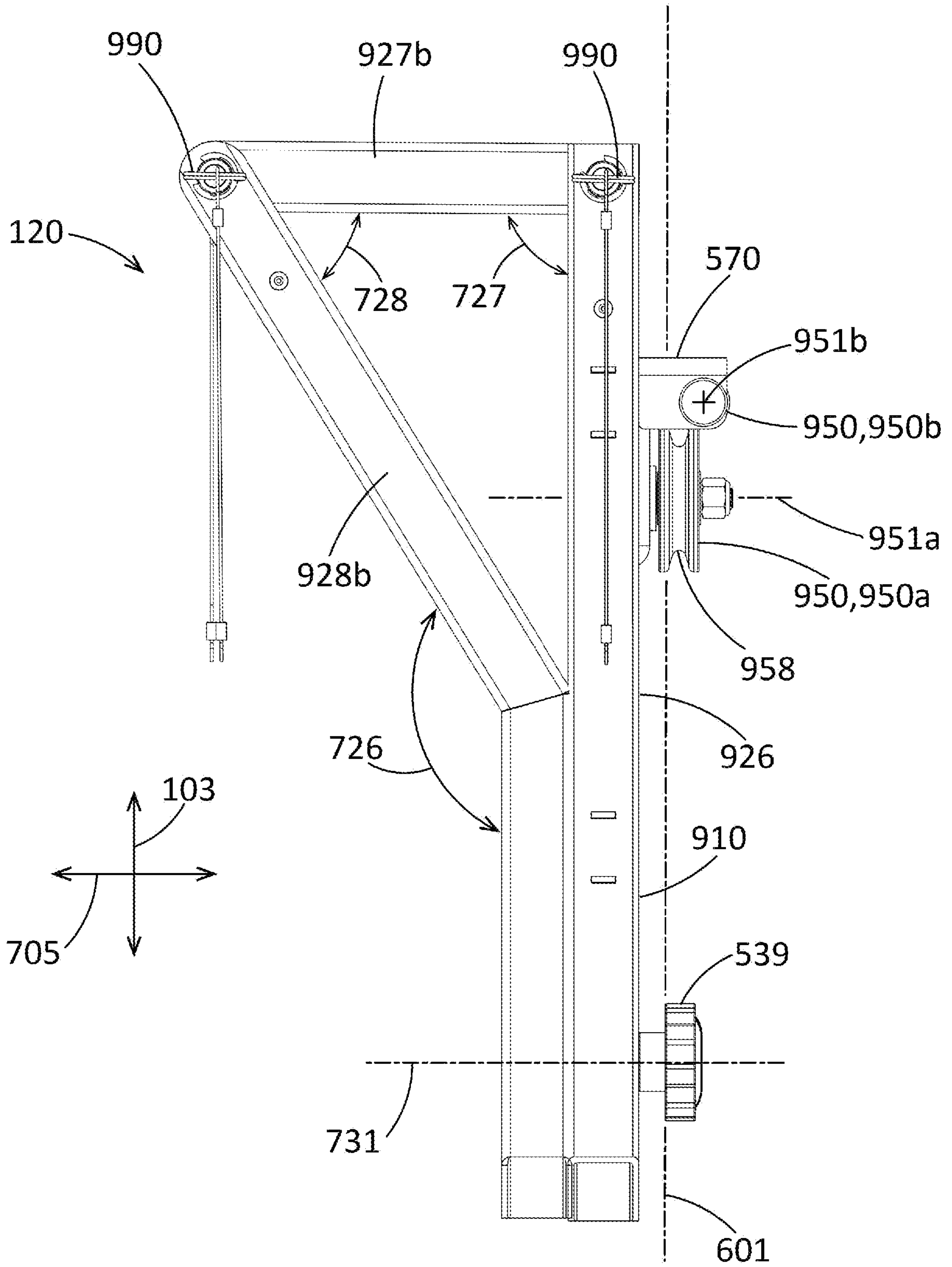
FIG. 7B is a side view of the portion of the carriage shown in FIG. 7A.

The first portion 920 can comprise first legs 927*a,b*, (shown in FIG. 7B) which can be joined to the base 926, can extend from the base 926, and can be angled with respect to the base 926 by an angle 727 (shown in FIG. 7B). As shown, the angle 727 can be 90 degrees. As such, in some aspects, the first portion 920 of the frame 910 can, at least in part, define a upside-down L-shape when viewed along the lateral direction 104. The first portion 920 can further comprise second legs 928*a,b*, which can be joined to the respective first legs 927*a,b*, can extend from the respective first legs 927*a,b*, and can be angled with respect to the respective first legs 927*a,b* by an angle 728 (shown in FIG. 7B), at least at an intersection between the first legs 927*a,b* and the second legs 928*a,b* (shown in FIG. 7B). As shown, the angle 728 can be between 45 and 90 degrees. In some aspects, as shown, the angle 728 can be 60 degrees, plus or minus 5 degrees. In some aspects, the second legs 928*a,b* can comprise two frame members 940 joined together. In some aspects, the second legs 928*a,b* can comprise a single frame member 940 bent into the desired shape. More specifically, each of or either of the second legs 928*a,b* can comprise a first portion and a second portion angled with respect to the first portion. As shown, the second portion can be angled at an angle 726 (shown in FIG. 7B). The second portion of the second legs 928*a,b* can be parallel to the base 926 and perpendicular to the first legs 927*a,b*. Each of the fasteners

539 can extend through each of or either of the base 926 and the corresponding second legs 928*a,b* along an axis 731 (shown in FIG. 7B).

Either of or each of the first portion 920 and the second portion 930 (shown in FIG. 5) can define one or more lugs 960, each of or any of which can facilitate joining of the second portion 930 to the first portion 920. In some aspects, as shown, each of or any of the lugs 960 can be formed monolithically as part of another component such as one of the frame members 940. In some aspects, each of or any of the lugs 960 can be formed as a separate component and joined with a fastener and/or welding. Each of or any of various fastened joints between separate portions of the frame 910 and, more generally, the carriage 120, including at the lugs 960, can comprise or define a hinge at which location the separate portions can rotate with respect to one another.

The frame 910 and, more specifically, the first portion 920 thereof can define an opening 918, which can receive or at least allow passage of the flexible connecting element 150 (shown in FIG. 1) from the drive 130 (shown in FIG. 1) to a stationary portion of the ladder such as the guide assembly 140 (shown in FIG. 1) at the top end 116 (shown in FIG. 1) of the track 110 (shown in FIG. 1). The carriage 120 and any one or more portions thereof (e.g., the frame 910) can be symmetric about a centerline 1201 (shown in FIG. 7A) of the carriage 120 that can be aligned with the longitudinal direction 103.

FIG. 7B is a side view of the portion of the carriage 120 shown in FIG. 7A. The frame 910 and, more specifically, the first portion 920 thereof can define features that can be sized and configured to be received within the track 110 or, more specifically, in a space defined between the rails 210,220 (shown in FIG. 5). For example and without limitation, the lower guide assembly 570 can cross the track front surface datum 601 and for at least that reason be sized to be received with the space defined between the rails 210,220.

Each of or either of the carriage 120 and the drive 130 (shown in FIG. 13) can comprise a plurality of rotating elements or moving elements 950. In some aspects, each of or any of the moving elements 950 can be secured to the frame 910 and, more specifically, the lower guide assembly 570 thereof. Each of or any of the plurality of moving elements 950 can be a rotating element. Each of or any of the plurality of moving elements 950 can be secured to a surrounding structure with a fastener 959 (shown in FIG. 7C).

Figure 9A:
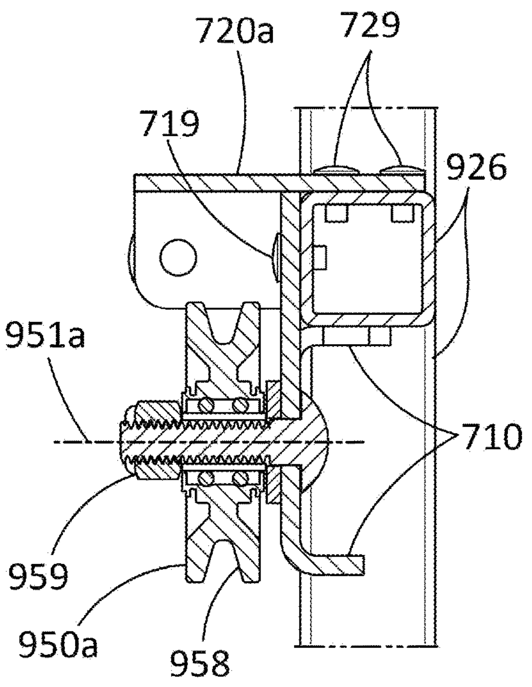
FIG. 9A is a sectional view of the lower guide assembly of FIG. 8 taken along line 9A-9A of FIG. 8.

Each of one or more moving elements 950*a* of the moving elements 950 can be secured to an outer portion of the lower guide assembly 570 and can be configured to engage an inward-facing portion of the first flange 620 (shown in FIG. 15) of each of the rails 210,220. An axis of each of or any of the plurality of moving elements 950 such as, for example and without limitation, the moving elements 950*a* can be aligned with a protrusion or extension direction 705 of the carriage 120 that is perpendicular to each of the longitudinal direction 103 and the lateral direction 104 (shown in FIG. 7A). Each of or any of the moving elements 950*a* can define a groove 958. As shown in FIG. 9A, each of or any of the moving elements 950*a* can comprise a bearing, which can be one of a ball bearing and a roller bearing and can thereby smooth operation of the moving elements 950*a*. Each of the moving elements 950*a* can rotate about an axis 951*a*. More specifically, each of or any of the moving elements 950*a* can comprise or can be a pulley.

Each of one or more moving elements 950*b* of the moving elements 950 can be secured to an outer portion of the lower guide assembly 570 and can also be configured to engage a rearward-facing portion of the first flange 620 of the rails 210,220. An axis of each of or any of the plurality of moving elements 950 such as, for example and without limitation, the moving elements 950*b* can be aligned with the lateral direction 104. Each of or any of the moving elements 950*b* can define a cylindrical outer surface. Each of or any of the moving elements 950*b* can comprise a bearing or bearing assembly, which can be or can comprise one of a bushing, a ball bearing, and a roller bearing and can thereby smooth operation of the moving elements 950*b*. Each of the moving elements 950*b* can rotate about an axis 951*b*. More specifically, each of the moving elements 950*b* can comprise or can be a cam follower.

Figure 7C:
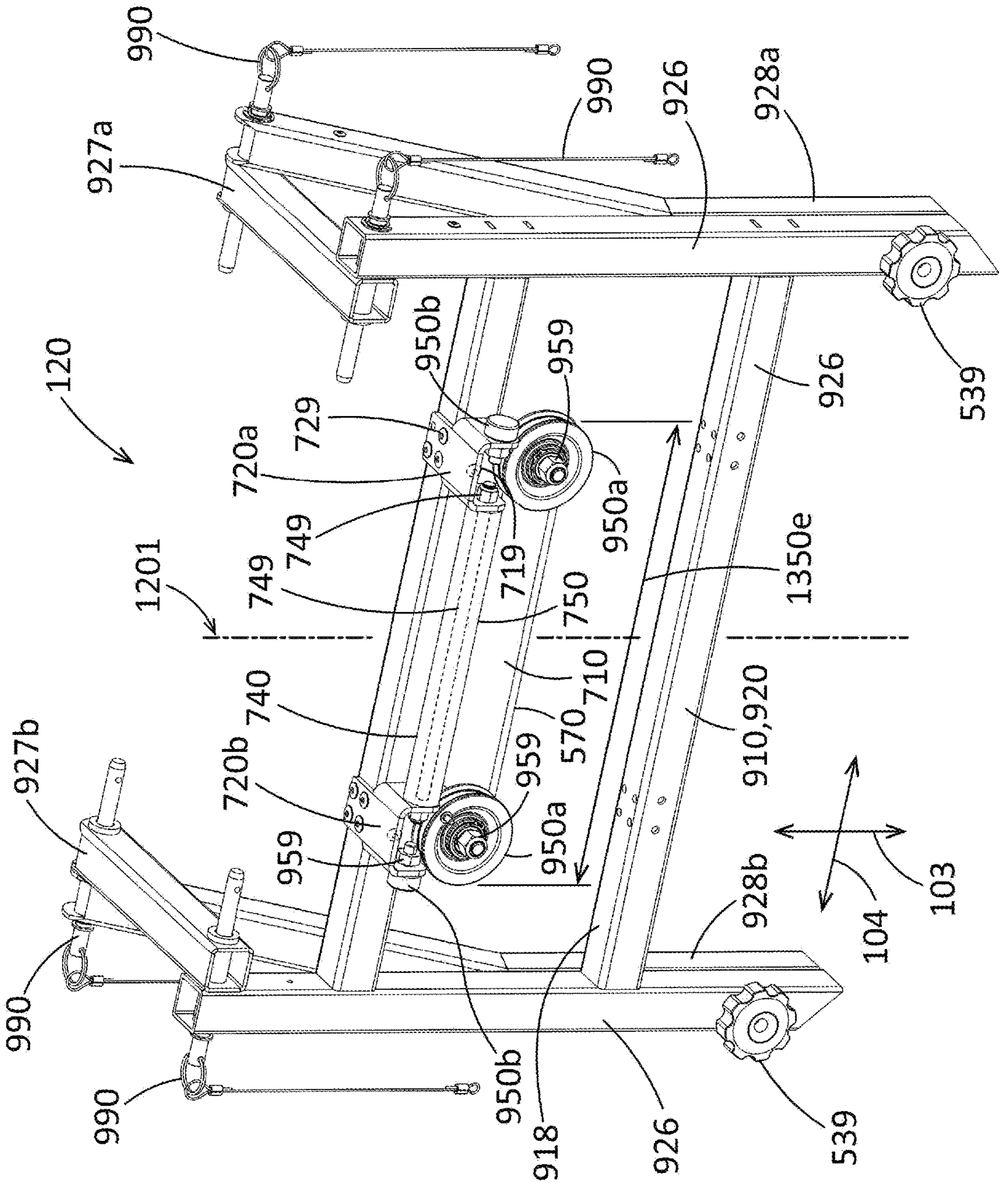
FIG. 7C is a rear top perspective view of the portion of the carriage shown in FIG. 7A.

FIG. 7C is a rear top perspective view of the portion of the carriage 120 shown in FIG. 7A. The lower guide assembly 570 can comprise a first mounting bracket 710, which can be secured to the base 926 with fasteners 719. The lower guide assembly 570 can comprise one or more second mounting brackets such as the pair of second mounting brackets 720*a,b* shown, each of or either of which can be secured to the base 926 with fasteners 729. The lower guide assembly 570 can comprise a lower guide 740, which can be or can comprise a roller. The lower guide 740 can comprise a body 750, which can be a hollow shaft and can define a cylindrical outer surface and can define a smooth surface. A length of the body 750 along an axis 751 (shown in FIG. 9B) defined by the body 750, which can also be aligned along the lateral direction 104, can be equal to or less than a length in the same direction of an opening 1218 (shown in FIG. 12) in the main portion 135 (shown in FIG. 5) of the drive 130 through which the flexible connecting element 150 passes. As shown, the lower guide 740 can comprise one or more bearings or bearing assemblies, which can be or can comprise one of a bushing, a ball bearing, and a roller bearing, and can thereby smooth operation of the lower guide 740. The lower guide 740 can be secured to and can extend between the second mounting brackets 720*a,b*.

The lower guide 740 can be secured with one or more fasteners 749. In some aspects, as shown, the one or more fasteners 749 can comprise a threaded rod and two nuts engaged with the ends of the threaded rod, the entirety of which need not be threaded. In some aspects, the one or more fasteners 749 can comprise non-threaded fastener or fastener combinations such as, for example and without limitation, a clevis pin secured in position with two cotter pins at each end of the clevis pin. A portion of the one or more fasteners 749 such as, for example and without limitation, the threaded rod can be received within and can even extend completely through the body 750 and thereby maintain a position of the lower guide 740 even when loaded by the flexible connecting element 150 as shown in FIG. 9B.

Figure 7D:
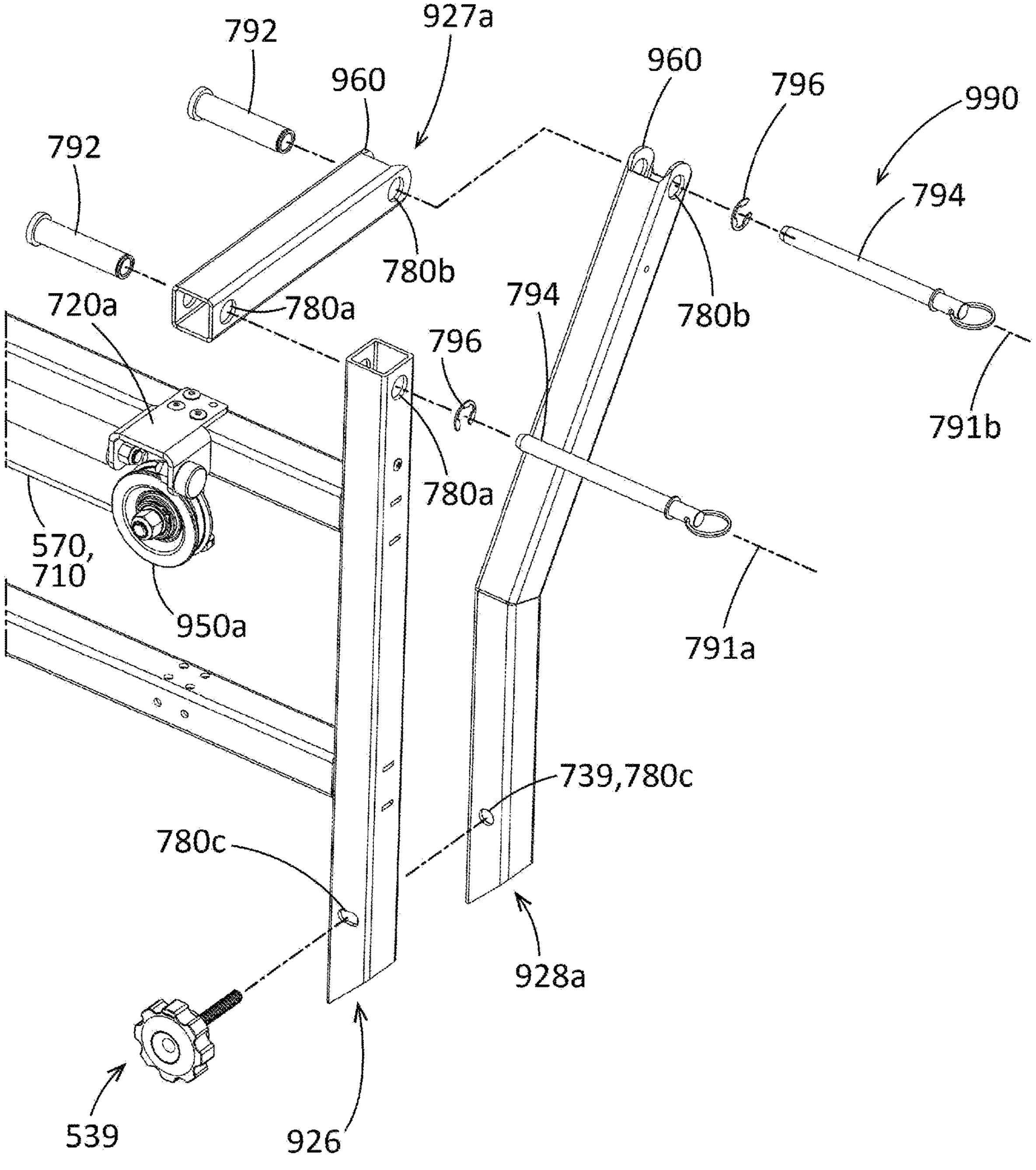
FIG. 7D is a detail rear top perspective view of a portion of the carriage shown in FIG. 7A.

FIG. 7D is a detail rear top perspective view of the portion of the carriage 120 shown in FIG. 7A. At various connections between the frame members 940 (shown in FIG. 7A) of the frame 910, the fasteners 990 (shown in FIG. 7A) can in some aspects comprise a bushing or insert 792 and a pin 794. The pin 794 can be a locking pin such as, for example and without limitation, a clevis pin and cotter pin combination or, as shown, a ball-lock pin with a spring-loaded ball received within the pin proximate to a tip thereof. At a connection between the base 926 and the exemplary first leg 927*a*, the insert 792 can be installed along a first axis 791*a* through mounting openings 780*a* defined in the base 926 and the first leg 927*a*. The insert 792 can be secured with a retaining fastener 796 (e.g., a retaining clip), and the pin 794 can then be inserted into and through the corresponding insert 792 until it is sufficiently engaged, which can be by a ball bearing in a tip of the pin 794 distal from an end held by the user, friction, or another structure or method. At a connection between the first leg 927*a* and the exemplary second leg 928*a*, the insert 792 can be installed along a second axis 791*b* through mounting openings 780*b* defined in the base 926 and the first leg 927*a*, the insert 792 can be secured with the corresponding retaining fastener 796 (e.g., a retaining clip), and the pin 794 can be inserted into and through the corresponding insert 792 until it is sufficiently engaged, which again can be by a ball bearing in a tip of the pin 794 distal from an end held by the user, friction, or another structure or method. The fastener 539 can be engaged through mounting openings 780*c* defined in the base 926 and the second leg 928*a*. In some aspects, the fastener 539 can engage and be secured in a threaded insert 739, which can be installed within the second leg 928*a*.

Figure 8:
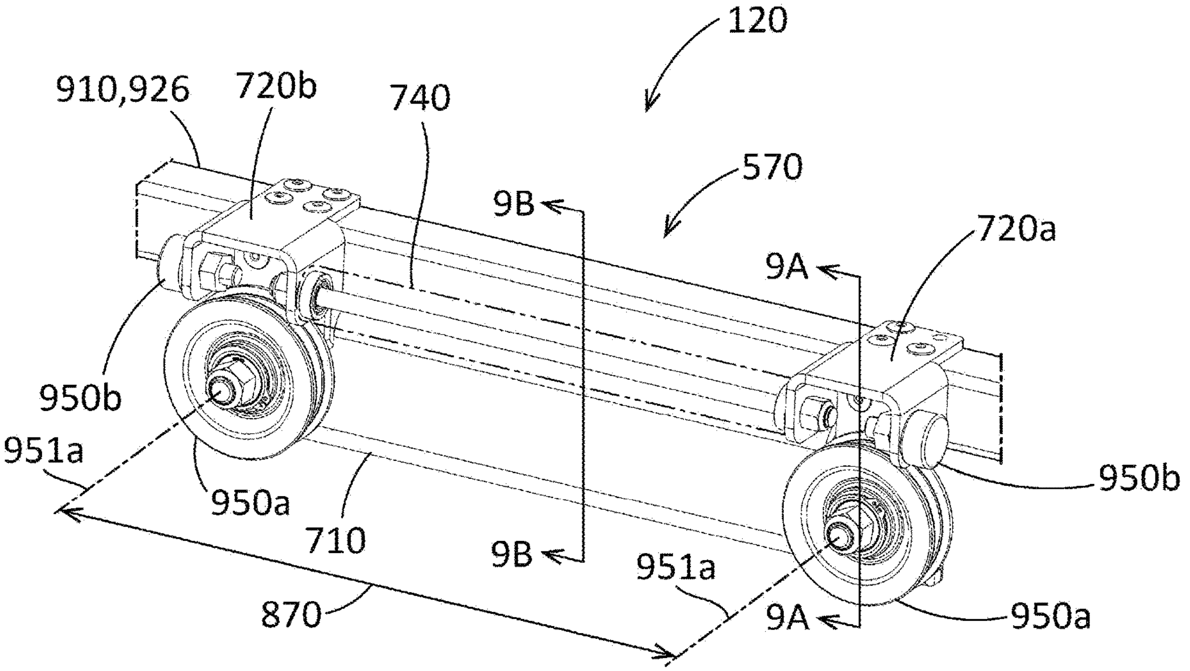
FIG. 8 is a detail rear top perspective view of a lower guide assembly of the carriage of FIG. 1.

FIG. 8 is a detail rear top perspective view of the lower guide assembly 570 of the carriage 120 of FIG. 1. A spacing 870 between the axes 951*a* of the moving elements 950*a* can be such that the carriage 120 and, more specifically, the frame 910 thereof must be angled with respect to the lateral direction 104 of the system 100 (shown in FIG. 1) to be receivable within a space between the rails 210,220 (shown in FIG. 5) of the track 110 (shown in FIG. 5).

Figure 9B:
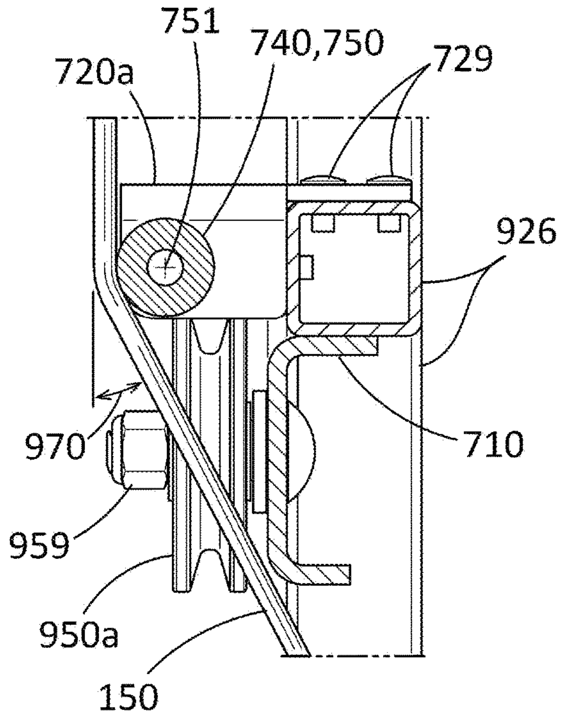
FIG. 9B is a sectional view of the lower guide assembly of FIG. 8 taken along line 9B-9B of FIG. 8.

FIG. 9A is a sectional view of the lower guide assembly 570 of FIG. 8 taken along line 9A-9A of FIG. 8, and FIG. 9B is a sectional view of the lower guide assembly 570 of FIG. 8 taken along line 9B-9B of FIG. 8. In some aspects, as shown, an angle 970 between a portion of the flexible connecting element 150 extending between the main portion 135 (shown in FIG. 1) of the drive 130 (shown in FIG. 1) can measure between zero and 90 degrees. In some aspects, as shown, the angle 970 can measure between zero and 45 degrees. In some aspects, as shown, the angle 970 can measure between 30 and 45 degrees.

Again, each of or any of the moving elements 950 or 950*a,b* can comprise a bearing or bearing assembly inside of hub of the corresponding moving elements 950 or 950*a,b*. As shown, the bearing assembly can comprise ball bearings, which can be lubricated with a lubricating fluid (not shown) sealed within the bearing assembly with seals. The bearing assembly can further comprise an inner race and an outer race. In some aspects, the bearing assembly can comprise another type of bearings, e.g., roller bearings. The hub can define a hub bore, which can be sized to receive the fastener 959.

Figure 10:
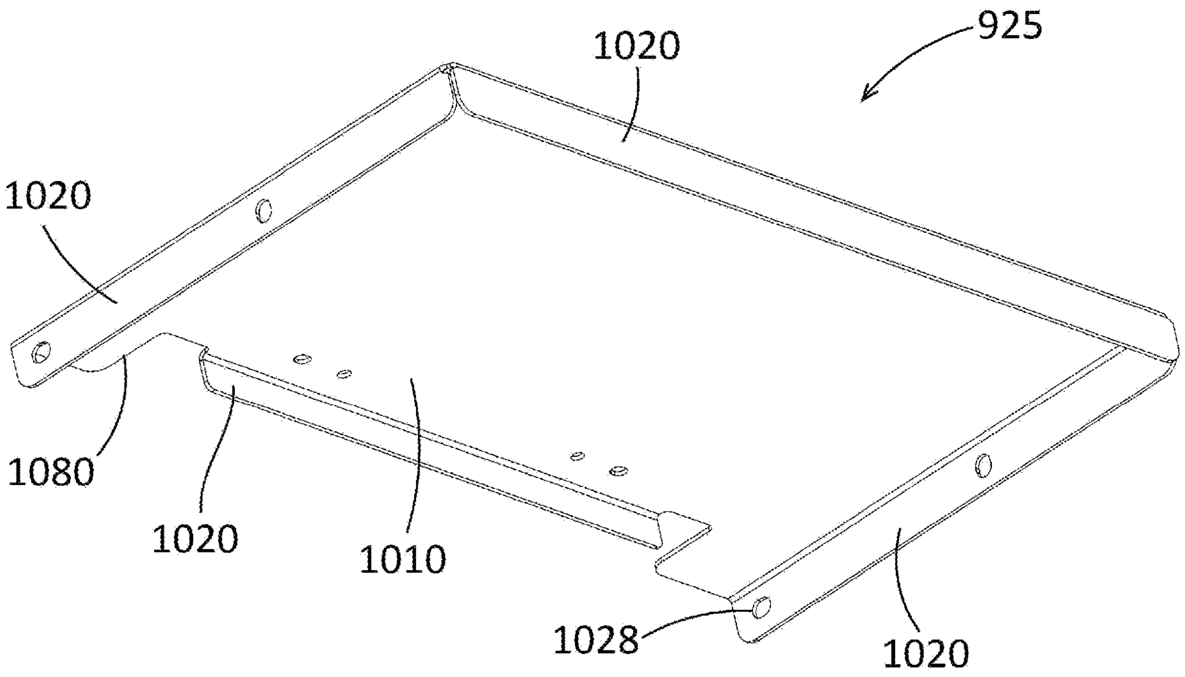
FIG. 10 is a bottom perspective view of a support of a first portion of the carriage of FIG. 1.

FIG. 10 is a bottom perspective view of the support 925 of the first portion 920 of the carriage 120 of FIG. 1. The support 925 can comprise a main panel 1010. The main panel 1010 can define four ends. The support 925 can comprise one or more flanges 1020. Each of or any of the one or more of the flanges 1020 can extend from each end of the main panel 1010. Each of or any of the one or more of the flanges 1020 can be angled with respect to the main panel 1010. Each of or any of the flanges 1020 can define one or more openings 1028. The support 925 can define a notch 1080 in a rear end. The notch 1080 can be sized to receive a portion of the support 935.

Figure 11:
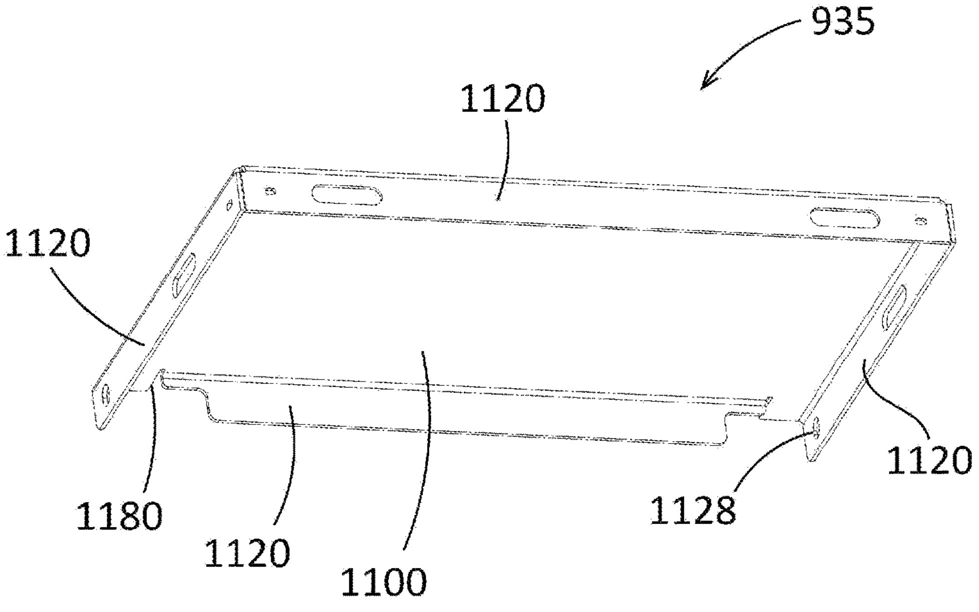
FIG. 11 is a bottom perspective view of a support of a second portion of the carriage of FIG. 1.

FIG. 11 is a bottom perspective view of the support 935 of the second portion 930 of the carriage 120 of FIG. 1. The support 935 can comprise a main panel 1100. The main panel 1100 can define four ends. The support 935 can comprise one or more flanges 1120. Each of or any of the one or more of the flanges 1120 can extend from each end of the main panel 1100. Each of or any of the one or more of the flanges 1120 can be angled with respect to the main panel 1100. Each of or any of the flanges 1120 can define one or more openings 1128. The support 935 can define a notch 1180 in a rear end. The notch 1180 can be sized to receive a portion of the track 110 (shown in FIG. 1).

Figure 12:
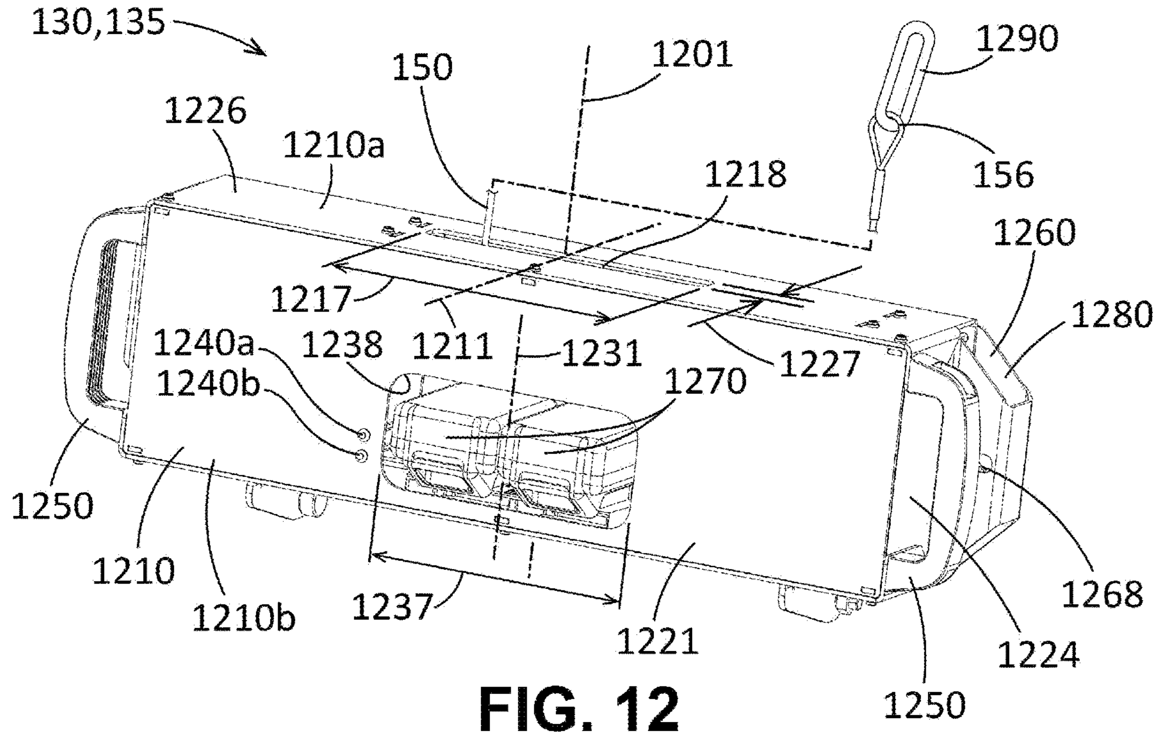
FIG. 12 is a front top perspective view of the drive of FIG. 1 showing a flexible connecting element at least partially unwound from the drive and extending therefrom.

FIG. 12 is a front top perspective view of the drive 130 of FIG. 1 showing the flexible connecting element 150 at least partially unwound from the drive 130 and extending therefrom. The flexible connecting element 150 can comprise a first end 155 (shown in FIG. 20) and a second end 156. The second end 156 can be formed into an eye. A fastener 1290 can be fastened to the second end 156. The fastener 1290 can be or can comprise a closed or open or openable fasteners such as, for example and without limitation, a carabiner, a spring clip, an eye bolt, and a J-hook. The flexible connecting element 150 can be secured, either directly or through the fastener 1290, to a stationary portion of the track 110 (shown in FIG. 1) such as, for example and without limitation, the guide assembly 140 (shown in FIG. 1). In some aspects, a minimum width or diameter of the second end 156 and/or the fastener 1290 will be greater than an opening width 1227 of the opening 1218 and thereby prevent loss of the second end 156 of the flexible connecting element 150 inside a housing 1210 of the drive 130. In some aspects, a stop collar (not shown), which can define a washer shape defining an overall diameter that is greater than the opening width 1227, can prevent loss of the second end 156 inside the housing 1210. In some aspects, the stop collar can be of any shape.

The main portion 135 and, more generally, the drive 130 can comprise the housing 1210, which can be configured to be slidably couple to the track 110 (shown in FIG. 1) of the system 100 (shown in FIG. 1). The housing 1210 can define a front end 1221, a rear end 1222 (shown in FIG. 13), a left side end or first side end 1223 (shown in FIG. 13), and a right side end or second side end 1224, a bottom end 1225 (shown in FIG. 13), and a top end 1226. In some aspects, the housing 1210 can define the overall shape of a rectangular prism or substantially define such an overall shape. More specifically, the ends 1221,1222 can be parallel to each other; the ends 1223,1224 can be parallel to each other; and the ends 1225,1226 can be parallel to each other; and intersecting ends of the ends 1221,1222,1223, 1224, 1225, 1226 can be angled at 90 degrees with respect to each other. In some aspects, the housing 1210 can define any overall shape. The housing 1210 can comprise a base portion or first portion 1210*a* and a cover portion or second portion 1210*b*. The housing 1210 and, more specifically, one of the first portion 1210*a* and the second portion 1210*b* can define the opening 1218, which can be elongated and can allow passage of the flexible connecting element 150 during operation of the drive 130. In some aspects, a centerline 1211 of the opening 1218 can be aligned with a centerline 1201 of the housing and, more generally, the main portion 135 of the drive 130. In some aspects, the centerline 1211 of the opening 1218—and, similarly, a centerline 1734 of a spool 1730 (shown in FIG. 17)—can be offset less than 25% of an opening length 1217 from the centerline 1201. Minimizing an offset between a centerline of the drum 1733 (shown in FIG. 18A) and a centerline of the main portion of the drive 130 can result in even loading of the drive 130 and less potential for binding on and issues during use.

The housing 1210 and, more specifically, one of the first portion 1210*a* and the second portion 1210*b* can define an opening 1238, which can be elongated. The opening 1238 can allow docking or removal of one or more batteries 1270. In some aspects, a centerline 1231 of the opening 1238 can be aligned with the centerline 1201 of the housing and, more generally, the main portion 135 of the drive 130. In some aspects, the centerline 1231 of the opening 1238 can be offset less than 25% of an opening length 1237 from the centerline 1201.

The drive 130 can comprise one or more handles 1250. Each of or any of the handles 1250 can be secured to any of the ends 1221, 1222, 1223, 1224, 1225, 1226 of the housing. As shown, the handle 1250 can be secured to a front end of each of the side ends 1223, 1224. The drive 130 can comprise one or more mounting brackets 1260. As shown, each of the mounting brackets 1260 can be secured to a rear end of each of the side ends 1223, 1224. Each of or either of the mounting brackets 1260 can be a mounting sleeve, which can be formed from a hollow tube and can define a cavity 1280 therein. Each of or either of the mounting brackets 1260 can define holes 1268 in front and rear ends thereof. In some aspects, the hole 1268 on the rear side of the mounting bracket 1260 can be larger to accommodate a shoulder of the fastener 539 (shown in FIG. 5).

The drive 130 can comprise one or more indicator lights 1240*a,b*, which can indicate to a user a status of the drive 130 and a status of the batteries 1270 (e.g., charge level or voltage), respectively. In some aspects, each of or either of the indicator lights 1240*a,b* can comprise a light-emitting diode (LED). In some aspects, each of or either of the indicator lights 1240*a,b* can comprise another light source.

Figure 13:
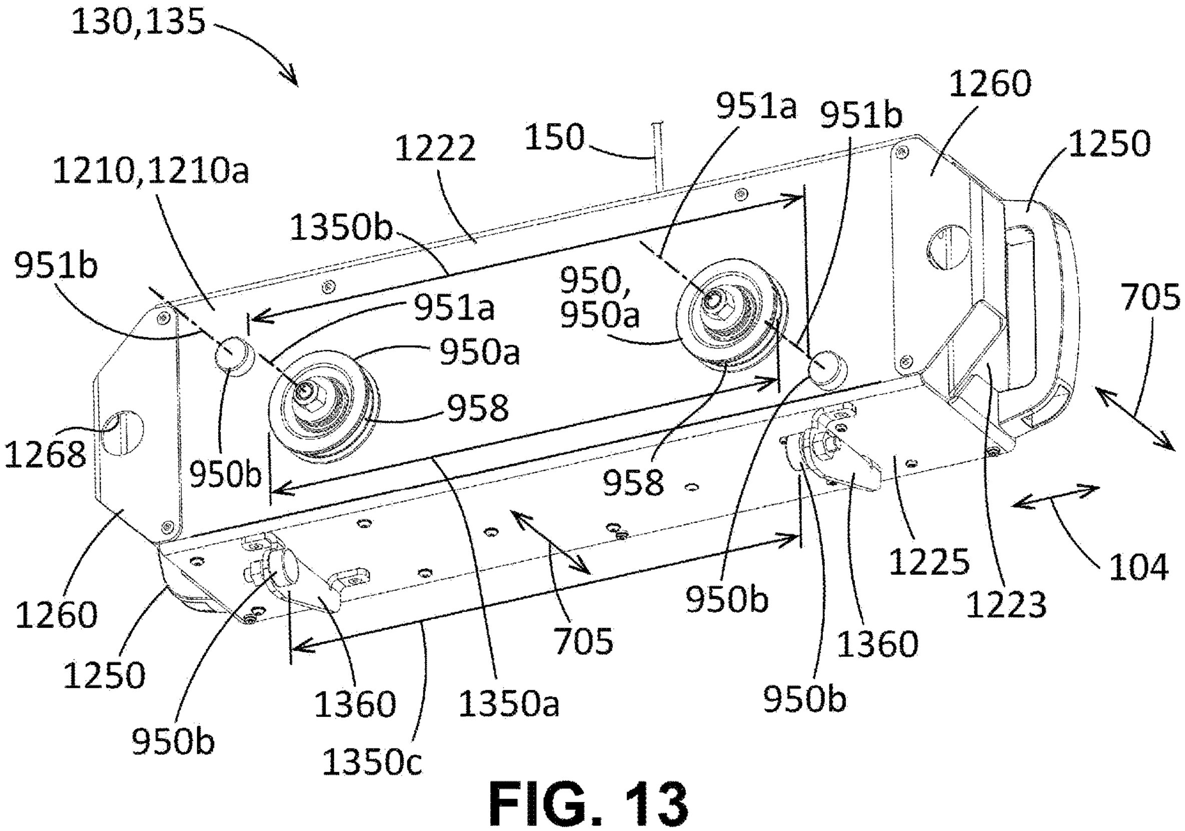
FIG. 13 is a rear bottom perspective view of the drive of FIG. 12.

FIG. 13 is a rear bottom perspective view of the drive 130 of FIG. 12. Again, the drive 130 can comprise a plurality of moving elements 950. As shown, each of a pair of moving elements 950*a* of the moving elements 950 can be secured to the rear end 1222 of the housing 1210 and can be configured to engage the first flange 620 (shown in FIG. 15) of each of the rails 210,220 (shown in FIG. 15). The axis 951*a* of each of the moving elements 950*a* can be aligned with the extension direction 705. Again, each of the moving elements 950*a* can define a groove 958 (shown in FIG. 7B). As shown in FIG. 9A, each of or any of the moving elements 950*a* can comprise a bearing, which can be one of a ball bearing and a roller bearing and can thereby smooth operation of the moving elements 950*a*. The moving elements 950*a* can define a minimum spacing 1350*a* therebetween, which can be measured between radially outermost edges thereof, as shown.

Each of one or more moving elements 950*b* of the moving elements 950 can be secured to the rear end 1222 of the housing 1210 and can be configured to engage a sideward-facing outboard portion of the first flange 620 (shown in FIG. 14) of each of the rails 210,220. The axis 951*b* of the moving elements 950*b* can be aligned with the extension direction 705. Again, each of or any of the moving elements 950*b* can comprise a bearing or bearing assembly and can comprise or can be a cam follower. The moving elements 950*b* can define a minimum spacing 1350*b* therebetween, which can be measured between radially innermost edges thereof, as shown.

Each of one or more moving elements 950*b* of the moving elements 950 can be secured to the bottom end 1225 of the housing 1210 and can be configured to engage a frontward-facing portion of the first flange 620 (shown in FIG. 14) of each of the rails 210,220. More specifically, in some aspects, the moving elements 950*b* can be mounted to brackets 1360, which can be mounted to the bottom end 1225 of the housing 1210. In some aspects, the moving elements 950*b* here and elsewhere can be mounted to a portion of the surrounding structure (e.g. the housing 1210) that has been bent so as to eliminate the need for the separate bracket 1360, or the bracket 1360 can be formed monolithically with the housing 1210. The axis 951*b* of the moving elements 950*b* so positioned can be aligned with the lateral direction 104. Again, each of or any of the moving elements 950*b* can comprise a bearing or bearing assembly and can comprise or can be a cam follower. The moving elements 950*b* can define a spacing 1350*c* therebetween.

Figure 14:
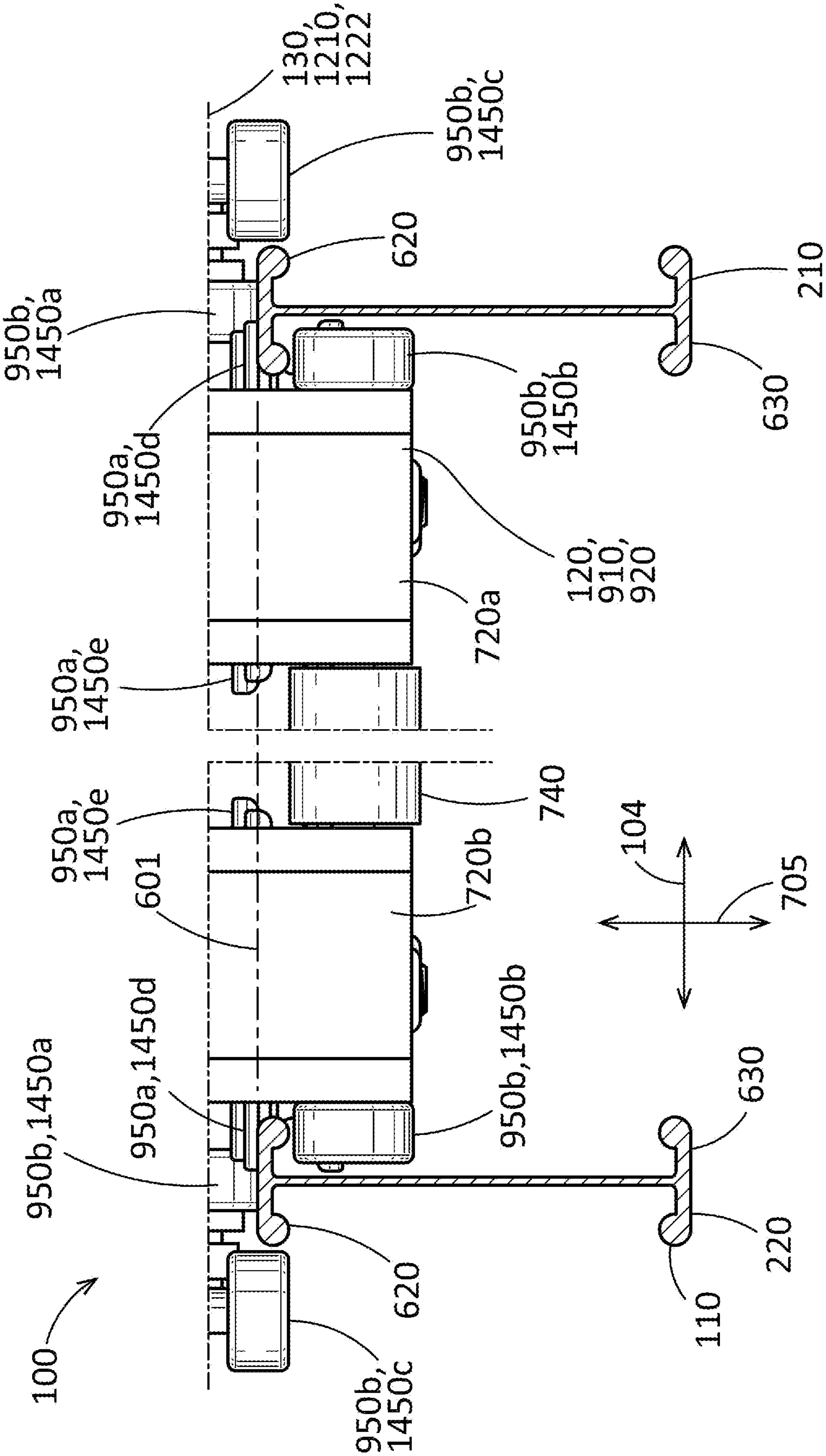
FIG. 14 is a top sectional view of the material hoist system of FIG. 1 taken along line 14-14 of FIG. 5 and showing an interface between the track and the drive.

FIG. 14 is a top sectional view of the material hoist system 100 of FIG. 1 taken along line 14-14 of FIG. 5 and showing an interface between the track 110 and the drive 130. As shown, each of a pair of the moving elements 950*b* and, more specifically, moving elements 1450*a* secured to the bottom end 1225 (shown in FIG. 15) of the housing 1210 of the drive 130 can contact the forward-facing edge or portion of the first flange 620 of each of the rails 210,220. Together, this pair of the moving elements 950*b*, 1450*a* can prevent rotation of the bottom end of the drive 130 into the track 110. As also shown, each of a pair of the moving elements 950*b* and, more specifically, moving elements 1450*b* secured to the carriage 120 and, more specifically, the brackets 720*a,b* thereof can contact the rearward-facing edge or portion of the first flange 620 of each of the rails 210,220. Together, this pair of the moving elements 950*b*, 1450*b* can prevent rotation of a top end 906 (shown in FIG. 5) of the carriage 120 away from the track 110.

As shown, each of a pair of the moving elements 950*b* and, more specifically, moving elements 1450*c* secured to the rear end 1222 of the housing 1210 of the drive 130 can contact a sideways-facing outboard edge or portion of the first flange 620 of the rail 210,220. Together, this pair of the moving elements 950*b*, 1450*c* can prevent translation of the drive 130 or the carriage 120 in the lateral direction 104 with respect to the track 110.

Each of a pair of the moving elements 950*a* and, more specifically, moving elements 1450*d* secured to the carriage 120 can contact—and lockably receive within the groove 958 (shown in FIG. 7B) defined by the moving elements 1450*d*—the sidewards-facing inboard edge or portion of the first flange 620 of each of the rails 210,220. Together, this pair of the moving elements 950*a*, 1450*d* can prevent any movement of the carriage 120 away from the track 110. Similarly, each of a pair of the moving elements 950*a* and, more specifically, moving elements 1450*e* secured to the drive 130 can also contact—and lockably receive within the groove 958 (shown in FIG. 13)—the sidewards-facing inboard edge or portion of the first flange 620 of each of the rails 210,220. Together, pairs of the moving elements 950*a*, 1450*e* can prevent any movement of the drive 130 away from the track 110.

FIG. 15 is a front bottom perspective view of the material hoist system 100 of FIG. 1 showing an interface between the track 110 and the drive 130. When, as shown, the spacing 1350*d* (shown in FIG. 13) between the moving elements 950*a* and, more specifically, the moving elements 1450*d* (shown in FIG. 14) is greater than an inside opening width 1550*a* of the track 110, each of the moving elements 1450*d* can lock the carriage 120 and the drive 130 in the track, even under significant load. Similarly when, as shown, the spacing 1350*e* (shown in FIG. 7C) between the moving elements 950*a* and, more specifically, the moving elements 1450*e* (shown in FIG. 14) is greater than the inside opening width 1550*a* of the track 110, each of the moving elements 1450*e* can lock the carriage 120 and the drive 130 in the track. When, as shown, the spacing 1350*a* (shown in FIG. 13) between the moving elements 950*b* and, more specifically, the moving elements 1450*a* is greater than the outside lateral width 114 of the track 110, the moving elements 1450*a* can lock the carriage 120 and the drive 130 in the track.

Figure 16:
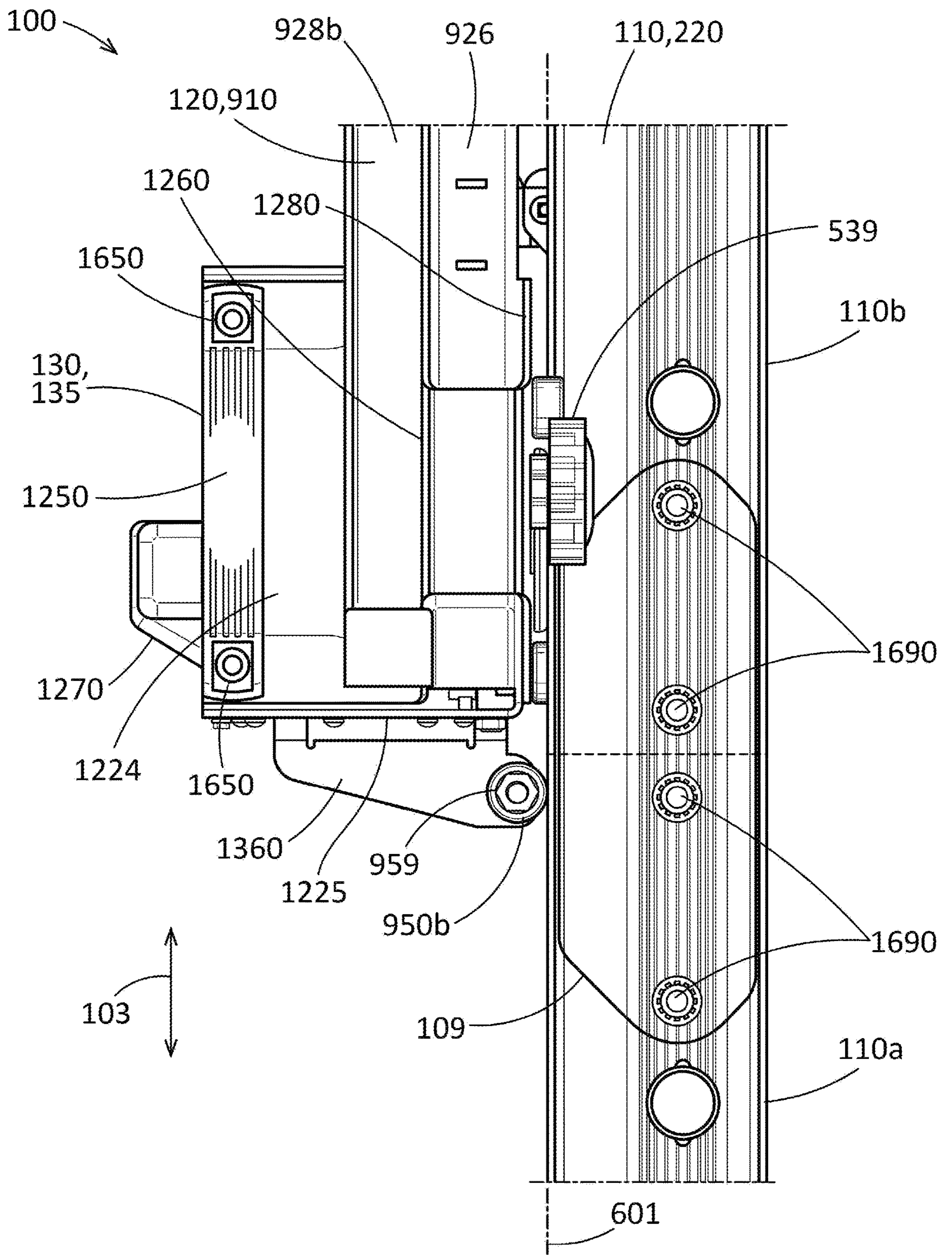
FIG. 16 is a side view of the material hoist system of FIG. 1 showing an interface between the carriage, the drive, and the track as well as a splice between two sections or segments forming the track and, more specifically, rails thereof.

FIG. 16 is a side view of the material hoist system 100 of FIG. 1 showing an interface between the carriage 120, the drive 130, and the track 110 as well as the splice 109 between two sections or segments forming the track 110 and, more specifically, the rails 210,220 (210 shown in FIG. 1). The splice 109 can be secured to each of the portions of the track 110 with one or more fasteners 1690. More specifically, each of or any of the splices 109 can be secured to the inboard surface 615 (shown in FIG. 6) or the outboard surface 616 (shown in FIG. 6) of the first rail 210 and the second rail 220. As shown, the splice 109 can be secured to each of the portions of the track 110 with two fasteners 1690. In some aspects, each of the fasteners 1690 can be any fastener configured to be removable such as, for example and without limitation, a bolt-and-nut combination. In some aspects, each of the fasteners 1690 can be any fastener configured to be permanent (not removable without damage to the fastener 1690 and/or the connection) such as, for example and without limitation, a rivet.

As shown, the mounting bracket 1260 and, more specifically, the cavity 1280 defined therein can be sized and otherwise configured to receive at least a portion of the frame member 940 of the base 926. The fastener 539 can extend through each of and secure together the base 926 and the second leg 928*b* of the frame 910 of the carriage 120 as well as the mounting bracket 1260 of the drive 130. As also shown, each of or either of the handles 1250 can be secured with fasteners 1650.

Figure 17:
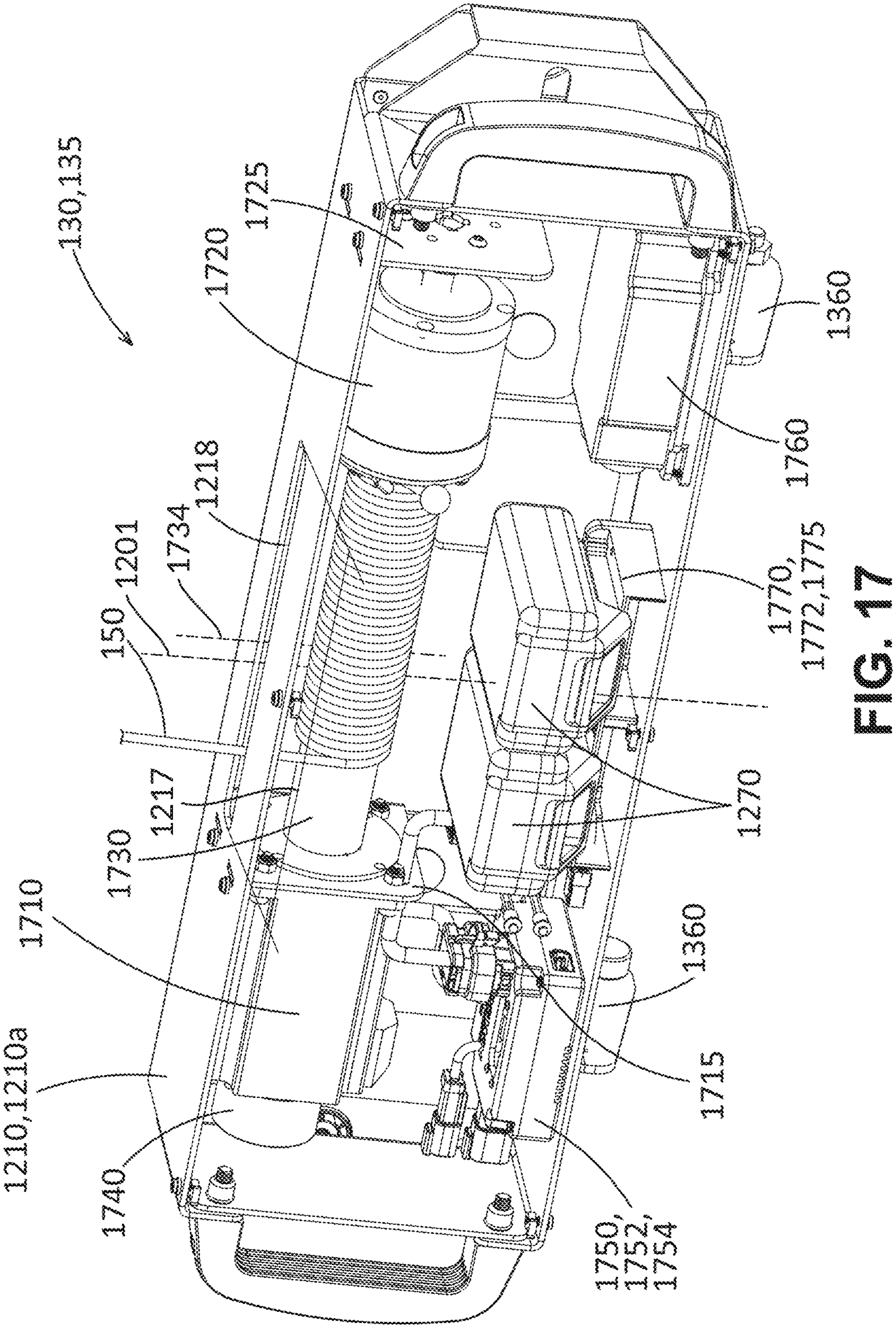
FIG. 17 is a front top perspective view of the drive and, more specifically, the main portion of FIG. 12 with a front access panel or second portion removed.

FIG. 17 is a front top perspective view of the drive 130 and, more specifically, the main portion 135 of FIG. 12 with the front access panel or second portion 1210*b* (shown in FIG. 12) removed. The drive 130 can comprise an electric motor or motor 1710, which can be positioned inside the housing 1210. The motor 1710 can be a brushless direct current (BLDC) electric motor. For example and without limitation, the motor 1710 can define a voltage spec of 40V BLDC, a rated torque of 48 N-m, a speed of 208 RPM, and a power rating of 1050 W, available from Ningbo BG Motor Factory or BG Motor of Ningbo, China. In some aspects, the motor 1710 can comprise or can be purchased with the brake 1740 and the gearbox 1720 but can be assembled as separate components. In some aspects, the motor 1710 can be similar to a Model BG86BL80 series motor available from BG Motor. The motor 1710 can be secured to the housing 1210 with a mounting flange or mounting bracket 1715. The drive 130 can comprise a gearbox 1720, which can be positioned inside the housing 1210 and can be coupled to the motor 1710. The gearbox 1720, which can be a planetary gearbox, can be secured to the housing 1210 with a mounting flange or mounting bracket 1725. The gearbox 1720 can convert an input rotational speed at an input shaft or recess 1828 (shown in FIG. 18B) to a different output rotational speed (e.g., in revolutions per minute or RPM) by the use of internal gearing to step down the speed. The drive 130 can comprise the spool drum or spool 1730, which can be positioned inside the housing 1210 between the motor 1710 and the gearbox 1720. The drive 130 can comprise a brake 1740, which can be a solenoid brake and can also be positioned inside the housing 1210. The brake 1740 can be coupled to the motor 1710 and can be configured to slow or stop rotation of a shaft of the motor 1710 when so instructed.

The drive 130 can comprise a controller assembly or controller unit 1750, which can also be positioned inside the housing 1210 and can comprise a main controller 1752 and a motor controller 1754. The drive 130 can comprise a remote receiver or signal receiver 1760, which can be positioned inside the housing 1210. The drive 130 can comprise a main power supply 1770. In some aspects, the main power supply can comprise a battery mount 1775 and the one or more batteries 1270, which can be receivable within the battery mount. In some aspects, each of the one or more batteries 1270 can be a standard battery for use in cordless battery-powered power tools such as, for example and without limitation, a 18-volt lithium-ion battery such as is available from Milwaukee Electric Tool Corporation under the Milwaukee brand name or a 20-volt lithium-ion battery such as is available from Stanley Black & Decker, Inc. under the DeWalt brand name. In some aspects, each of the one or more batteries 1270 can be any other standard or custom battery with comparable voltage specifications. The battery mount 1775 can comprise a battery board or battery control board 1772. As will be described further, each of or any of the electrical components can be in electrical communication with the main controller 1752 and, in some aspects, with each other. In some aspects, the drive 130 can be configured to accommodate and be powered by, at least in the alternative, AC power (e.g., 120 VAC) found at some worksites. In some aspects, the batteries 1270 can be rechargeable. In some aspects, the batteries 1270 can be non-rechargeable.

Figure 18A:
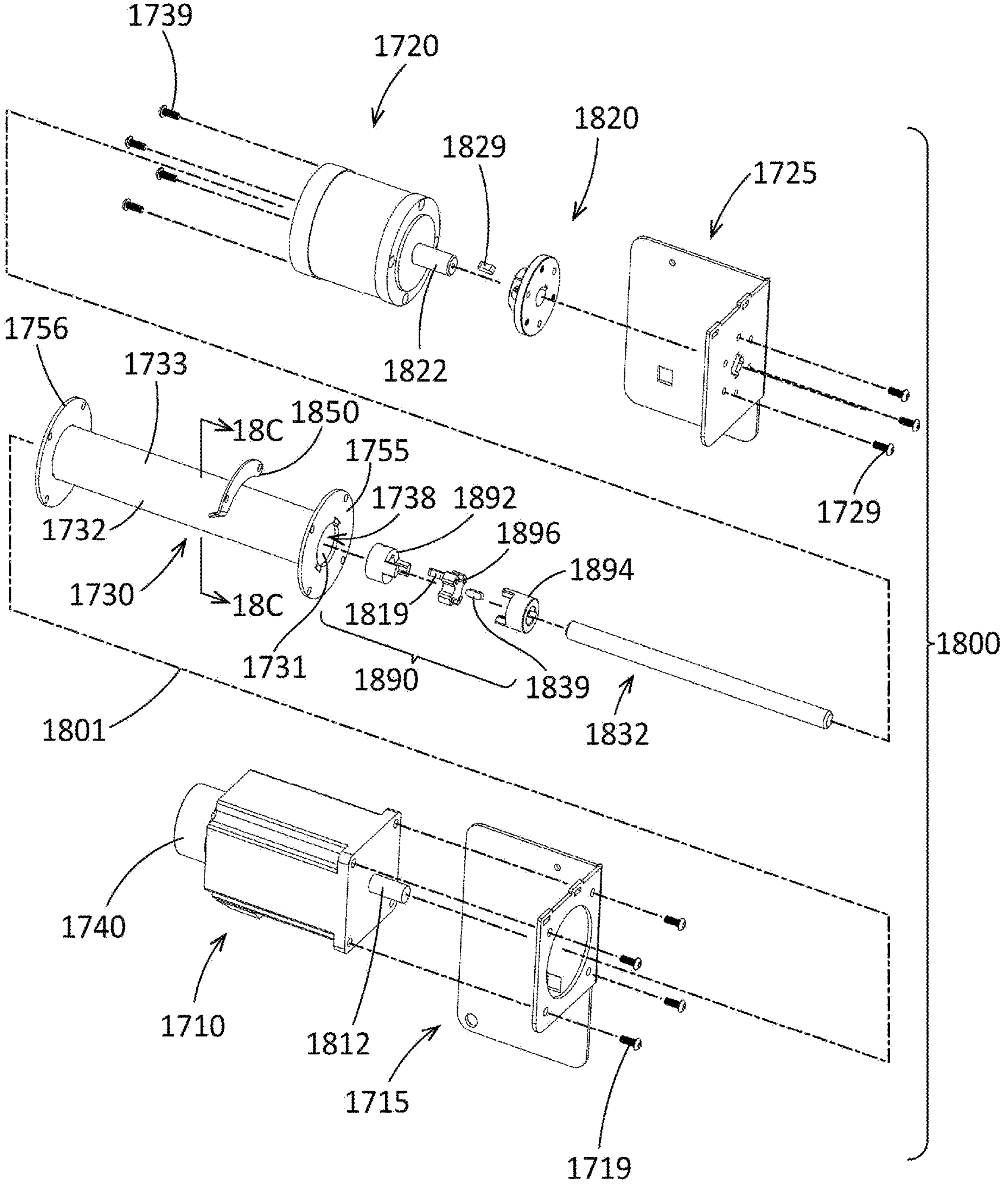
FIG. 18A is an exploded front perspective view of a motor-spool-gearbox assembly and, more specifically, the main portion of the drive of FIG. 1.

FIG. 18A is an exploded front perspective view of a motor-spool-gearbox assembly 1800 and, more specifically, the main portion 135 of the drive 130 of FIG. 1. The brake 1740 can be secured or coupled to the motor 1710 with fasteners (not shown). The motor 1710 can be secured to the mounting bracket 1715 with fasteners 1719. The motor 1710 can comprise an output shaft 1812, which can define a slot configured to receive a key 1819.

For use in mounting the gearbox 1720, a shaft collar or adapter 1820 can be secured or coupled to the mounting bracket 1725 with fasteners 1729. The adapter 1820 can comprise a body, which can comprise a fastener for tightening around a shaft, and a thinner flange extending in a radial direction from the body for mounting the adapter 1820 to the mounting bracket 1725. The gearbox 1720 can comprise an output shaft 1822, which can be secured or coupled to the adapter 1820 via a keyed connection comprising a key 1829 received within a slot defined in the output shaft 1822.

The spool 1730 can comprise a drum 1733 and two end caps 1755, 1756 joined to or formed from opposite ends of the drum 1733. More specifically, the drum 1733 can define an outer surface 1732 on which the flexible connecting element 150 (shown in FIG. 17) can be wound. The drum 1733 can further define an inner surface 1731, which can define a cavity 1738. The cavity 1738, which can extend from the first end to the second end of the drum 1733 and can be open at both ends, can be configured to receive and allow connection of a shaft or shaft assembly extending from the motor 1710 to the gearbox 1720 and joining the motor 1710 and the gearbox 1720. Each of the outer surface 1732 and the inner surface 1731 can be cylindrical. The spool 1730 can comprise a cable anchor or anchor or holding device 1850, which can be a bracket for quickly and easily securing an end of the flexible connecting element 150. The spool 1730 can be configured to selectably wind and unwind the flexible connecting element 150, which again can be coupled to the track 110. In some aspects, the spool 1730 can be configured to drive movement of the drive 130 along the longitudinal direction 103 of the track 110. In some aspects, the drive 130 can be configured to remain in a stationary position on the track 110 and drive movement of only the carriage 120 along the longitudinal direction 103 of the track 110.

Again, the spool 1730 can be positioned between the motor 1710 and the gearbox 1720. In some aspects, the first end cap 1755 and, more generally, the spool 1730 and the holding device 1850 can be secured or coupled to the gearbox 1720 with fasteners 1739 (shown in FIG. 18C). The second end cap 1756 can remain unattached to other components and instead can be configured to freely rotate.

In some aspects, the output shaft 1812 of the motor 1710 can extend unbroken from the motor 1710 to an input connection of the gearbox 1720, which can be keyed. In some aspects, as shown, a separate shaft 1832 can engage the input connection of the gearbox 1720 and can engage the output shaft 1812 of the motor 1710 via a coupling 1890. For example and without limitation, the coupling 1890 can be a Lovejoy coupling. In some aspects, including when the coupling 1890 is a Lovejoy coupling, the coupling 1890 can comprise a first hub 1892, a second hub 1894, and a spacer 1896, which can be a "spider". The first hub 1892 can be secured or coupled to the output shaft 1812 of the motor 1710 with a keyed connection comprising the key 1819, which can be configured to be received within a slot defined in the output shaft 1812. The second hub 1894 can be secured or coupled to the shaft 1832 with a keyed connection comprising the key 1839, which can be configured to be received within a slot defined in the output shaft 1832. The spacer 1896 can be positioned between the first hub 1892 and the second hub 1894 and can thereby absorb some misalignment and account for some tolerance issues in the assembly 1800. Each of the brake 1740, the motor 1710, the spool 1730, and other components disclosed herein can be aligned along an assembly axis 1801.

In some aspects, as described below, the output shaft 1822 of the gearbox 1720 can be configured to remain stationary during operation and movement of the drive 130 and a body of the gearbox 1720 can be configured to rotate instead. In some aspects, as shown, the gearbox 1720 can define a cylindrical shape. In some aspects, the gearbox can define a square shape in cross-section or another non-cylindrical shape.

Figure 18B:
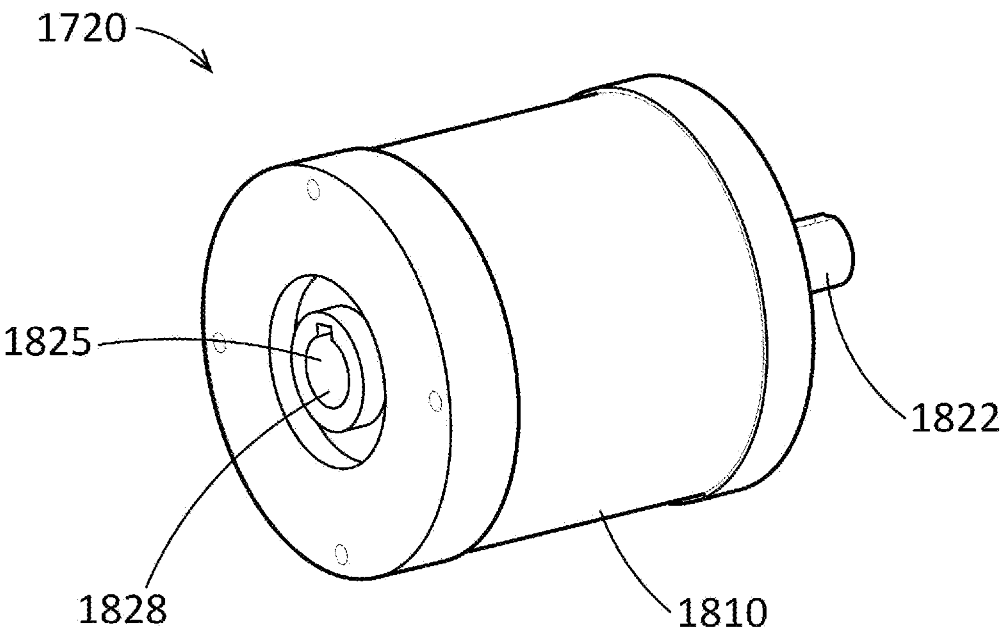
FIG. 18B is a side perspective view of the motor-spool-gearbox assembly of FIG. 18A.

FIG. 18B is a side perspective view of the motor-spool-gearbox assembly 1800 of FIG. 18A. As shown, the gearbox 1720 can comprise an input connection 1825 defining a recess 1828, which can be a keyed connection. The gearbox 1720 can comprise a body 1810 for housing the inner workings (e.g., gears) of the gearbox 1720.

Figure 18C:
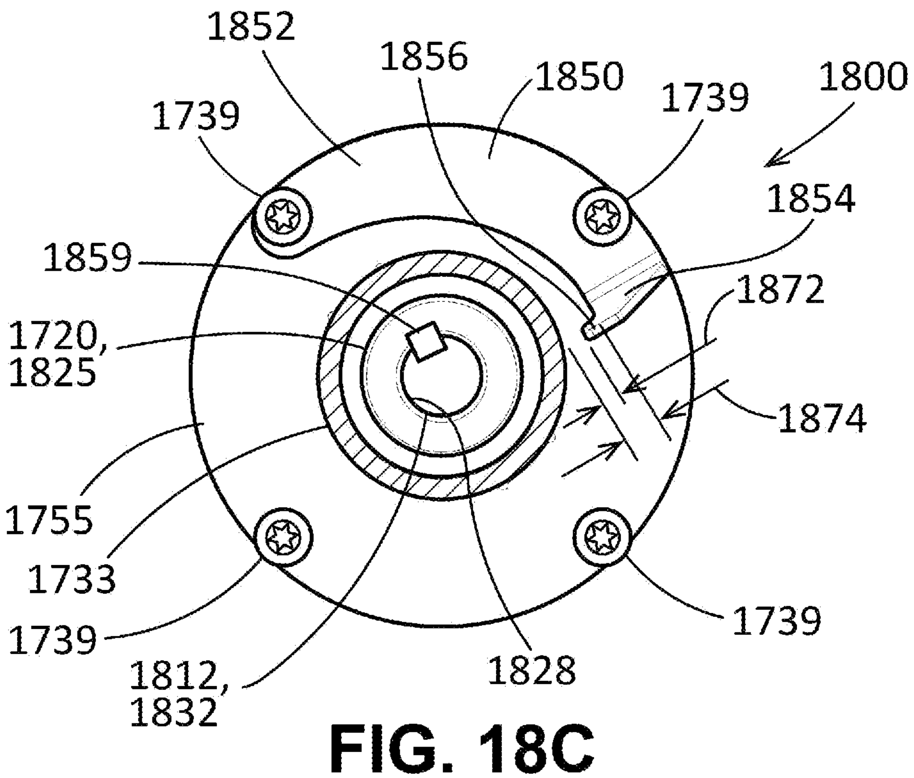
FIG. 18C is a side sectional view of the motor-spool-gearbox assembly of FIG. 18A taken along line 18C-18C of FIG. 18A and showing the holding device of the spool.

FIG. 18C is a side sectional view of the motor-spool-gearbox assembly 1800 of FIG. 18A taken along line 18C-18C of FIG. 18A and showing the holding device 1850 of the spool 1730. The holding device 1850 can be secured to the first end cap 1755 of the spool 1730 with one or more of the fasteners 1739. The holding device 1850 itself can comprise a first portion 1852 and a second portion 1854, which can bent or angled with respect to the first portion 1852. The second portion 1854 can be tapered as shown. The second portion 1854 can define a tip 1856 which can narrow a gap between the holding device 1850 and the drum 1733 of the spool 1730 at the holding device 1850 from a gap 1874 to a gap 1872. The gap 1872 can be sized to receive a portion of the flexible connecting element 150, e.g., a plain unknotted length proximate to the end 155 (shown in FIG. 20) when force is applied and/or the flexible connecting element 150 to squeeze or push it past the tip 1856. The holding device 1850 can thereby anchor the end 155 such that the flexible connecting element 150 is not unintentionally released from the spool 1730. Again, the connection 1825 can be a keyed connection. More specifically, one of the shaft 1812 and the shaft 1832 can be sized to receive a key 1859.

Figure 19A:
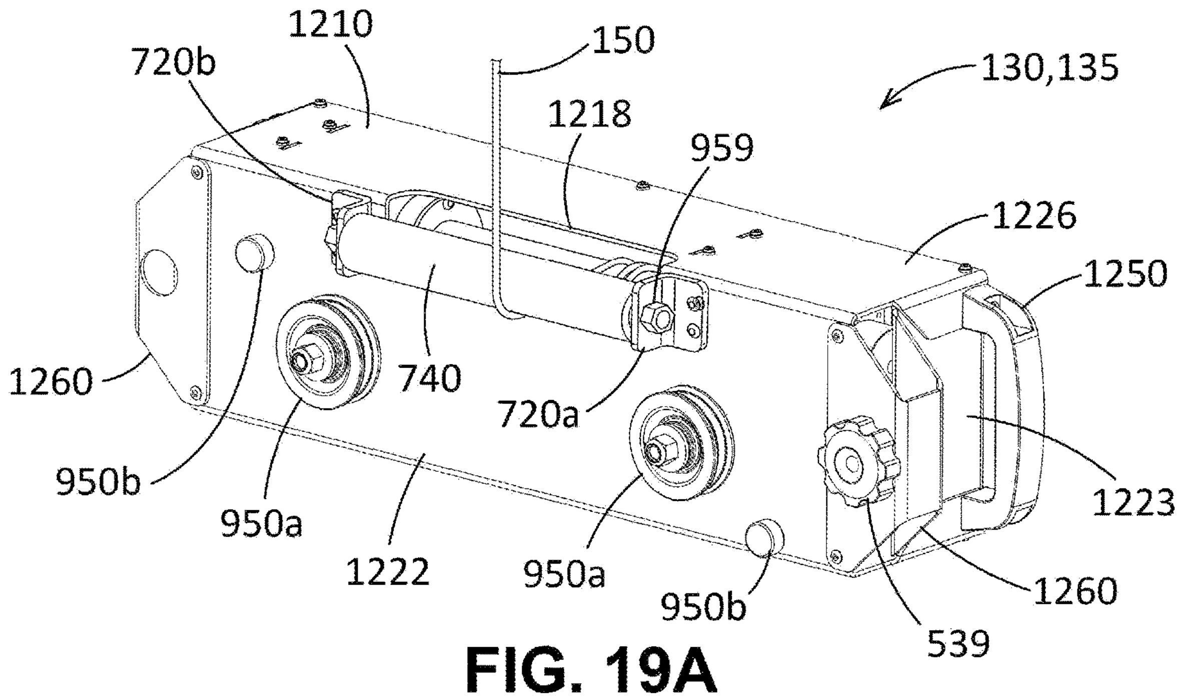
FIG. 19A is a rear top perspective view of the drive of FIG. 1 in accordance with another aspect of the current disclosure.

FIG. 19A is a rear top perspective view of the drive 130 of FIG. 1 in accordance with another aspect of the current disclosure. In some aspects, as shown, the opening 1218 configured for passage of the flexible connecting element 150 can be defined in both a rear portion of the top end 1226 and a top portion of the rear end 1222 of the housing. In some aspects, the lower guide 740 can be secured to the rear end 1222 through and between the second mounting brackets 720*a,b*, each of or either of which can define an L-shape. The relatively larger opening 1218 (relative to other variations of the openings 1218 disclosed herein) can facilitate the user's visibility to the flexible connecting element 150 without opening up the housing 1210.

Figure 19B:
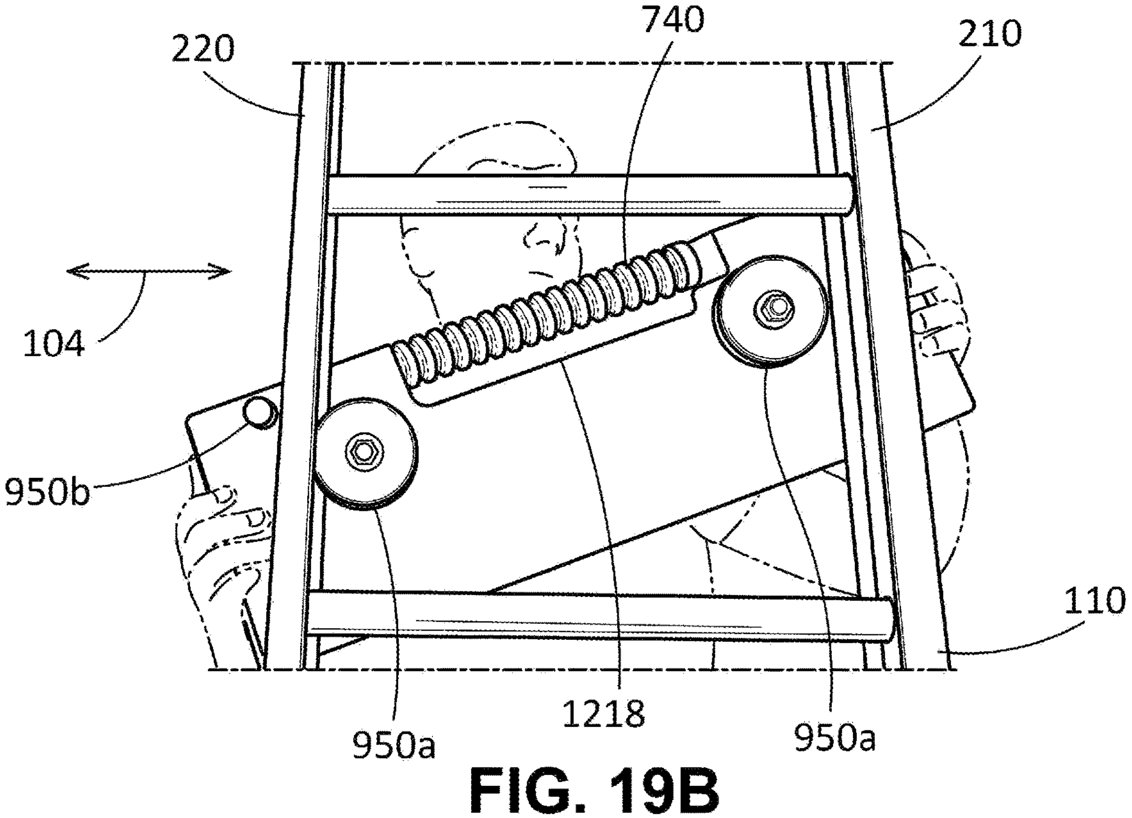
FIG. 19B is a rear bottom perspective view of the drive of FIG. 19A showing the drive being assembled to the track.

FIG. 19B is a rear bottom perspective view of the drive 130 of FIG. 19A showing the drive 130 being assembled to the track 110. By tilting the drive 130 at an angle with respect to the lateral direction 104 and although with respect to a final orientation of the drive 130 aligned with the lateral direction 104, a user can engage a first of two moving elements 950*a* with the second rail 220 and then a second of the two moving elements 950*a* with the first rail 210. With the moving elements 950*b* moved to opposite corners of the rear end 1222 (to lower left and upper right, for example), the direction of titling during assembly can be changed. Inclusion of the moving elements 950*b* on the rear end 1222 can guard against unintentional "clocking" or rotation of the drive upon assembly by maintaining a horizontal orientation of the drive 130 or at least an orientation that is aligned with the lateral direction 104. A spacing 1350*a* (shown in FIG. 13) between the moving elements 950*a* and, more specifically, radially outermost portions proximate to the ends 1223, 1224 or the axes 951*a* (shown in FIG. 13) or other portions thereof can be such that the drive 130 must be angled with respect to the lateral direction 104 of the system 100 (shown in FIG. 1) to be receivable within a space between the rails 210,220 of the track 110. Furthermore, both the carriage 120 and the drive 130 can be locked in place with respect to the track 110 by separately engaging each of the carriage 120 and the drive 130 and then coupling the carriage 120 and the drive 130 to each other. In some aspects, as shown, a surface of the lower guide 740 can be grooved, and the opening 1218 can extend sufficiently below a bottommost portion of the lower guide 740 to allow passage of the flexible connecting element 150.

Figure 20A:
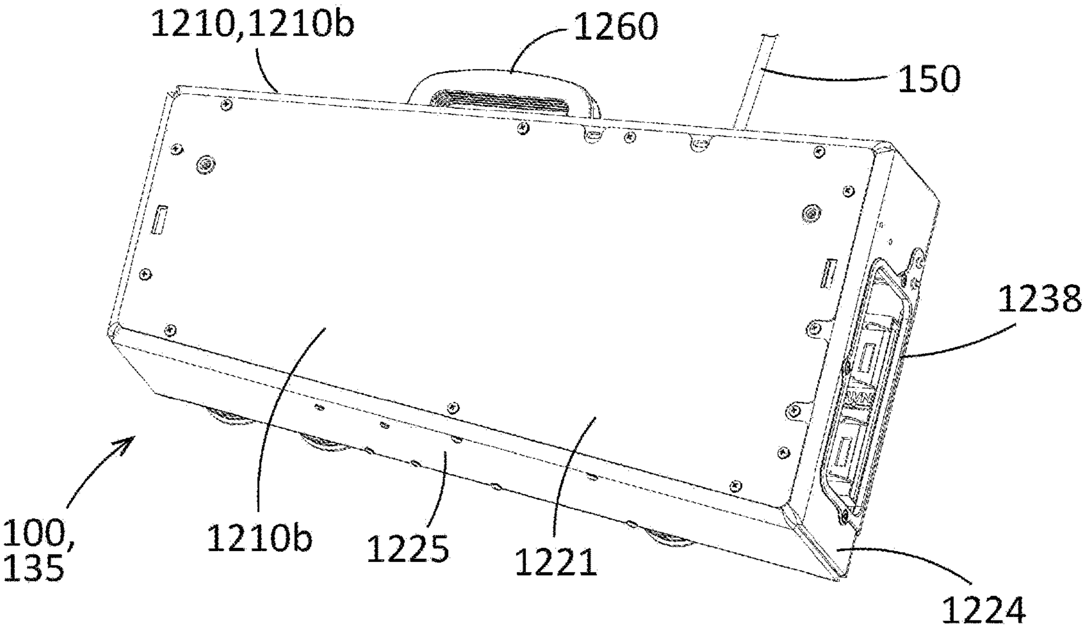
FIG. 20A is a front top perspective view of the drive of FIG. 1 in accordance with another aspect of the current disclosure.

FIG. 20A is a front top perspective view of the drive 130 of FIG. 1 in accordance with another aspect of the current disclosure. The flexible connecting element 150 is shown at least partially unwound from a spool 1730 (shown in FIG. 20C) of the drive 130 and extending from the drive 130. The main portion 135 of the drive 130 can comprise one or more of the components discussed in relation to the other figures disclosed herein. The housing 1210 can define a trapezoidal shape when viewed from the front or rear, and modifications can be made (brackets and holes added, for example) to secure the housing 1210 to the carriage 120 (shown in FIG. 1) and the track 110 (shown in FIG. 1). The opening 1238, which can receive the one or more batteries 1270 therein during operation, can be defined in another end of the housing 1210 such as, for example and without limitation, the second side end 1224.

Figure 20B:
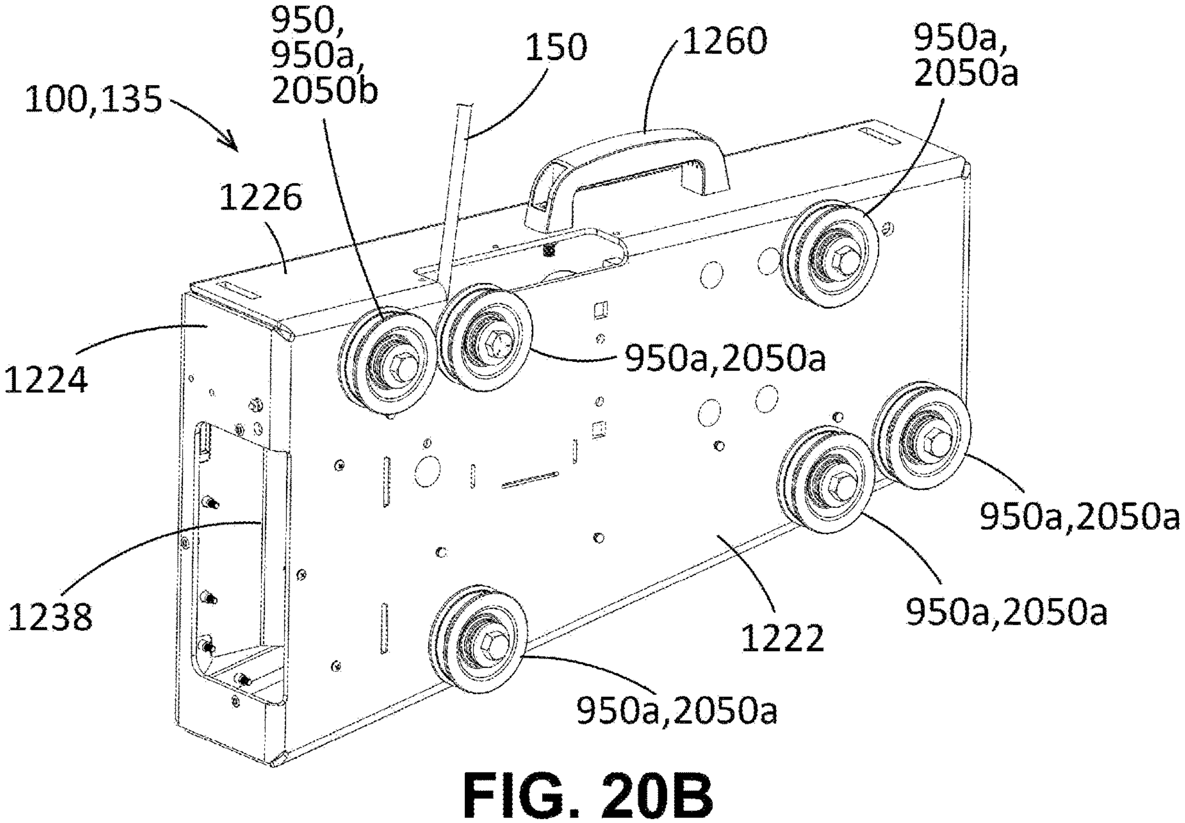
FIG. 20B is a rear top perspective view of the drive of FIG. 20A.

FIG. 20B is a rear top perspective view of the drive 130 of FIG. 20A. A plurality of the moving elements 950*a* can be secured to the rear end 1222 of the housing 1210. One or more of the moving elements 950*a*, which can also be the four moving elements 2050*a*, can be received within a space defined between the rails 210,220 (shown in FIG. 1) of the track 110 (shown in FIG. 5). One or more of the moving elements 950*a*, which can also be the two moving elements 2050*b*, can be received within a space defined outside the rails 210,220 of the track 110.

Figure 20C:
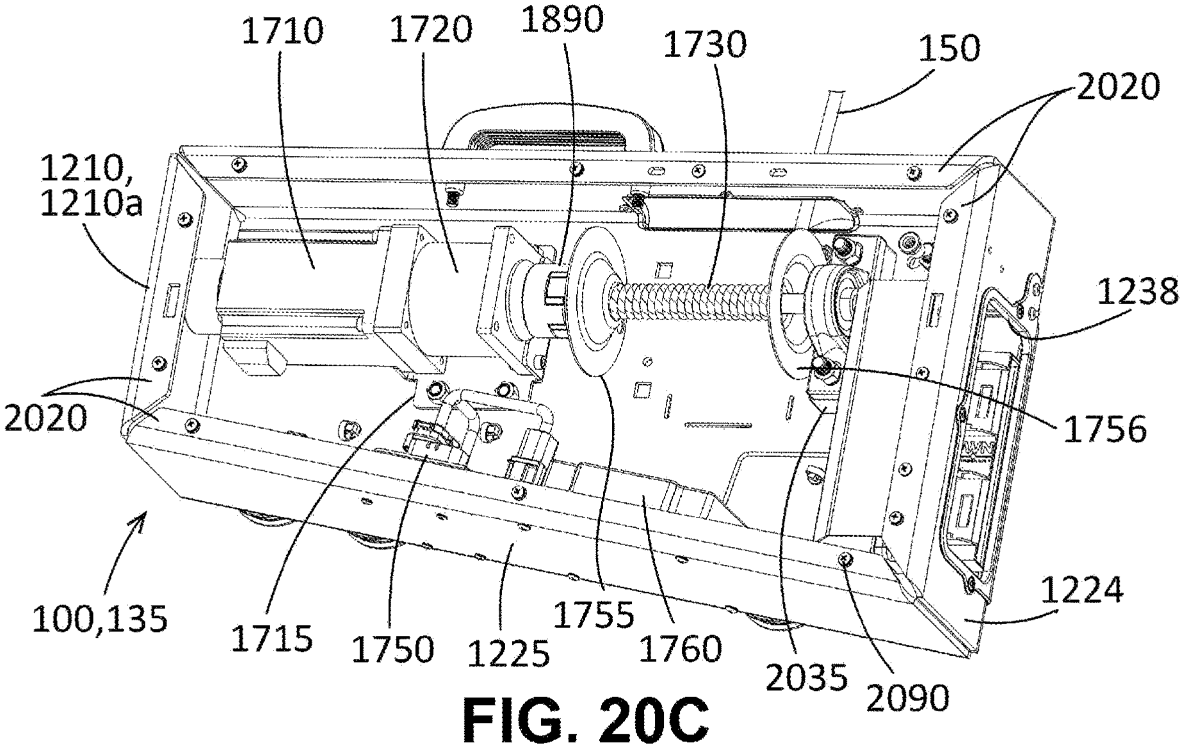
FIG. 20C is a front top perspective view of the drive and, more specifically, the main portion of FIG. 20A with the front access panel or second portion removed.

FIG. 20C is a front top perspective view of the drive 130 and, more specifically, the main portion 135 of FIG. 20A with the front access panel or second portion 1210*b* (shown in FIG. 20A) removed. Again, the main portion 135 of the drive 130 can comprise one or more of the components discussed in relation to the other figures disclosed herein such as, for example and without limitation, the motor 1710, the gearbox 1720, the spool 1730, the brake 1740, the controller unit 1750, the signal receiver 1760, the coupling 1890, and various fasteners and/or other mounting structures. The housing 1210 can comprise the flanges 2020, which can extend from ends such as, for example and without limitation, the ends 1223, 1224, 1225, 1226 and can receive fasteners 2090 for attachment of the second portion 1210*b*. As shown, the gearbox 1720 can be positioned between the motor 1710 and the spool 1730, instead of the spool 1730 being positioned between the motor 1710 and the gearbox 1720. As also shown, the coupling 1890 can be positioned between the spool 1730 and the gearbox 1720 and can be visible and larger in size, instead of the coupling being smaller in size and positioned inside a cavity defined by a drum 1733 of the spool 1730 as shown in FIG. 18. The drive 130 can comprise a support 2035, which can be a pillow block, for supporting an end of the spool 1730 that is distal from the motor 1710, the gearbox 1720, and the coupling 1890.

Figure 20D:
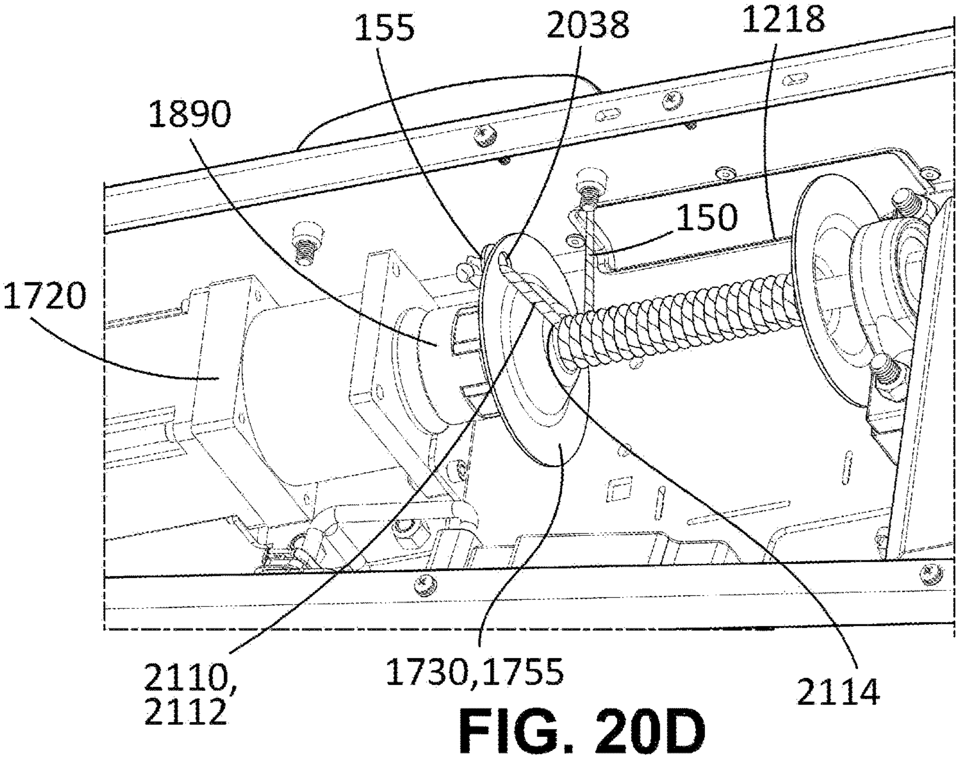
FIG. 20D is a bottom front perspective view of the drive of FIG. 18 with the access panel or second portion removed and showing the spool of FIG. 20C in accordance with another aspect of the current disclosure.

FIG. 20D is a bottom front perspective view of the drive 130 of FIG. 20A with the access panel or second portion 1210*b* removed and showing the spool 1730 of FIG. 20C in accordance with another aspect of the current disclosure. An opening 2038 can be formed in the end cap 1755 of the spool 1730 to facilitate passage and anchoring of the first end 155 of the flexible connecting element 150, which can be facilitated with a stop collar, knot, and/or fasteners at the end 155. Similar in aspects to that described in reference to FIGS. 21A-21C, the flexible connecting element 150 can itself form a connecting element guide or "kicker" or guide 2110. As the rope "kicker" or guide 2110 extends across and lays flat against the first end cap 1755, the flexible connecting element 150 can have multiple portions including a first portion 2112 and a second portion 2114, as will be described below. Where the second portion 2114 is labeled a second layer or wrap of the flexible connecting element 150 has contacted the first layer and has just begun to form and is nearing its first revolution around the spool 1730.

Figure 21A:
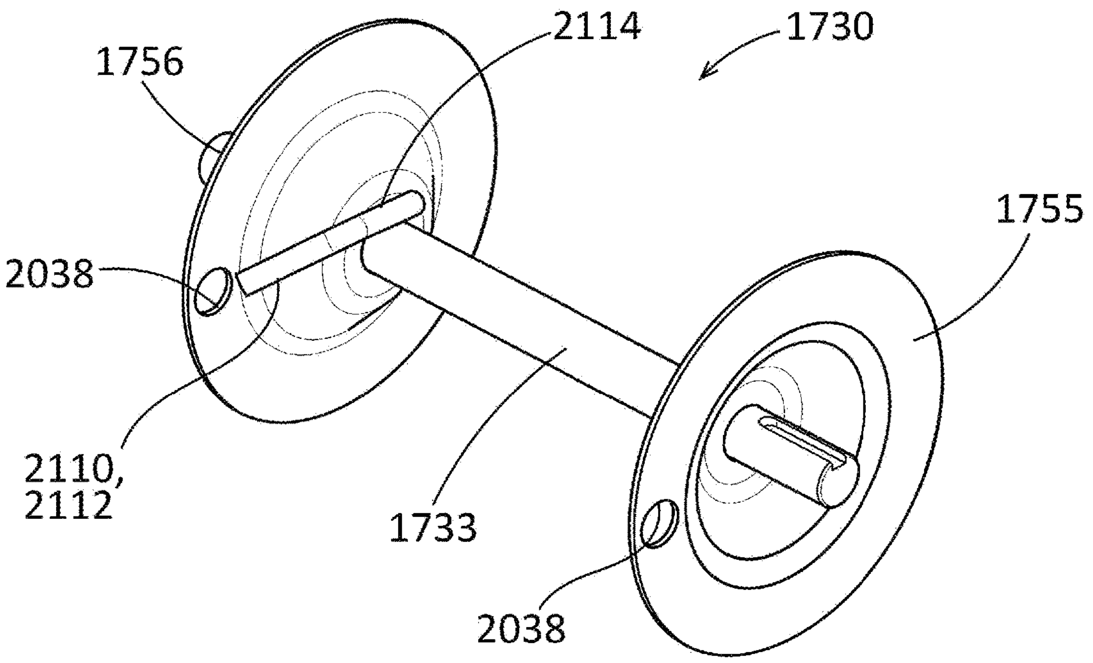
FIG. 21A is a rear side perspective view of a spool of the drive of FIG. 20A showing a connecting element guide or guide in accordance with another aspect of the current disclosure.
Figure 21B:
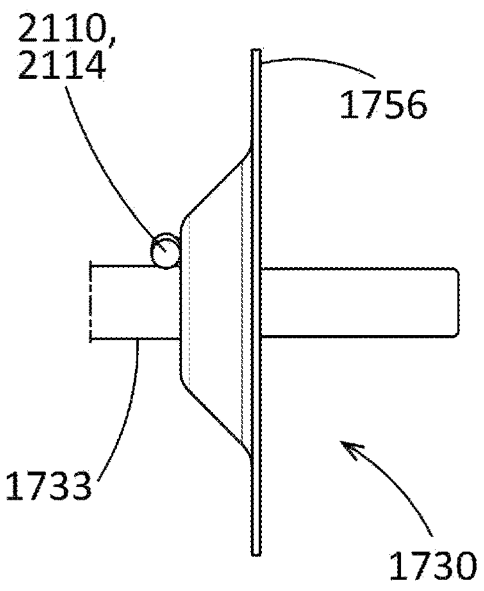
FIG. 21B is a front view of the spool of FIG. 21A.
Figure 21C:
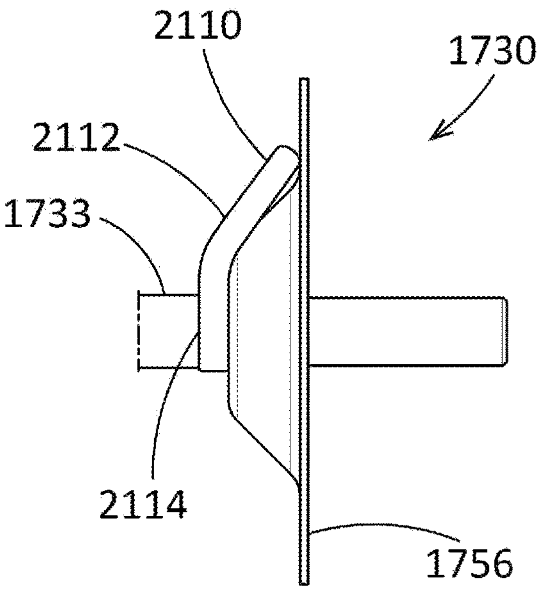
FIG. 21C is a top view of the spool of FIG. 21A.

FIG. 21A is a rear side perspective view, FIG. 21B is a front view, and FIG. 21C is a top view of the spool 1730 of the drive 130 of FIG. 20A showing the connecting element guide or guide 2110 in accordance with another aspect of the current disclosure. The guide 2110 can comprise the first portion 2112 and the second portion 2114, which can be bent or angled with respect to the first portion 2112. More specifically, the second portion 2114 can be angled with respect to the first portion 2112 by between 0 and 45 degrees. As shown, either of or both of the end caps 1755, 1756 can define a slopped or conical surface where the guide 2110 is attached. The guide 2110 can be secured to the drum 1733 and/or the end cap 1755, e.g., with welding or any other form of attachment. In some aspects, as shown, the guide 2110 can define a circular shape in cross-section and can be formed from a wire or rod material. In some aspects, the cross-section shape can differ, but a rounded shape can help avoid chafing of the flexible connecting element 150.

During operation, as the flexible connecting element 150 (shown in FIG. 20C) is wound around the drum 1733, it can naturally formally a single layer of the flexible connecting element 150 on the drum 1733. As the flexible connecting element 150 approaches the second end cap 1756, the guide 2110 can contact the flexible connecting element 150 and thereby urge or coax the flexible connecting element 150 to start a new winding wrap or layer away from the second end cap 1756 and towards the first end cap 1755. In some aspects, the spool 1730 can comprise a single guide 2110 on just one of the ends 1755,1756. In some aspects, the spool 1730 can comprise a guide 2110 on each end cap 1755,1756. In some aspects, the spool 1730 can comprise a guide 2110 formed by the flexibility connecting element 150 on one end cap 1755, 1756 (as shown in FIG. 20D) and can comprise the separately attached guide 2110 on the other end cap 1755, 1756. In some aspects, no guide 2110 need be used or the guide 2110 can be formed from the material of the end caps 1755, 1756. Factors such as, for example and without limitation, the material forming the flexible connecting element 150 and/or where the flexible connecting element 150 is attached to the track 110 and the angle of the flexible connecting element 150 as it enters the housing 1210 (shown in FIG. 20C) of the main portion 135 of the drive 130 can factor into how useful the guide 2110 is.

Figure 22:
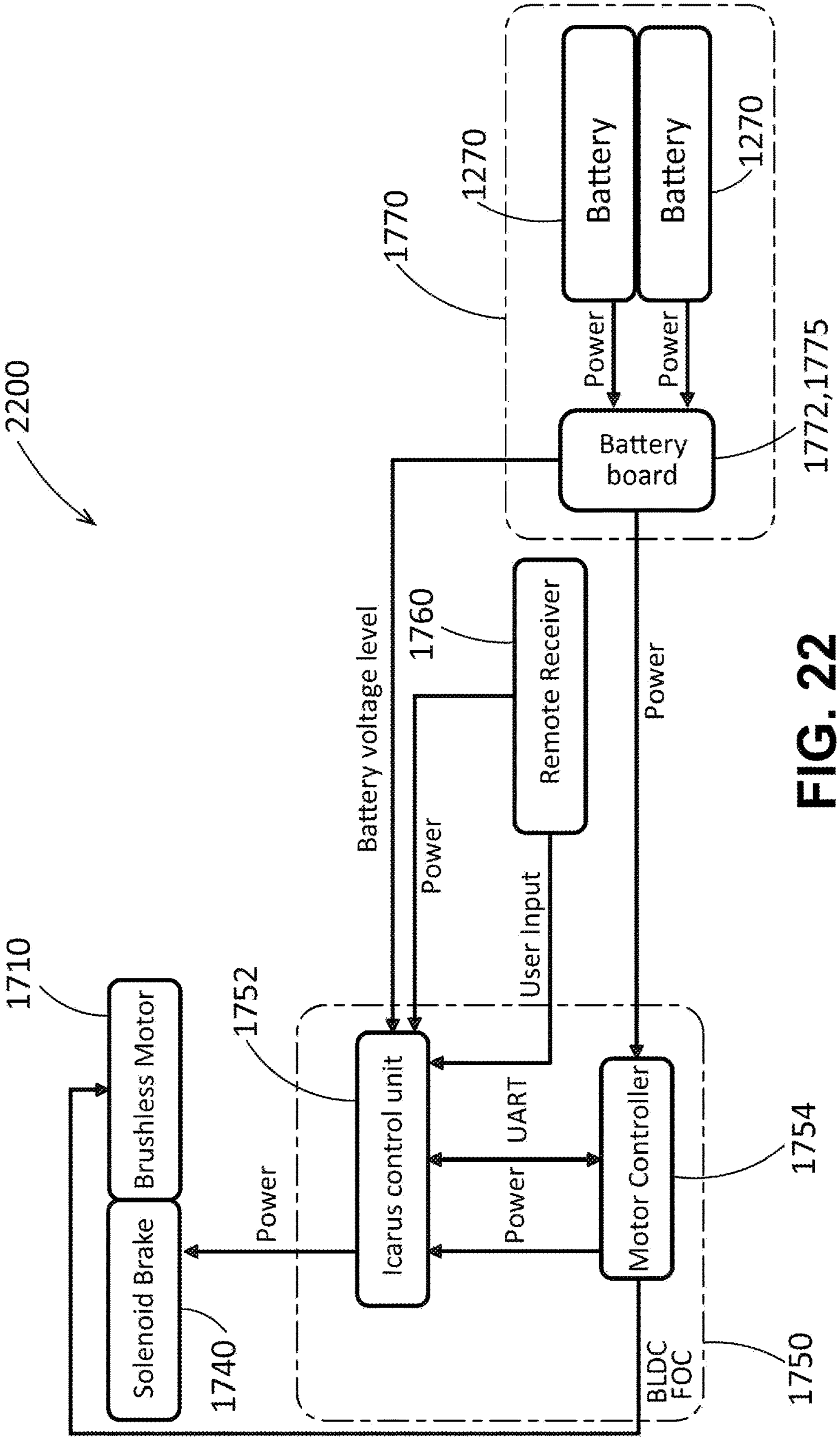
FIG. 22 is a block diagram showing relationships between various electrical components of the drive of FIG. 1.

FIG. 22 is a block diagram 2200 showing a relationship between various electrical components of the drive 130 of FIG. 1. The main power supply 1770, which can comprise the battery mount 1775, the battery board 1772, and the batteries 1270, can be in electrical communication with each of the main controller 1752 and the motor controller 1754. Again, the controller unit 1750 can comprise the main controller 1752 and the motor controller 1754. The motor controller 1754 can be in electrical communication with the motor 1710 and can be configured to directly control the motor 1710, which can be by field oriented control (FOC). The main controller 1752 can be in electrical communication with each of the remote receiver 1760, the motor controller 1754, and the brake 1740. The main controller 1752 can be configured to control the motor controller 1754. The main controller 1752 can be configured to receive input from the motor controller 1754 (e.g., rotational speed or RPM of the motor 1710). The main controller can be configured to receive input from the signal receiver 1760. This exchange of instructions and/or data between the main controller 1752 and the motor controller 1754 can follow a universal asynchronous receiver-transmitter (UART) protocol. The signal receiver 1760 can be in wireless communication with the remote control 200 (shown in FIG. 2). For simplicity, the wiring to the indicator lights 1240*a,b* (shown in FIG. 12) is not shown. Each of or either of the main controller 1752 and the motor controller 1754 and, more generally, the controller unit 1750 can be configured with various logic to control the motion of the motor 1710 and, thereby, the system 100. The motor controller 1754 can be Model FSESC 67 Pro or similar, available from Flipsky of Dongguan, China.

Figure 23A:
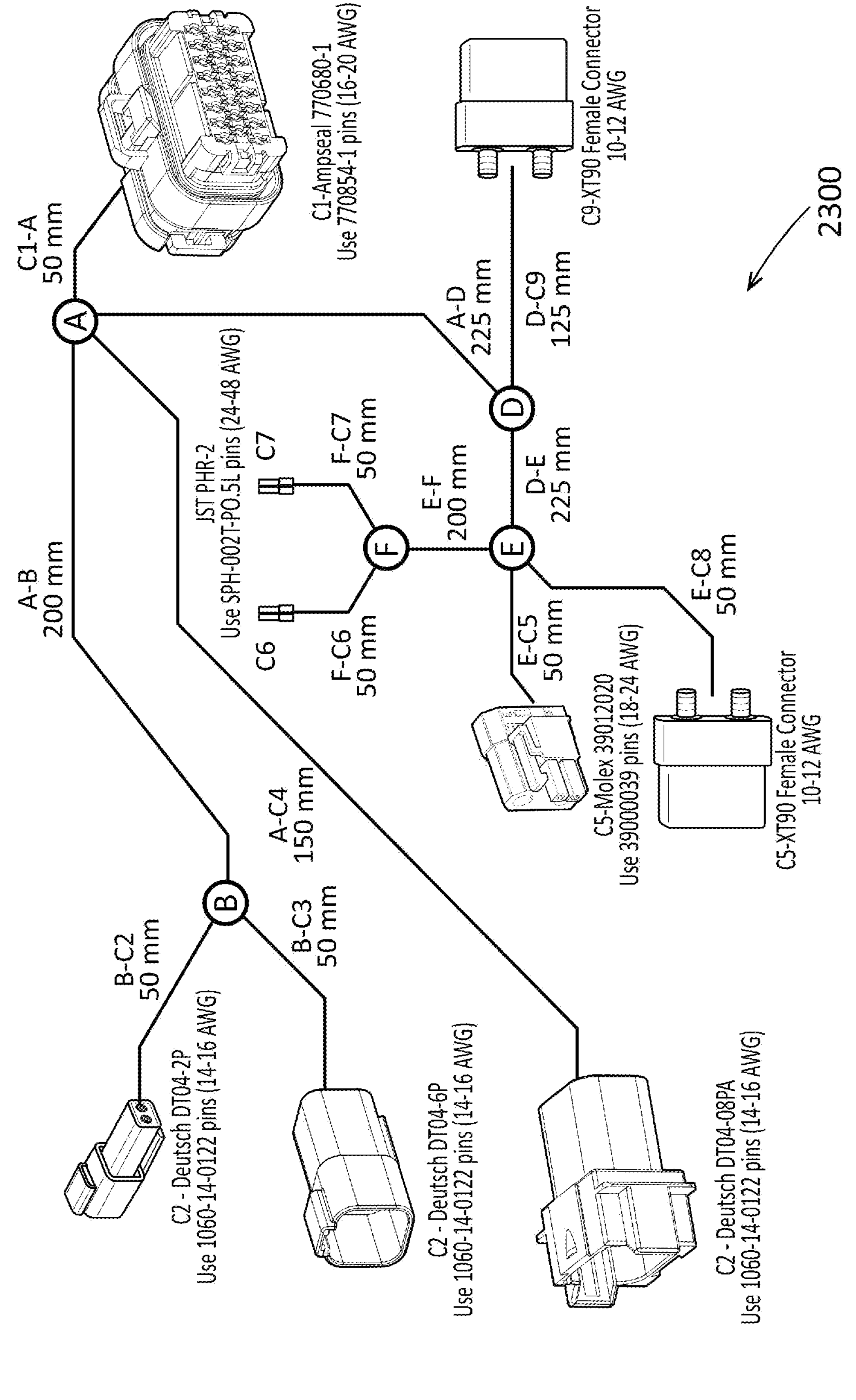
FIG. 23A is a diagram showing a relationship between various connectors of the drive of FIG. 1.
Figure 23B:
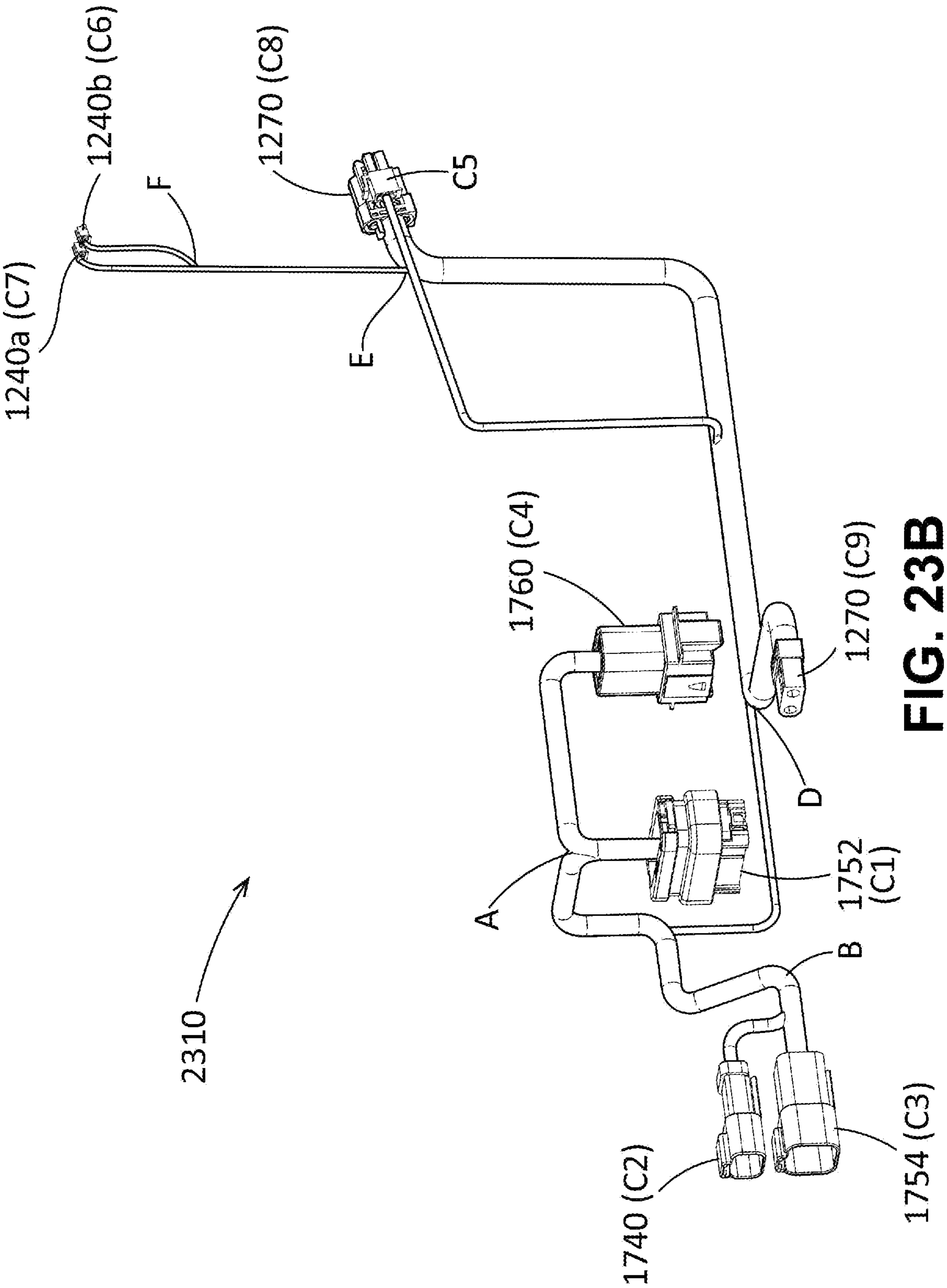
FIG. 23B is a front perspective view showing a wiring harness comprising the various connectors of FIG. 23A.

FIG. 23A is a diagram 2300 showing relationships between various connectors of the drive of FIG. 1, FIG. 23B is a front perspective view showing a wiring harness 2310 comprising the various connectors of FIG. 23A, with the components to which the connectors can be connected so identified.

Figure 24:
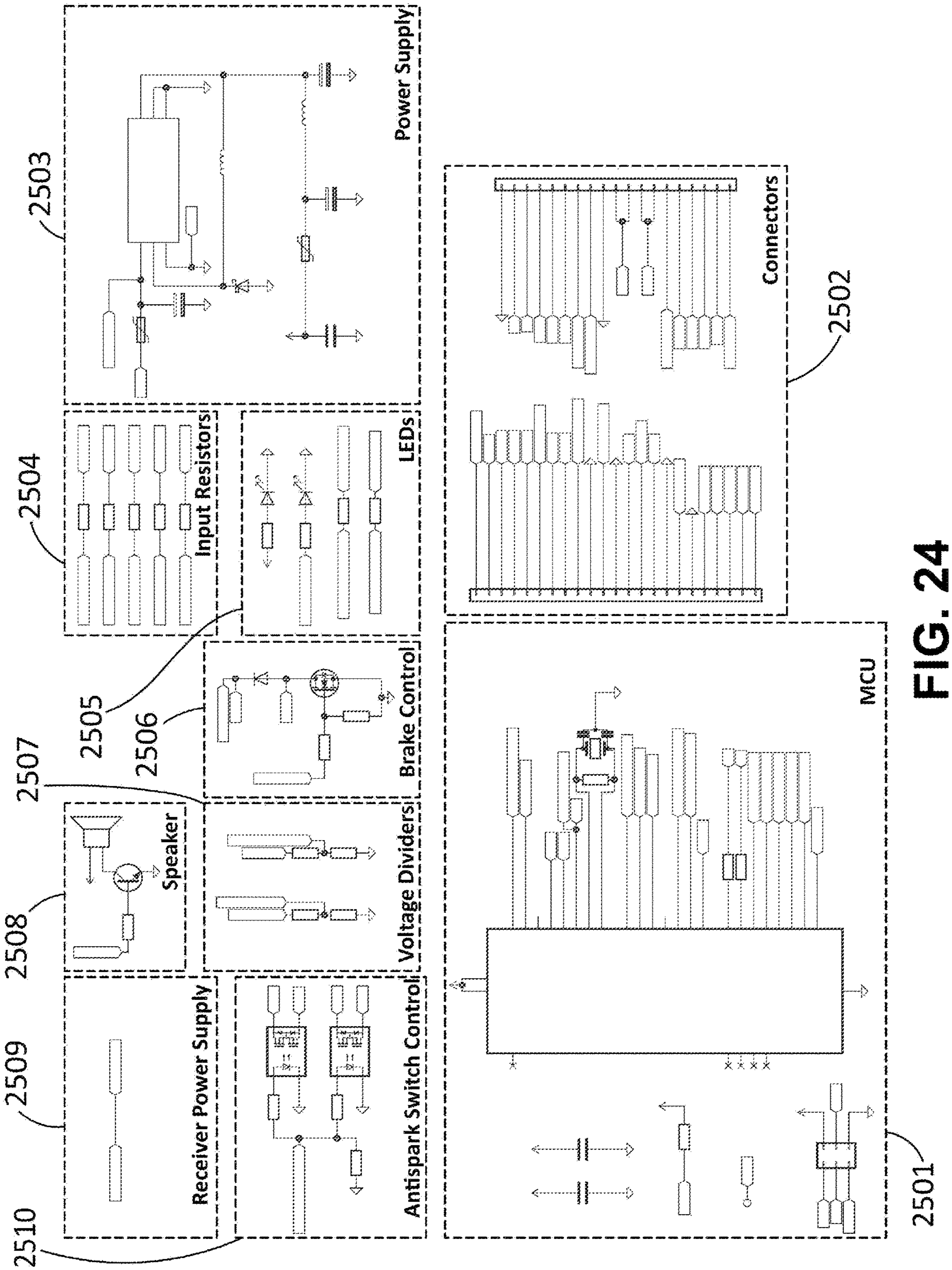
FIG. 24 is a collection of electrical schematics for various electrical circuits or portions of an electrical circuit of the drive of FIG. 1.
Figure 25A:
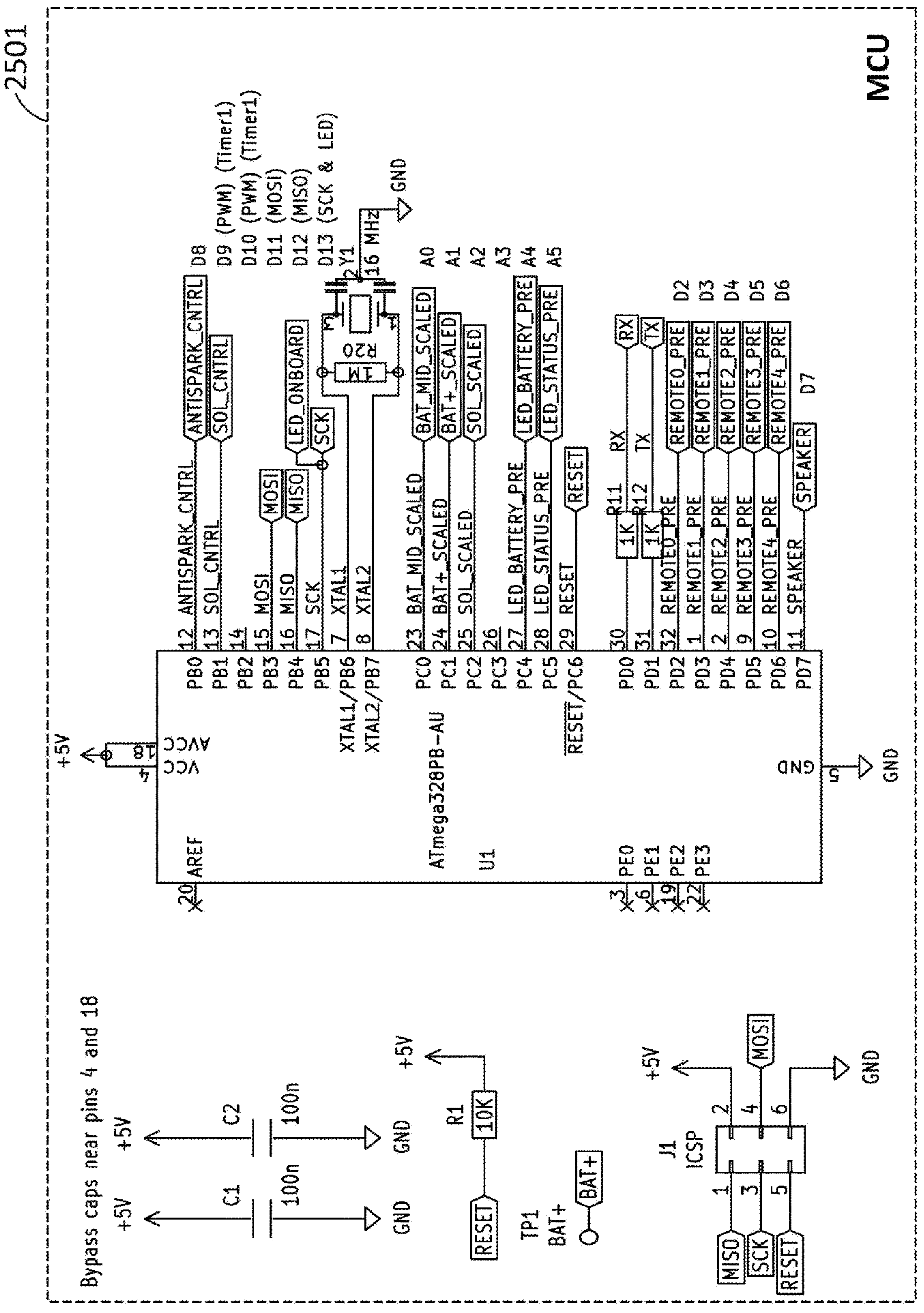
FIG. 25A is an electrical schematic for a first motor controller unit or a main controller of the drive of FIG. 1.
Figure 25B:
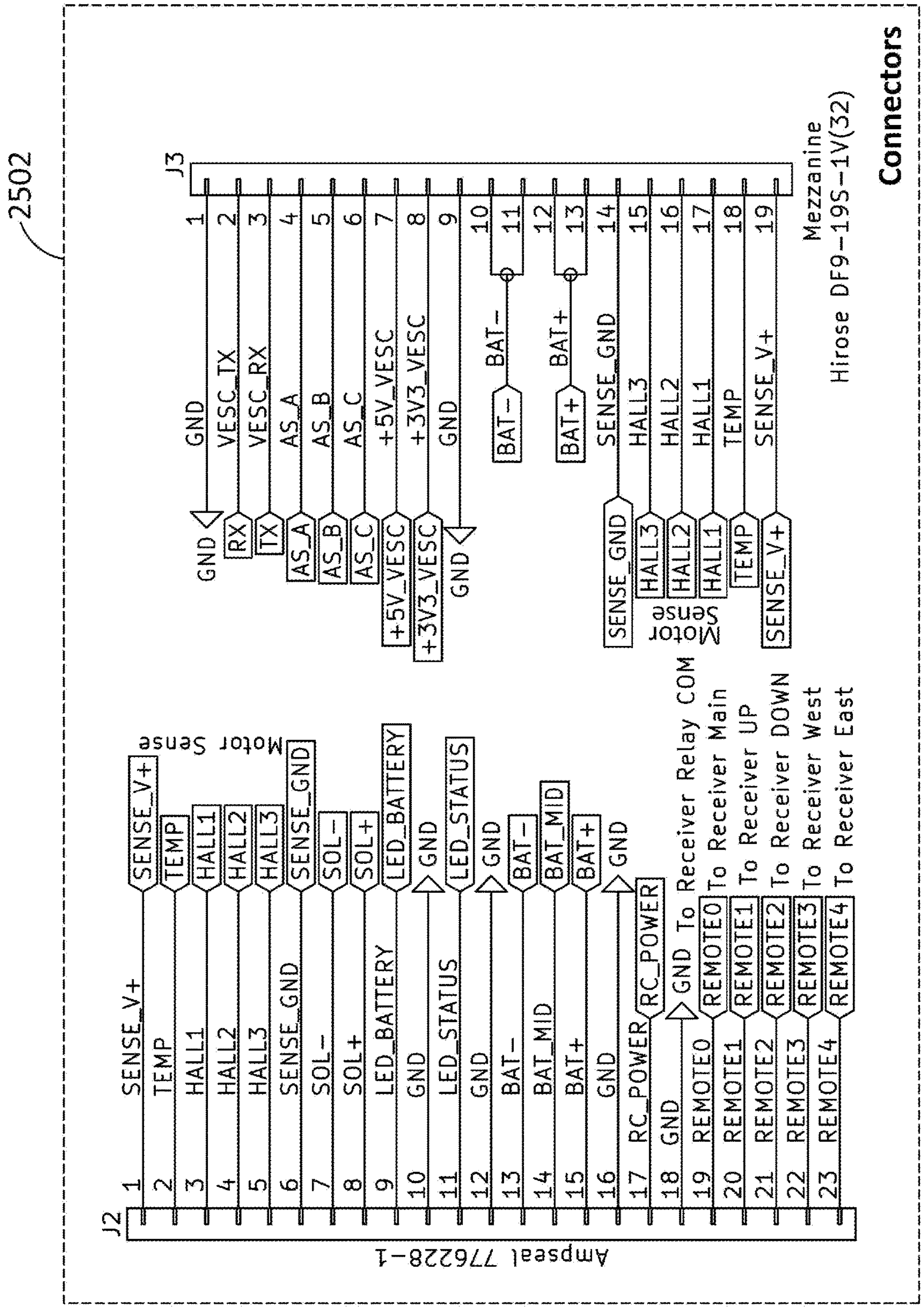
FIG. 25B is an electrical schematic for connectors of the drive of FIG. 1.
Figure 25C:
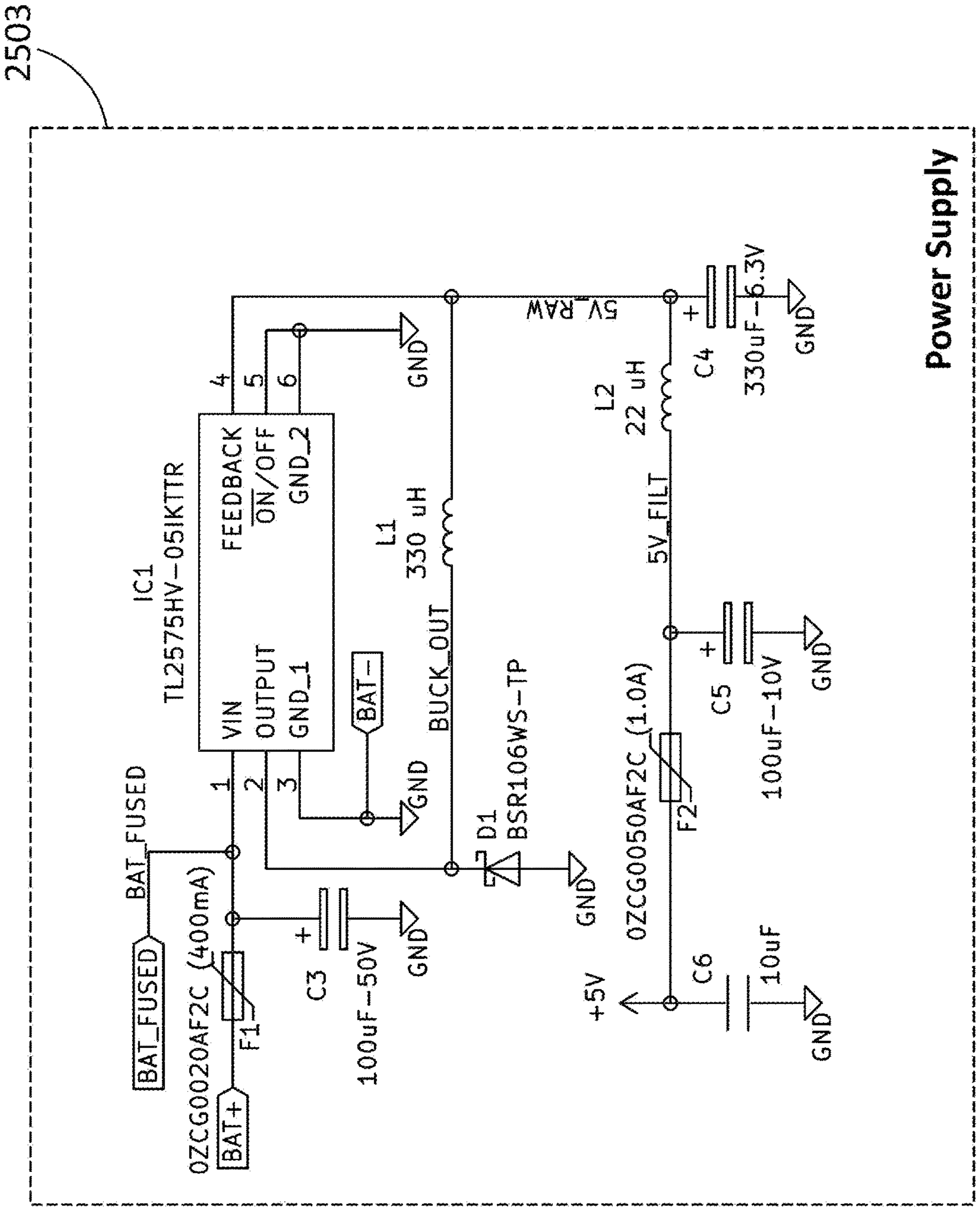
FIG. 25C is an electrical schematic for a power supply or main power supply of the drive of FIG. 1.
Figure 25D:
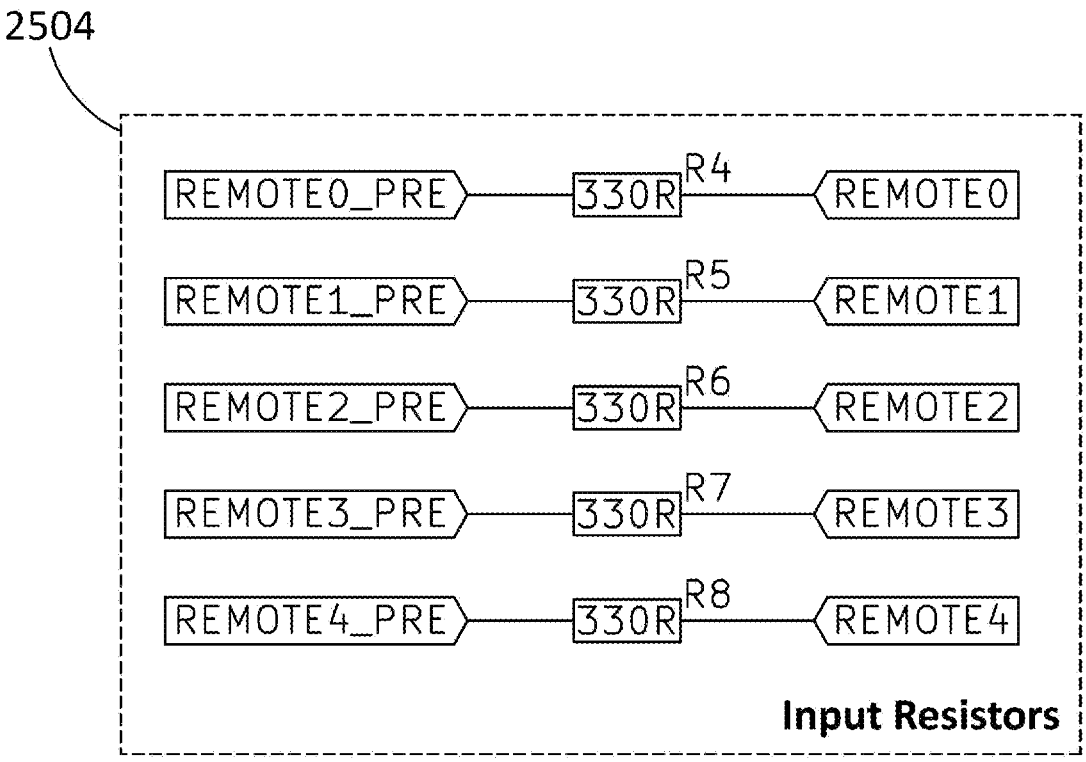
FIG. 25D is an electrical schematic for input resistors of the drive of FIG. 1.
Figure 25E:
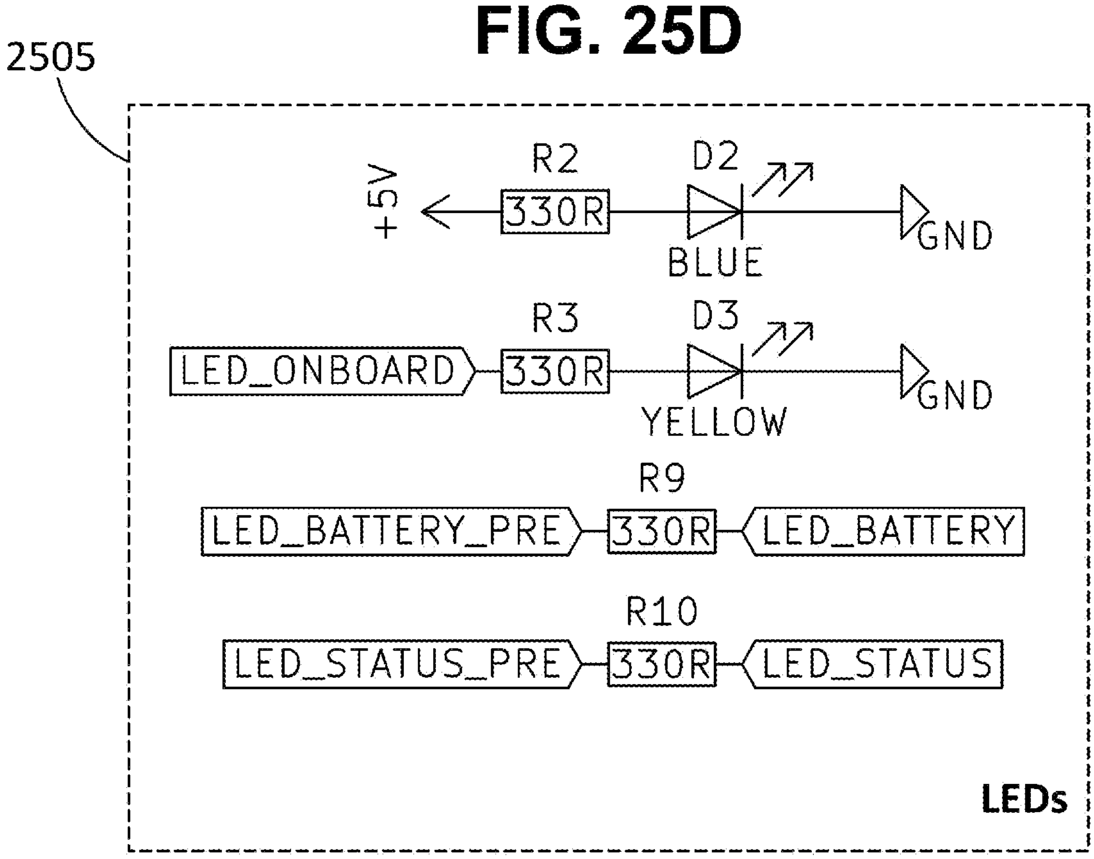
FIG. 25E is an electrical schematic for the indicator lights of the drive of FIG. 1.
Figure 25F:
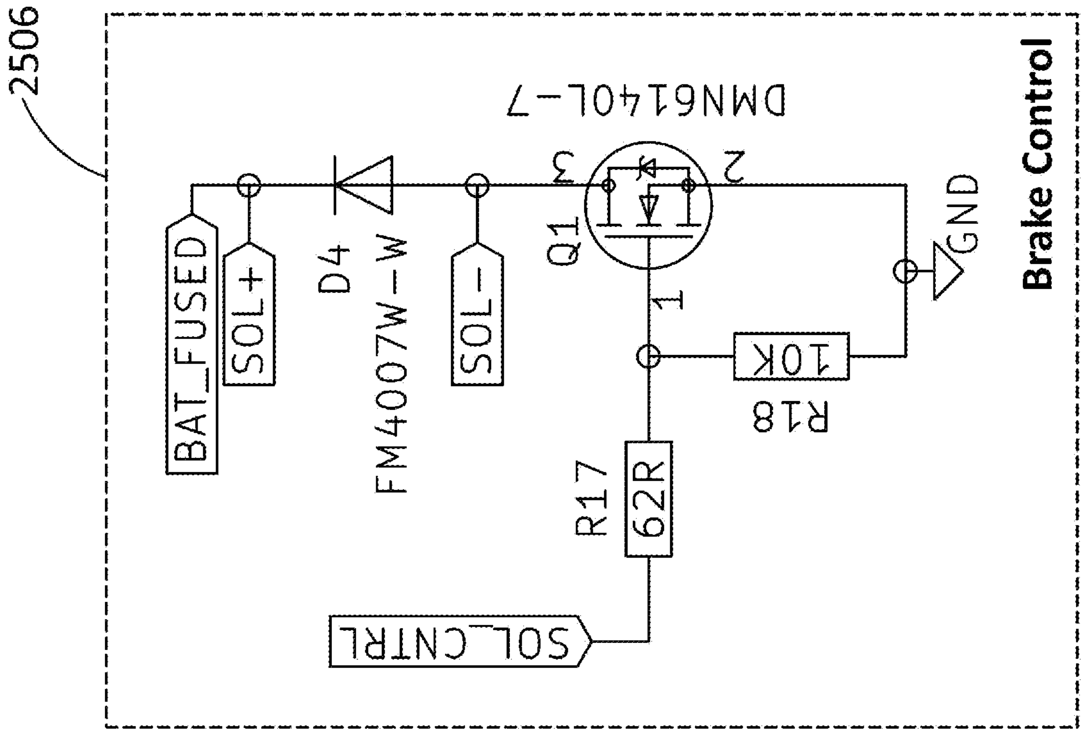
FIG. 25F is an electrical schematic for a brake control of the drive of FIG. 1.
Figure 25G:
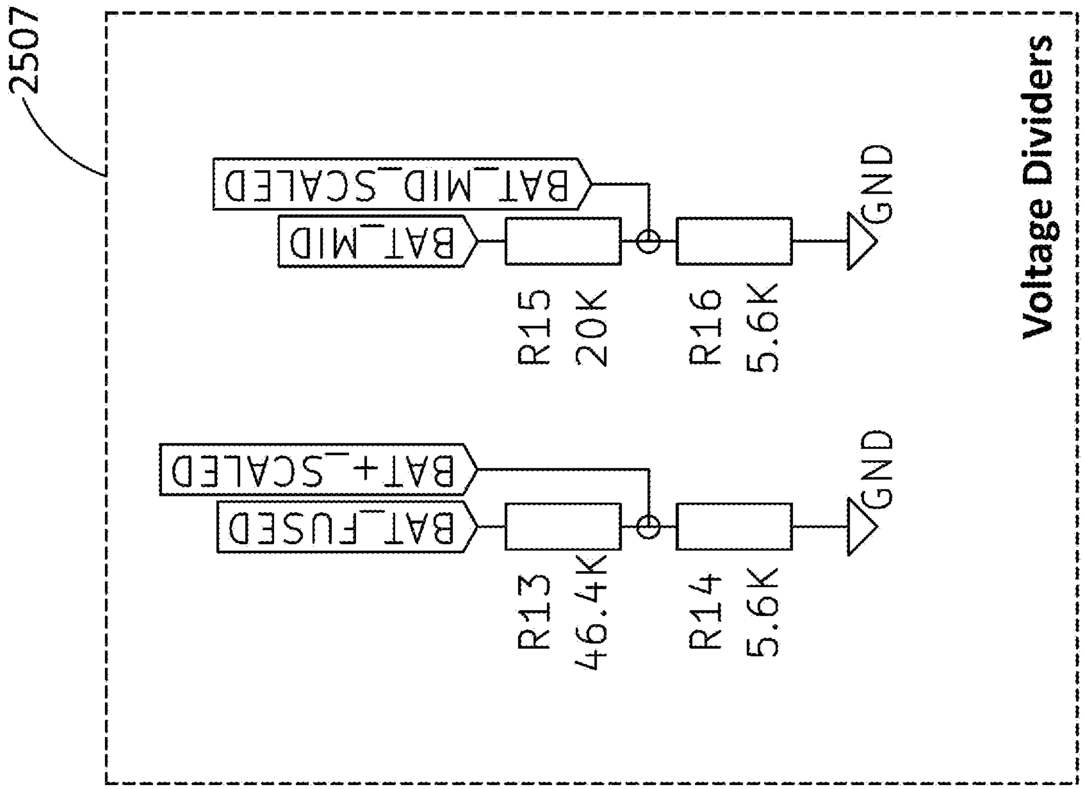
FIG. 25G is an electrical schematic for voltage dividers of the drive of FIG. 1.
Figure 25H:
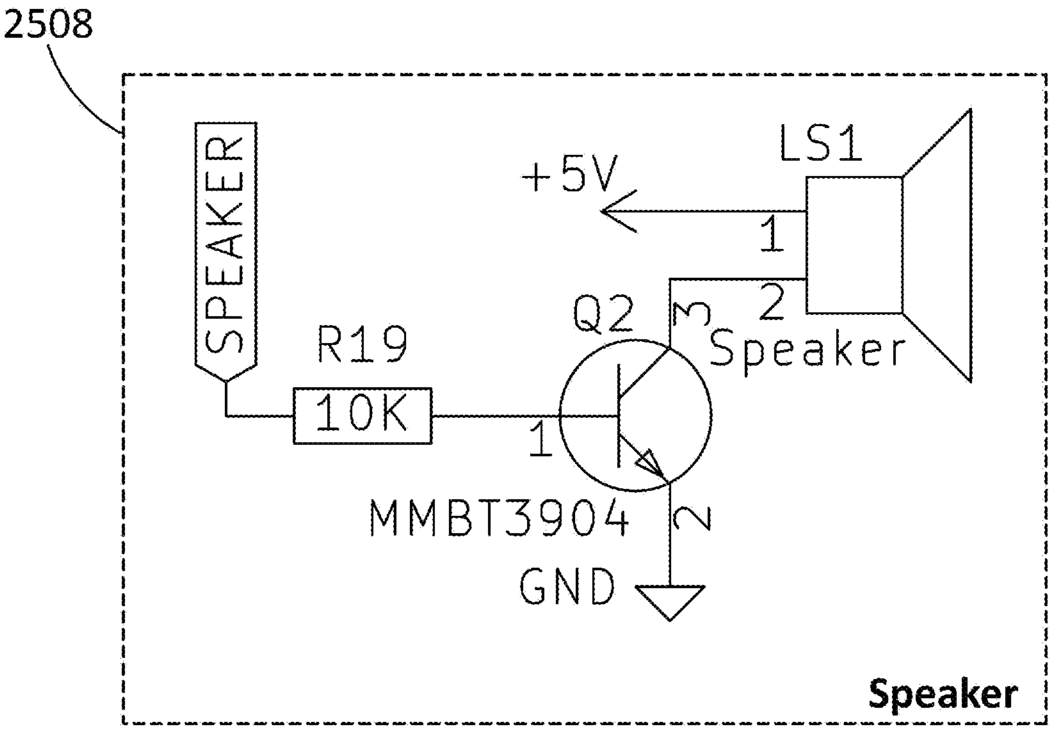
FIG. 25H is an electrical schematic for a speaker of the drive of FIG. 1.
Figure 25I:
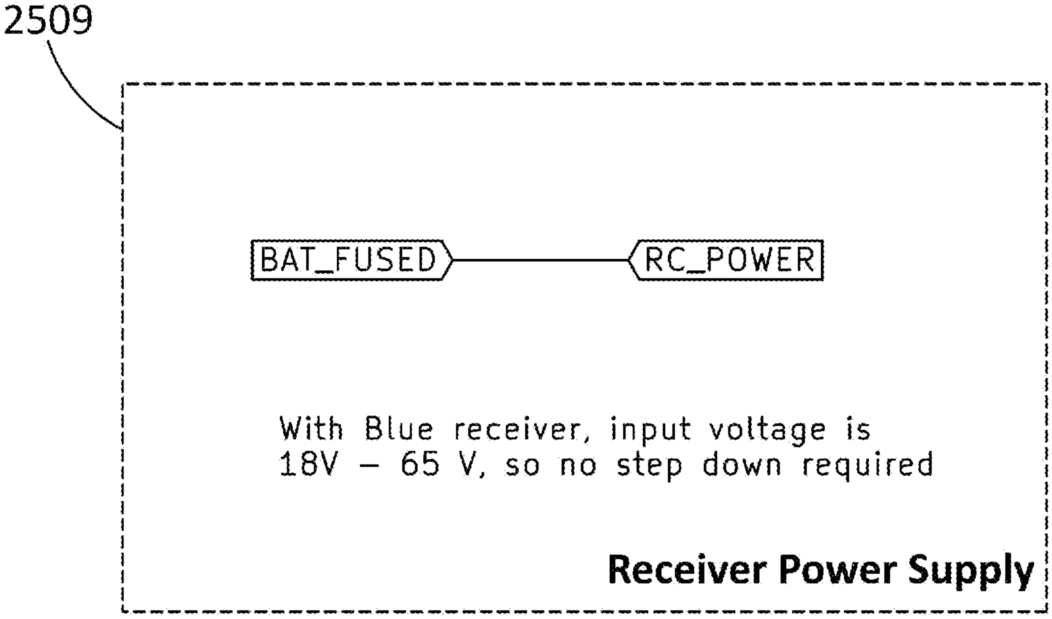
FIG. 25I is an electrical schematic for a receiver power supply of the drive of FIG. 1.
Figure 25J:
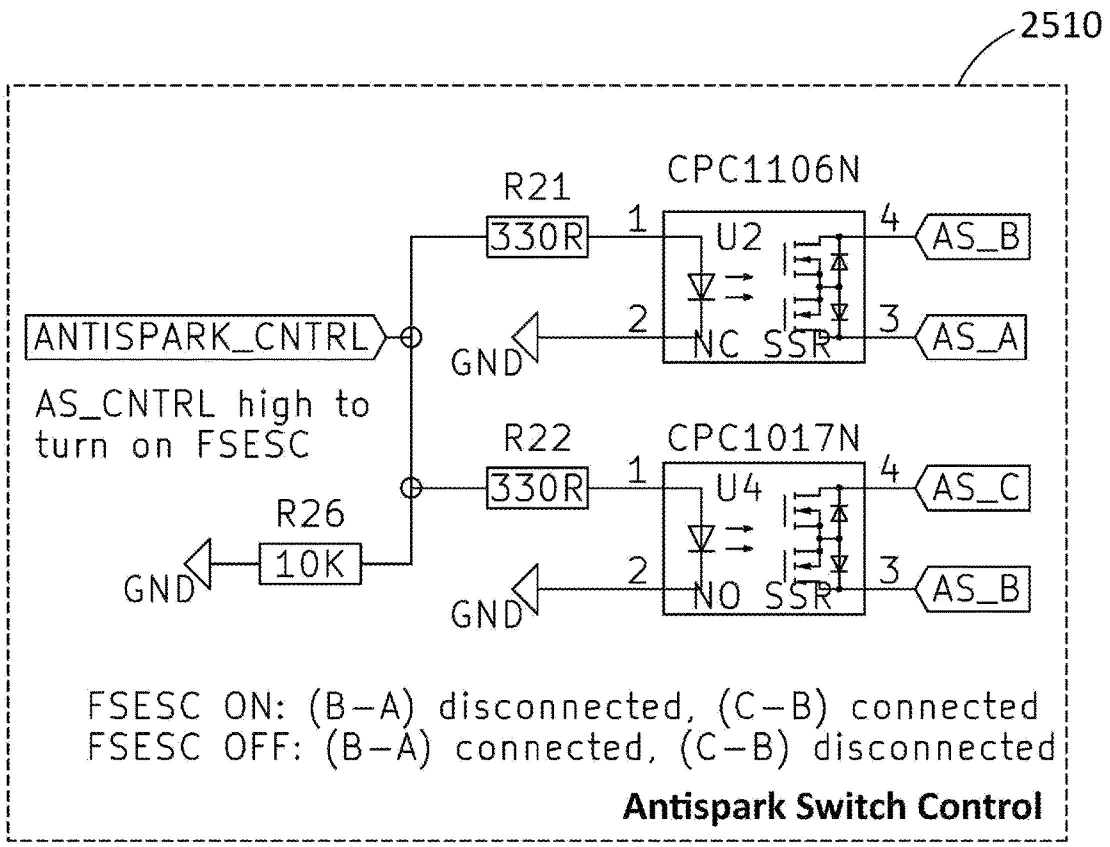
FIG. 25J is an electrical schematic for an anti-spark switch control of the drive of FIG. 1.
Figure 25K:
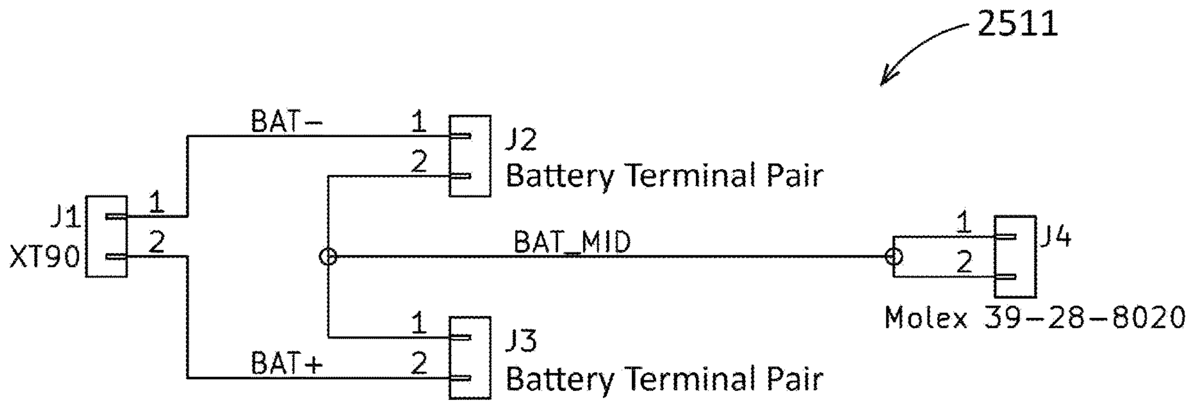
FIG. 25K is an electrical schematic for a dual battery mount of the drive of FIG. 1.

FIG. 24 is a collection of electrical schematics 2501-2510 for various electrical circuits or portions of an electrical circuit of the drive 130 of FIG. 1, and FIGS. 25A-25J show the electrical schematics 2501-2510 of FIG. 24. FIG. 25A is an electrical schematic 2501 for a first motor controller unit or main controller 1752 of the drive 130 of FIG. 1. FIG. 25B is an electrical schematic 2502 for connectors of the drive 130 of FIG. 1. FIG. 25C is an electrical schematic 2503 for a power supply or main power supply 1770 of the drive 130 of FIG. 1. FIG. 25D is an electrical schematic 2504 for input resistors of the drive 130 of FIG. 1. FIG. 25E is an electrical schematic 2505 for the indicator lights 1240*a,b* of the drive 130 of FIG. 1. FIG. 25F is an electrical schematic 2506 for a brake control of the drive 130 of FIG. 1. FIG. 25G is an electrical schematic 2507 for voltage dividers of the drive 130 of FIG. 1. FIG. 25H is an electrical schematic 2508 for a speaker of the drive 130 of FIG. 1. FIG. 25I is an electrical schematic 2509 for a receiver power supply of the drive 130 of FIG. 1. FIG. 25J is an electrical schematic 2510 for an anti-spark switch control of the drive 130 of FIG. 1. Additionally, FIG. 25K is an electrical schematic 2511 for a dual battery mount of the drive 130 of FIG. 1.

Figure 26:
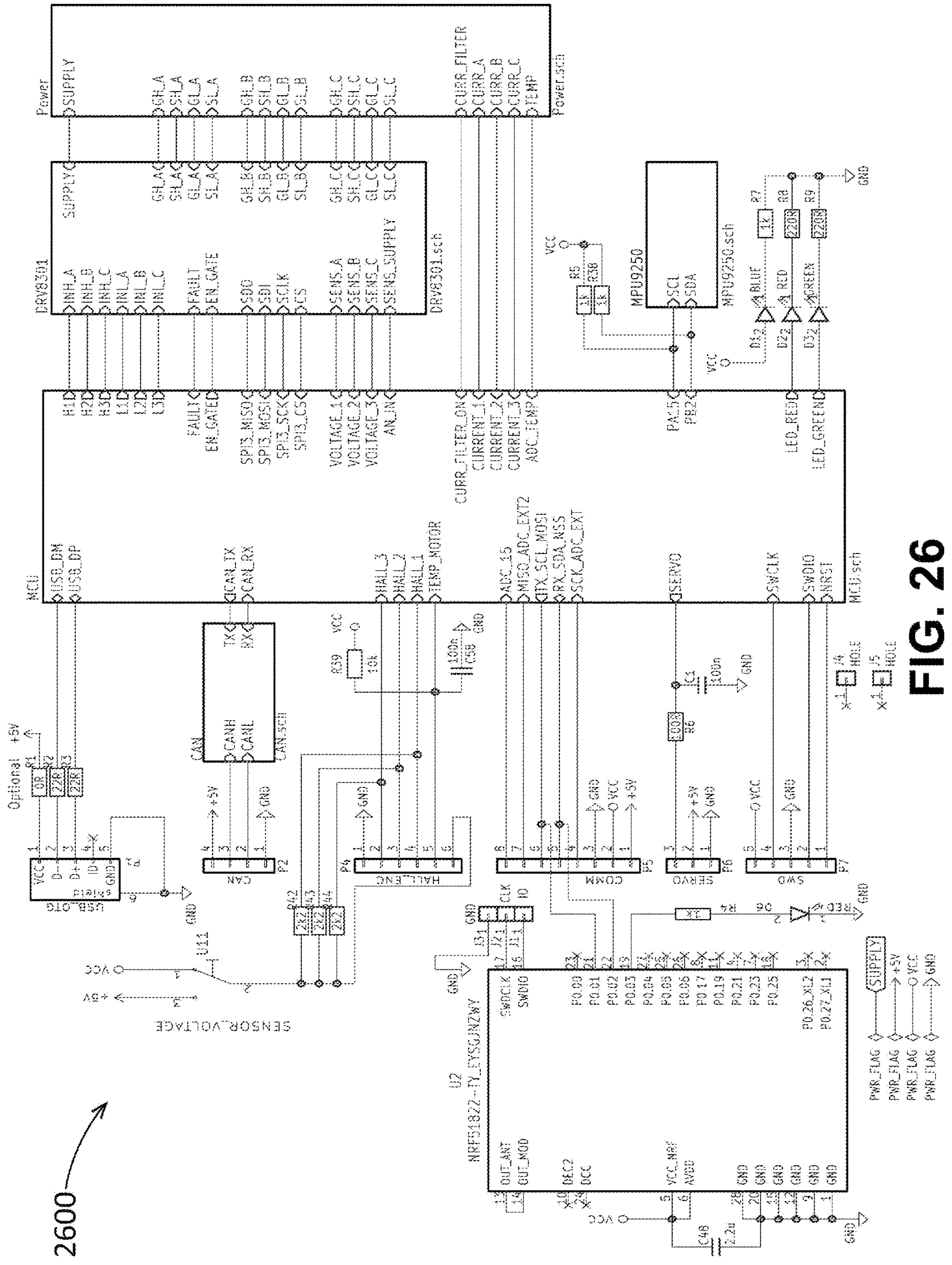
FIG. 26 is an electrical schematic for a second motor controller or motor controller of the drive of FIG. 1.

FIG. 26 is an electrical schematic 2600 for a second motor controller or motor controller 1754 of the drive 130 of FIG. 1.

Figure 27:
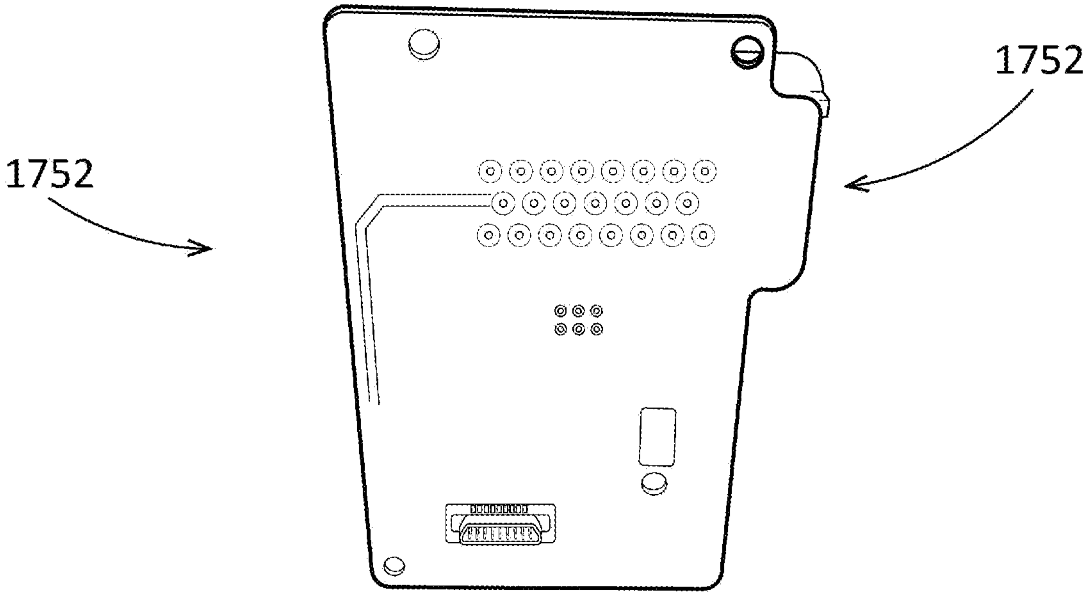
FIG. 27 is a bottom view of the main controller of FIG. 25A.

FIG. 27 is a bottom view of the main controller 1752 of FIG. 25A.

Figure 28:
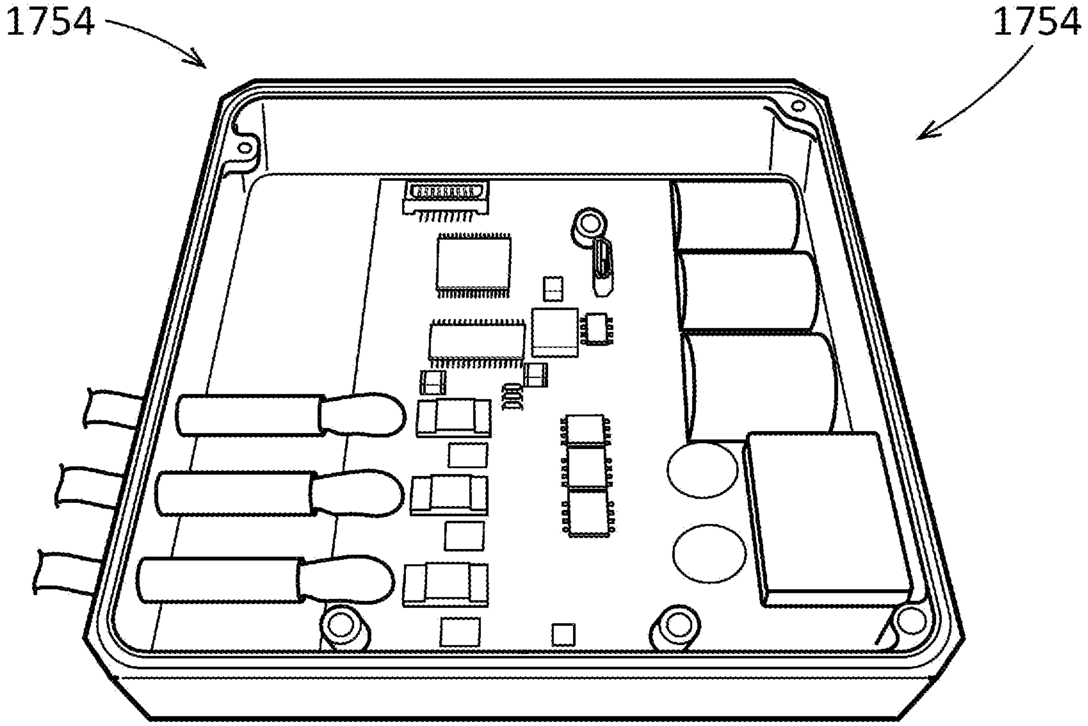
FIG. 28 is a top view of the motor controller of FIG. 26.

FIG. 28 is a top view of the motor controller 1754 of FIG. 26.

Figure 29:
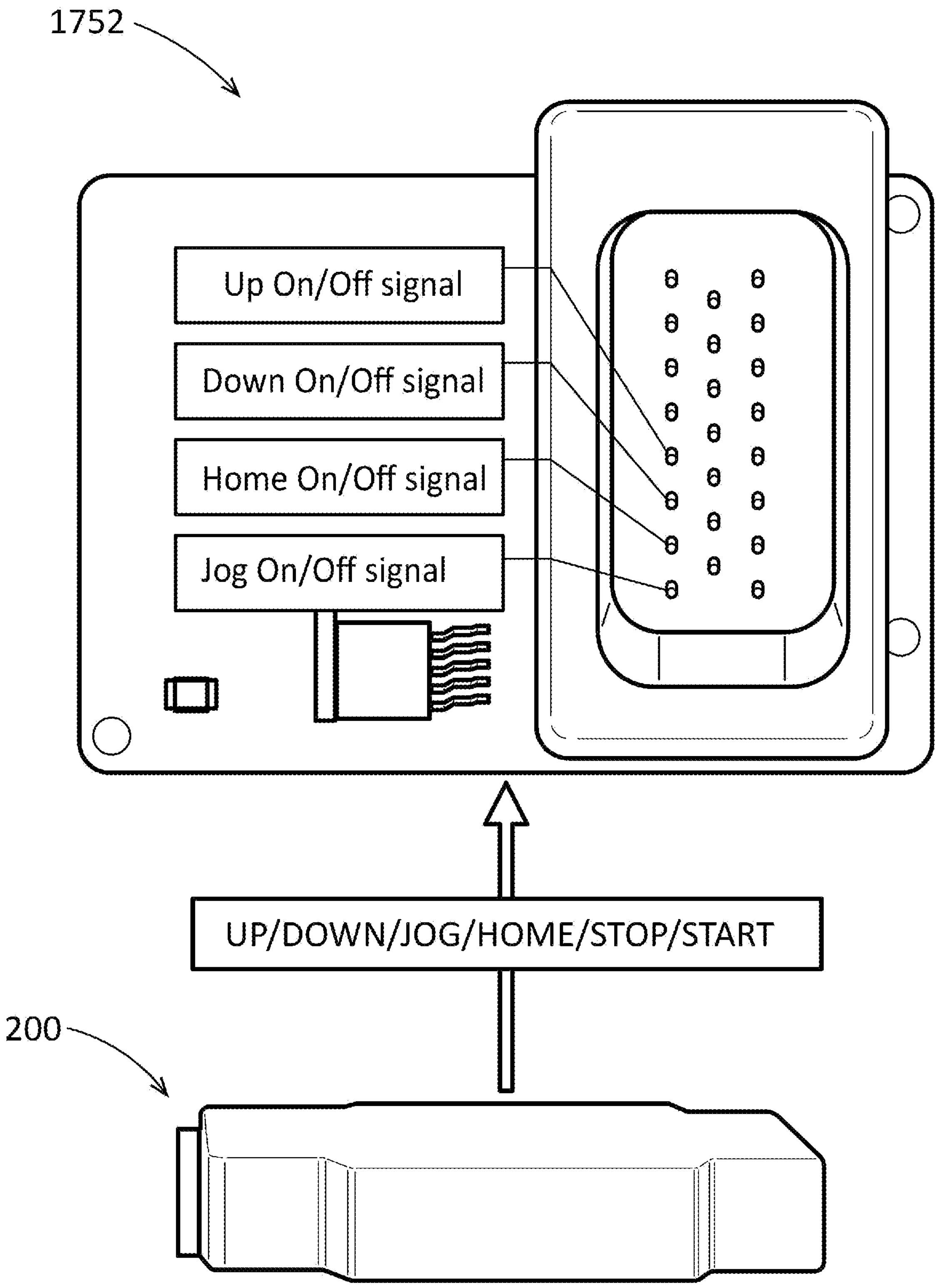
FIG. 29 is a top view of the main controller of FIG. 25B and a side view of the remote control of FIG. 2.

FIG. 29 is a top view of the main controller 1752 of FIG. 25B and a side view of the remote control 200 of FIG. 2. As shown, the user can be provided with a plurality of options via the user input surfaces 280 (shown in FIG. 2) on the remote control 200. In some aspects, the user can select one of the following six options via a separate user input surface 280 (e.g., button): UP and DOWN, JOG and HOME, and STOP and START.

A user can press a RED "Stop" Button to cancel movement of hoist. The STOP button can also function as a safety lockout. The UP and DOWN buttons can remain deactivated until the START button is pressed. The user can press the GREEN "START" button to activate the system 100. The LED light on the remote control 200 can blink GREEN to indicate that the UP, DOWN, JOG, and HOME buttons are active.

The user can press the "UP" Button to move the hoist (e.g., the carriage 120 and the drive 130) up the track 110. When the unit is first powered up, pressing and holding the "UP" button can spool IN the flexible connecting element 150. After the homing routine is completed, a single press of the "UP" button can send the hoist to the top position. The user can press the "DOWN" button to lower the hoist. When the unit is first powered up, pressing and holding the "DOWN" button can spool OUT the flexible connecting element 150. After the homing routine is completed, a single press of the "DOWN" button can send the hoist to the bottom position.

The user can press the HOME button a single time to begin the homing process. The hoist can begin to climb the track 110 very slowly until it bumps the upper stop on the flexible connecting element 150. If it is desired to have the hoist stop at an upper position below the cable stop, the HOME button can be pressed again at any time during the slow climb. After the homing position has been set, the user can press and hold the "JOG" button in addition to the "UP" or "DOWN" button to manually move the hoist up or down.

Figure 30:
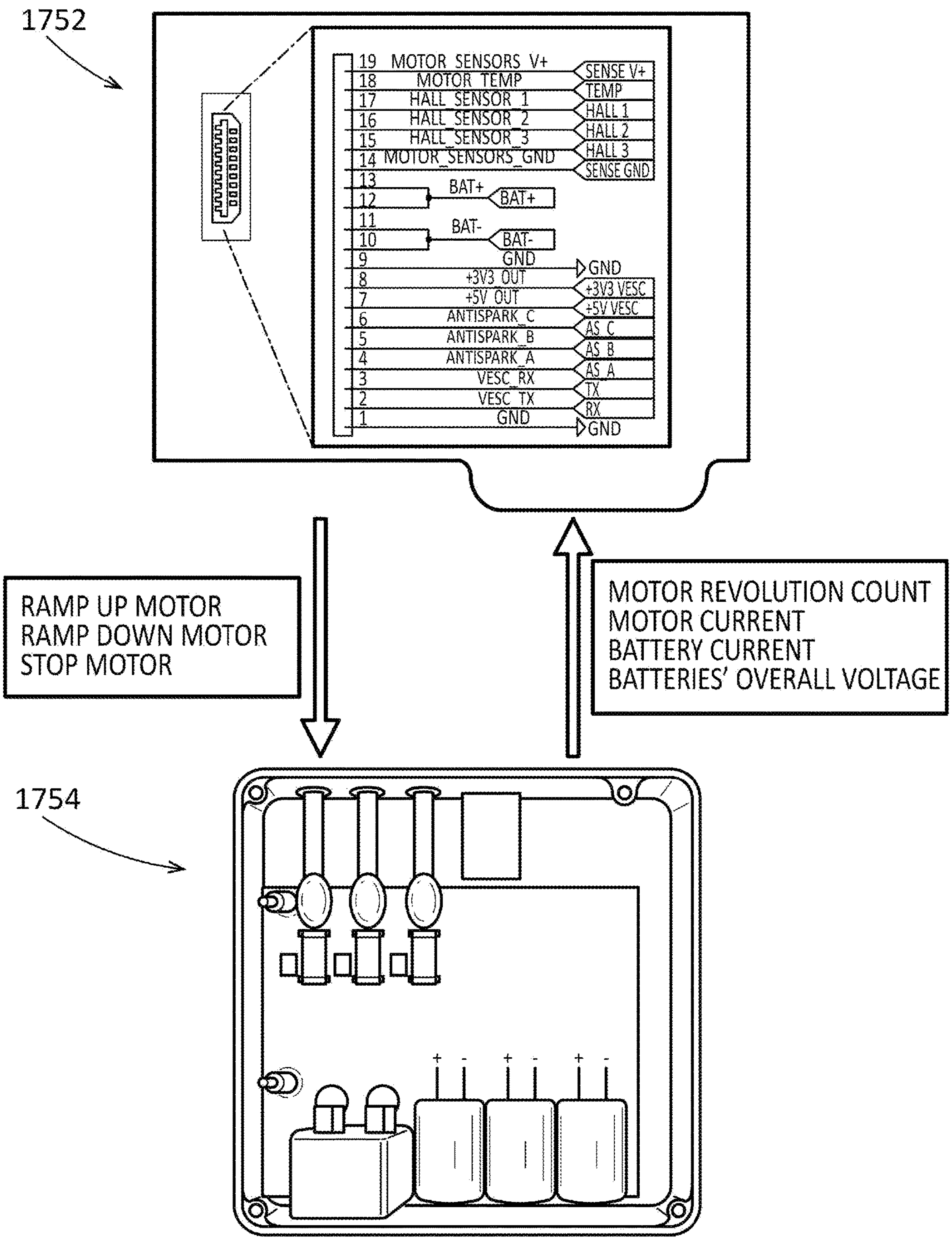
FIG. 30 is another top view of the main controller of FIG. 25A and another top view of the motor controller of FIG. 26.

FIG. 30 is another top view of the main controller 1752 of FIG. 25A and another top view of the motor controller 1754 of FIG. 26. Input from the main controller 1752 to the motor controller 1754 can include any one or more of the following instructions: ramp up motor, ramp down motor, and stop motor. Input to the main controller 1752 from the motor controller 1754 can include any one or more of the following feedback: motor revolution count (e.g., RPM), motor current, battery current, and batteries' overall voltage.

Figure 31:
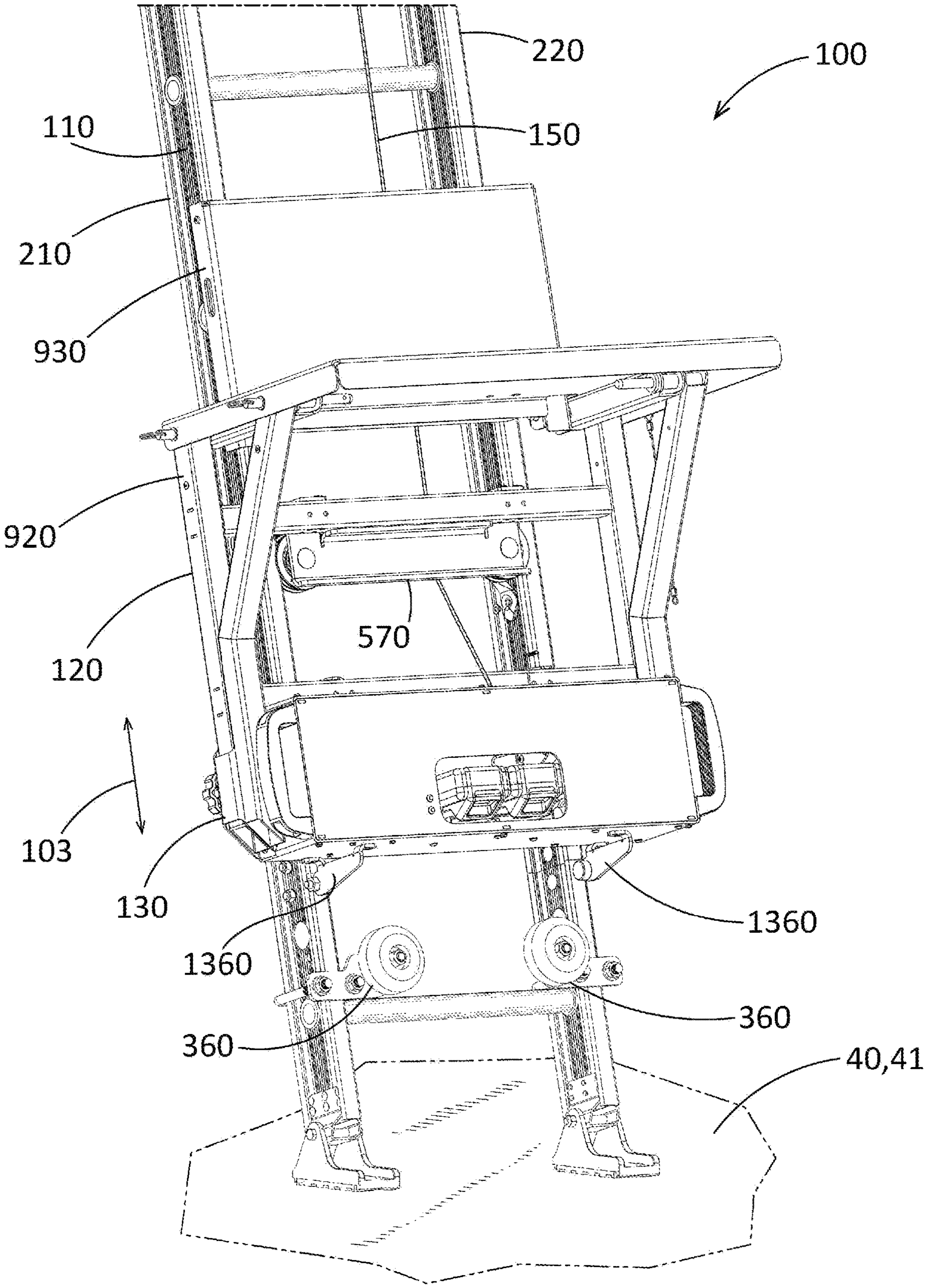
FIG. 31 is a detail front perspective view of the bottom end of the material hoist system of FIG. 1.

FIG. 31 is a detail front perspective view of the material hoist system 100 of FIG. 1. As shown, the carriage 120 can be positioned proximate to a bottom end 115 of the track 110 and proximate to the stops 360.

Figure 34:
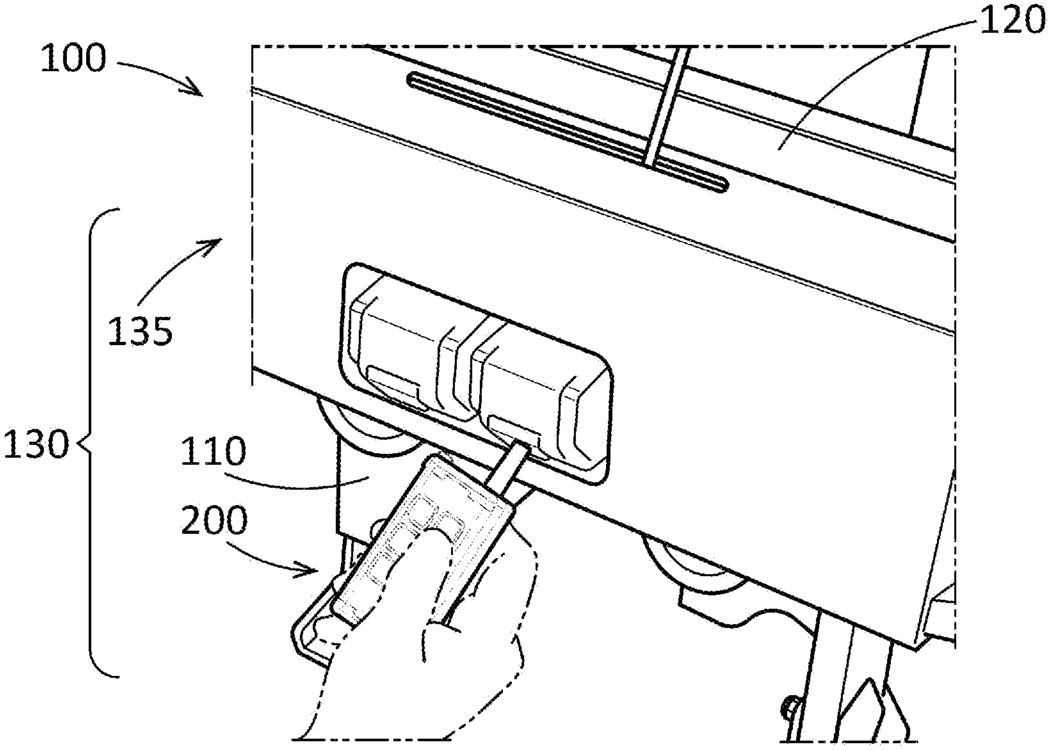
FIG. 34 is a front top perspective view of the drive of FIG. 1 being controlled by a user via the remote control of FIG. 2.

Skipping ahead, FIG. 34 is a front top perspective view of the drive 130 of FIG. 1 being controlled by a user via the remote control 200 of FIG. 2.

A method of using the system 100 can comprise selecting an option on the remote control 200 to return the carriage 120 to the "home" position. More specifically, the method can comprise selecting the "HOME" option. The method can comprise placing the load 80 (shown in FIG. 32) on the carriage 120 and, more specifically, on an upward-facing surface thereof. The method can comprise selecting an option on the remote control 200 to drive the carriage 120 up the track 110. More specifically, the method can comprise selecting the "UP" option. The method can comprise lifting the load 80 to the elevated structure 50 with the system 100 (shown in FIG. 32).

A method of using the main controller 1752 and, more generally, the drive 130 and the system 100 can comprise slidably moving the carriage 120 of the system 100 with respect to the track 110. The method can comprise driving movement of the carriage 120 with respect to the track 110 with the drive 130 of the system 100. The method can comprise stopping the movement of the carriage 120 when the controller unit 1750 of the drive 130 senses that motor conditions have reached both a first threshold (e.g., for electrical current) and a second threshold (e.g., for rotational speed, e.g., RPM). The motor controller 1754 and thereby also the main controller 1752 can sense each of the current and the rotational speed of the motor 1710 through a feedback loop (e.g., by iterative measurement of the current and the rotational speed by the motor controller 1752 during operation of the system 100).

A method of sensing whether the motor conditions have reached current and/or speed thresholds can comprise, at any point during operation and at certain times when programmed (i.e., when the user selects the "HOME" option on the remote control 200), the main controller 1752 automatically instructing the motor 1710 to draw in the flexible connecting element 150 at a relatively slow rate of speed. As the flexible connecting element 150 is drawn in, the method can comprise the main controller 1752 monitoring and recording/storing the electric current drawn by the motor 1710. During normal operation, the current can be expected to remain about constant. The current draw by the motor 1710 can increase substantially as the flexible connecting element 150 is drawn in to its furthest extent, such as when a stop collar of the flexible connecting element 150 contacts an edge of the opening 1218, when the carriage 120 reaches the top end 116 of the rail or when other interference occurs. If the current in the motor 1710 increases or "spikes," the main controller 1752 can instruct the motor 1710 to stop drawing in the flexible connecting element 150. Moreover, the main controller 1752 can record the corresponding position of the motor 1710 as the top end 116 of the track 110 and can impose a software-based stop on the motor 1710 so that the motor 1710 can be prevented from driving past that position again later. In various aspects, the current threshold used to note a substantial or significant "spike" in the current to determine a stop location can be an 20% increase in the current. In various aspects, thresholds can range from 10% to 100% increase in current before annotating the spike as a substantial or significant spike to record a stop location. It should be noted that the functionality described can be achieved without additional sensors other than the motor 1710, although in various aspects various sensors can be included either for redundancy or for primary placement monitoring. Using the aforementioned features, single-touch operation of the system 100 is possible. More specifically, a user need not visually monitor the system 100 and manually operate the drive 130 to prevent it from travelling to far. Rather, the drive can stop on its own at any point as determined by the latest user instructions in concert with the thresholds.

A method of using the drive 130 and, more generally, the system 100 can comprise rotating a shaft of the motor 1710 (shown in FIG. 17). The method can comprise rotating the output shaft 1812 and any further drive shaft segments such as, for example and without limitation, the shaft 1832. The method can comprise rotating the input connection 1825 and the inner mechanism of the gearbox 1720. Considering that the output shaft 1822 can be fixed in the adapter 1820, the method can comprise rotating the body 1810 of the gearbox 1720. The method can comprise rotating the spool 1730 and thereby winding up a portion of the flexible connecting element 150 on the spool 1730. The method can comprise lifting the load 80 with the carriage 120 by a desired distance up to the elevated surface. With the carriage 120 now proximate to the elevated structure 50, the method can comprise a user on the elevated surface 51 removing the load 80 lifted up the track 110 by the system 100.

With the output shaft, directly or indirectly, coupled to the input shaft or recess 1828 of the gearbox 1720, the inner workings of the gearbox 1720 can turn as well. The gearbox output shaft 1822 can be fixed in the adapter 1820, however, and so the component to turn next can be the gearbox body 1810. With the gearbox body 1810 secured to the first end cap 1755 of the drum 1733, the spool 1730 can be the next and final component to rotate. In some aspects, therefore, the output shaft 1822 of the gearbox 1720 can remain stationary during operation and movement of the drive 130 and a body of the gearbox 1720 can rotate instead.

Figure 32:
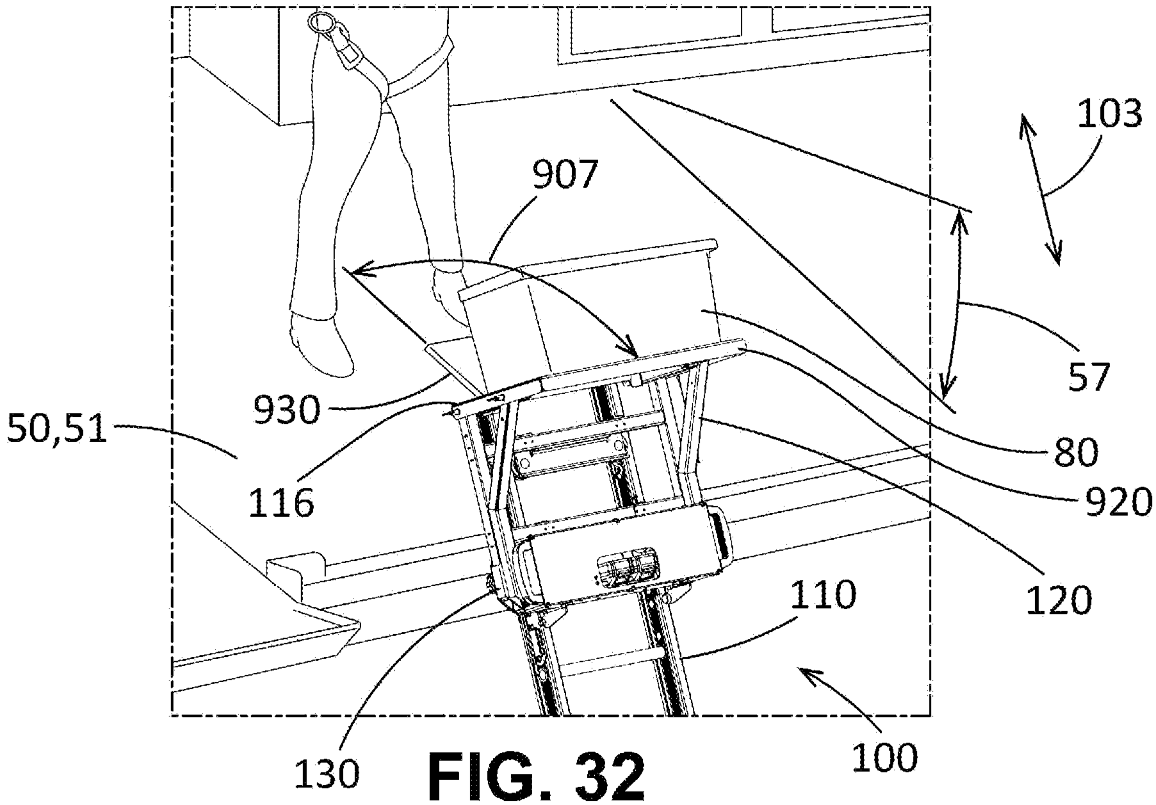
FIG. 32 is a top perspective view of a top end of the material hoist system of FIG. 1 in place and, more specifically, leaned against the roof of a residential structure, wherein the carriage is in transition between a first configuration (e.g., a transport configuration) and a second configuration (e.g., an arrival configuration) in which the second portion of the carriage is changing its orientation with respect to the first portion.

Skipping back, FIG. 32 is a top perspective view of the material hoist system 100 of FIG. 1 in place and, more specifically, leaned against the elevated structure 50 (e.g., a roof) of a residential structure, wherein the carriage 120 is in transition between a first configuration (e.g., a transport configuration) and a second configuration (e.g., an arrival configuration) in which the second portion 930 of the carriage 120 is changing its orientation with respect to the first portion 920. As shown, the angle 907 is between 90 degrees and 180 degrees. More specifically, the angle 907 is approximately 135 degrees and increasing as the carriage 120 rises further on the track 110.

The method of using the system 100 can comprise automatically changing a rotational position of the second portion 930 with respect to the first portion 920 as the carriage 120 approaches and/or reaches the upper end 216 of the track 110. The method can comprise the second portion 930 contacting the surface 247 and, more specifically, a contact portion of the surface 247. More specifically, the method can comprise the angle 907 between the second portion 930 and the first portion 920 automatically changing between two different positions of the carriage 120 in the longitudinal direction 103.

Figure 33:
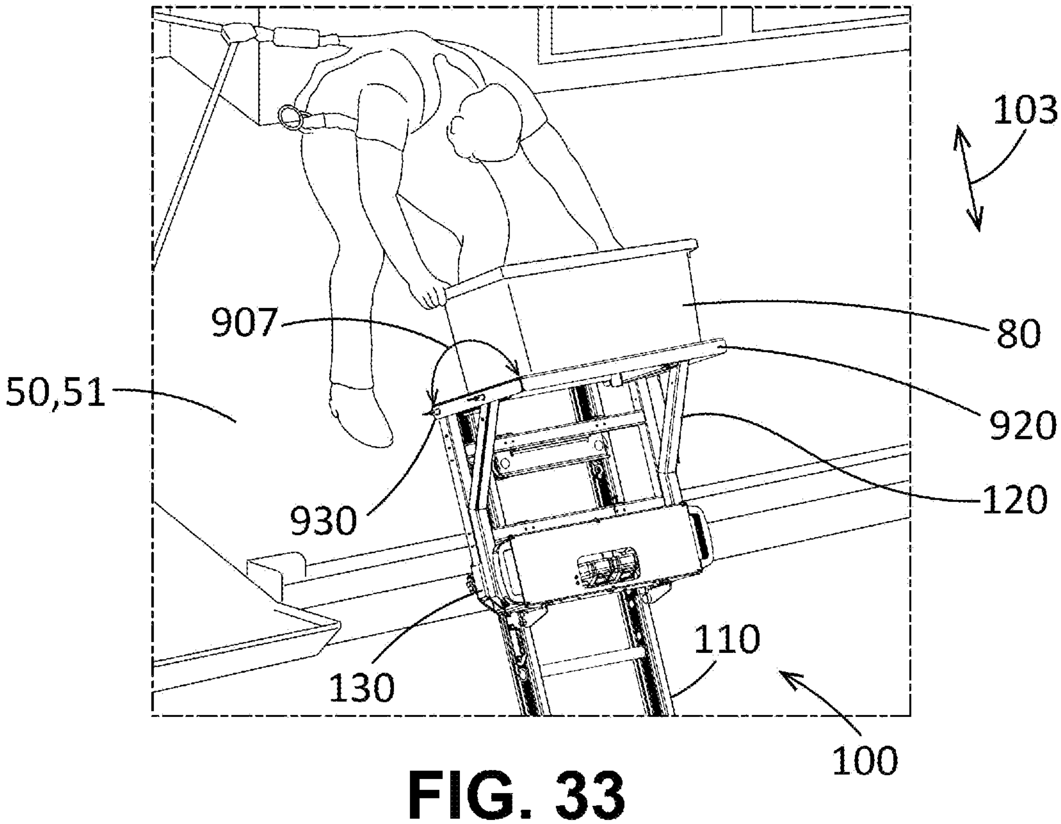
FIG. 33 is a top perspective view of the material hoist system of FIG. 32 showing the carriage in the second configuration and a user about to remove a load (e.g., a container as shown) from the carriage.

FIG. 33 is a top perspective view of the material hoist system of FIG. 32 showing the carriage 120 in the second configuration and a user about to remove the load 80 (e.g., a container as shown) from the carriage 120. The angle 907 between the second portion 930 and the first portion 920 is approximately 180 degrees.

The method can comprise, without the user even lifting the load 80, the user moving the load 80 away from the edge of the elevated surface. More specifically, the method can comprise the user sliding the load from front to back towards the now-lowered second portion 930. The method can comprise lifting the load 80 with the second portion 930 in a lowered position, i.e., the aforementioned second configuration or arrival configuration of the carriage 120.

Figure 35:
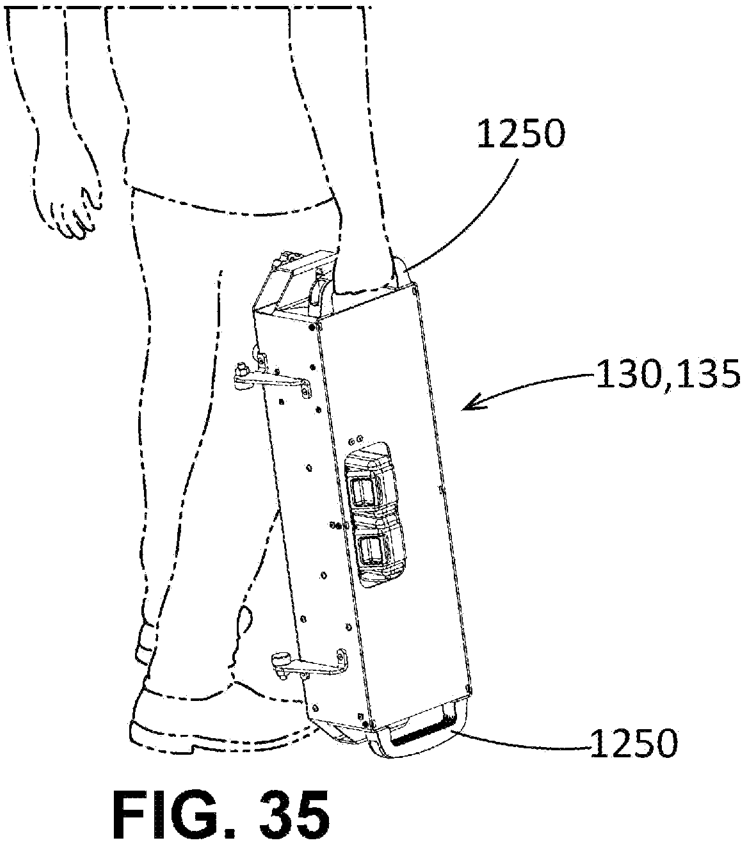
FIG. 35 is a perspective view of a user lifting and holding, with one hand, the drive of FIG. 1 during transport of same.

FIG. 35 is a perspective view of a user lifting and holding, with one hand, the drive 130 of FIG. 1 during transport of same. As shown, the drive 130 and, more specifically, each of the main portion 135 and the remote control 200 thereof can be configured to be carried by a user to a from a job site. In some aspects, the main portion 135 of the drive 130 shown can weigh approximately 33 pounds (and, more broadly, can weigh 35 pounds or less), and the main portion 135 of the drive 130 shown in FIG. 20A-20D can weigh approximately 50 pounds. In some aspects, the carriage 120 can weigh 22 pounds (and, more broadly, can weigh 25 pounds or less). Again, the main portion 135 of the drive 130 can comprise the handle 1250 and can be carried by the user therewith.

Various components of the material hoist system 100 can be formed from or comprise a metal such as, for example and without limitation, steel or aluminum or a plastic or other sufficiently strong material. More specifically, the track 110 and the carriage and various components thereof such as, for example and without limitation, the first rails 210*a,b,c* and the second rails 220*a,b,c* can be formed from any material matching user preferences including a lightweight material such as, for example and without limitation, aluminum. Each of or any of the moving elements 950 can be formed from or can comprise any rigid material such as, for example and without limitation, metal (e.g., aluminum, steel, or cast iron) or plastic (e.g., a reinforced polyamide resin). The frame 910 and, more specifically, the frame members 940 thereof can be formed from structural tubing such as, for example and without limitation, carbon steel or aluminum tubing, which can be hollow and can define a square shape in cross-section. In some aspects, T-slot aluminum profiles and accompanying fasteners such as are available from 80/20, Inc. of Columbia City, Indiana, U.S.A., can be used to construct some or all of the frame 910 and can form the frame members 940 and the various portions of the carriage 120 but with less welding. The flexible connecting element 150 can be any flexible but strong device such as, for example and without limitation, a rope or cable. The flexible connecting element 150 can be formed from any sufficiently strong material such as, for example and without limitation, metal (e.g., wire rope or wire cable or chain) or plastic (e.g., synthetic polyethylene such as high molecular weight polyethylene (HMwPE) or even ultra-high molecular weight polyethylene (UHMwPE) such as the DYNEEMA fiber available in multi-stranded braided AMSTEEL-Blue rope available from Samson Rope Technologies of Ferndale, Washington, U.S.A.). Each of or any of the stationary structural components can be formed from any rigid material such as, for example and without limitation, plastic (e.g., a reinforced polyamide resin). In some aspects, the various components can be formed from any other material, any of which can optionally be corrosion-resistant or replaceable for serviceability.

Various components of the material hoist system 100 can be formed from any one or more of a variety of manufacturing processes including subtractive manufacturing processes such as, for example and without limitation, machining, forging, stamping; additive manufacturing processes such as, for example and without limitation, three-dimensional printing; and any other forming and assembly processes such as, for example and without limitation, bending and riveting.

One should note that conditional language, such as, among others, “can,” “could,” “might,” or “may,” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A drive for a material hoist system, the drive comprising:

- a housing configured to be slidably coupled to a track of the system;
- a motor positioned inside the housing;
- a gearbox positioned inside the housing and coupled to the motor;
- a spool positioned inside the housing between the motor and the gearbox, the spool configured to:
  - selectably wind and unwind a flexible connecting element coupled to the track; and
  - drive movement of the drive along a longitudinal direction of the track;
- a mounting sleeve coupled to the housing and formed as a hollow tube defining a cavity, the cavity configured to receive a frame member of a carriage of the material hoist system, a hole formed through the mounting sleeve and extending transverse to the cavity; and
- a fastener engaging the hole and configured to couple the drive to the carriage;

wherein:

- the drive further comprises a first frontward moving element and a first sideward moving element;
- the first frontward moving element is configured to engage a frontward-facing portion of a first rail; and
- the first sideward moving element is configured to engage a sideward-facing portion of the first rail.

2. The drive of claim 1, wherein the spool defines a cavity from a first end to a second end, the cavity configured to receive and allow connection of a shaft extending from the motor to the gearbox.

3. The drive of claim 2, further comprising a main power supply comprising a battery.

4. The drive of claim 3, wherein the battery is configured for use in cordless battery-powered power tools.

5. The drive of claim 1, wherein the spool comprises a guide configured to aid coiling of the flexible connecting element, the guide configured to contact and thereby reverse a direction of coiling of the flexible connecting element.

6. The drive of claim 1, wherein an output shaft of the gearbox remains stationary during operation and movement of the drive, a body of the gearbox rotating during the operation.

7. The drive of claim 1, wherein the track is portable.

8. The drive of claim 1, further comprising a handle coupled to the housing, the handle being configured to support a weight of the drive during user transport thereof via the handle.

9. The drive of claim 1, wherein a centerline of the spool is offset from a centerline of the housing in a lateral direction of the drive less than 25% of an opening length through which the flexible connecting element exits the drive.

10. The drive of claim 1, wherein the fastener comprises a hand-tightenable knob configured to be manually tightened by a user's hand.

11. A material hoist system comprising the drive of claim 1, the system further comprising the track, the track comprising:

- the first rail; and
- a second rail, each of the first rail and the second rail defining a first end and a second end distal from the first end; and
- a plurality of rungs extending from the first rail to the second rail, the plurality of rungs spaced apart from each other and distributed along a longitudinal length of the track.

12. The material hoist system of claim 11, wherein each of the first rail and the second rail comprises an I-beam, the I-beam extending along a longitudinal length of the track, the I-beam comprising:

- a web defining a first edge and a second edge distal from the first edge;
- a first flange intersecting the first edge of the web; and
- a second flange intersecting the second edge of the web.

13. The material hoist system of claim 11, further comprising a second sideward moving element, the second sideward moving element configured to engage a sideward-facing portion of the second rail of the track, a spacing between the first and second sideward moving elements being greater than an inside opening width of the track such that the drive must be rotated to be lockably engaged with the track.

14. The material hoist system of claim 11, further comprising the carriage, the carriage configured to carry a load along a longitudinal length of the track.

15. A material hoist system comprising the drive of claim 1, the system further comprising the carriage, the carriage comprising:

a frame comprising the frame member; and a plurality of carriage moving elements secured to the frame;

wherein the drive is coupled to the carriage and configured to remain stationary with respect to the carriage during operation of the material hoist system.

* * * * *